United States Patent
Kim

(10) Patent No.: US 12,108,440 B2
(45) Date of Patent: *Oct. 1, 2024

(54) METHOD FOR CONTROLLING ACCESS OF TERMINAL IN COMMUNICATION SYSTEM

(71) Applicant: ELECTRONICS AND TELECOMMUNICATIONS RESEARCH INSTITUTE, Daejeon (KR)

(72) Inventor: Jae Heung Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/315,827

(22) Filed: May 11, 2023

(65) Prior Publication Data

US 2023/0284264 A1    Sep. 7, 2023

Related U.S. Application Data

(63) Continuation of application No. 17/043,503, filed as application No. PCT/KR2020/003325 on Mar. 10, 2020, now Pat. No. 11,690,096.

(30) Foreign Application Priority Data

Mar. 14, 2019  (KR) .................. 10-2019-0029311
Mar. 19, 2019  (KR) .................. 10-2019-0031317
(Continued)

(51) Int. Cl.
*H04W 74/00*    (2009.01)
*H04L 1/00*     (2006.01)
(Continued)

(52) U.S. Cl.
CPC ......... *H04W 74/008* (2013.01); *H04L 1/0003* (2013.01); *H04W 72/23* (2023.01);
(Continued)

(58) Field of Classification Search
CPC . H04W 74/006; H04W 74/008; H04W 74/02; H04W 74/0833; H04W 76/11; H04W 76/27; H04W 72/23; H01L 1/003
See application file for complete search history.

(56) References Cited

U.S. PATENT DOCUMENTS

2015/0289292 A1    10/2015  Sun et al.
2016/0309518 A1    10/2016  Patel et al.
(Continued)

FOREIGN PATENT DOCUMENTS

KR    1020150115685 A    10/2015
KR    1020190013624 A    2/2019
(Continued)

OTHER PUBLICATIONS

CAICT, "Considerations on Procedure for Two-step RACH", R1-1905126, 3GPP TSG RAN WG1 Meeting #96bis, Apr. 2019 Xi'an, China, Apr. 8-12, 2019.
(Continued)

*Primary Examiner* — Gary Mui
(74) *Attorney, Agent, or Firm* — Rabin & Berdo, P.C.

(57) ABSTRACT

Provided is a method for controlling the access of a terminal in a communication system. An operation method of a terminal comprises the steps of: receiving, from a base station, configuration information for a two-step random access procedure; transmitting, to the base station, RA MSG-A including an RA preamble and an RA payload, on the basis of the configuration information; and receiving,
(Continued)

from the base station, RA MSG-B, which is a response to the RA MSG-A. Therefore, communication system performance can be improved.

20 Claims, 24 Drawing Sheets

(30) Foreign Application Priority Data

| | | | |
|---|---|---|---|
| Mar. 26, 2019 | (KR) | ..................... | 10-2019-0034647 |
| Apr. 18, 2019 | (KR) | ..................... | 10-2019-0045553 |
| Apr. 22, 2019 | (KR) | ..................... | 10-2019-0046726 |
| Apr. 30, 2019 | (KR) | ..................... | 10-2019-0050969 |
| May 9, 2019 | (KR) | ..................... | 10-2019-0054561 |
| May 20, 2019 | (KR) | ..................... | 10-2019-0058665 |
| May 31, 2019 | (KR) | ..................... | 10-2019-0064538 |
| Aug. 12, 2019 | (KR) | ..................... | 10-2019-0098338 |
| Aug. 13, 2019 | (KR) | ..................... | 10-2019-0099010 |
| Aug. 21, 2019 | (KR) | ..................... | 10-2019-0102362 |
| Sep. 25, 2019 | (KR) | ..................... | 10-2019-0118359 |
| Sep. 26, 2019 | (KR) | ..................... | 10-2019-0118971 |
| Sep. 27, 2019 | (KR) | ..................... | 10-2019-0119970 |
| Mar. 9, 2020 | (KR) | ..................... | 10-2020-0029217 |

(51) Int. Cl.

| | |
|---|---|
| *H04W 72/23* | (2023.01) |
| *H04W 74/02* | (2009.01) |
| *H04W 74/0833* | (2024.01) |
| *H04W 76/11* | (2018.01) |
| *H04W 76/27* | (2018.01) |
| *H04W 80/02* | (2009.01) |

(52) U.S. Cl.
CPC ....... *H04W 74/02* (2013.01); *H04W 74/0833* (2013.01); *H04W 76/11* (2018.02); *H04W 76/27* (2018.02); *H04W 80/02* (2013.01)

(56) References Cited

U.S. PATENT DOCUMENTS

| | | |
|---|---|---|
| 2017/0135135 A1 | 5/2017 | Pelletier et al. |
| 2018/0110074 A1 | 4/2018 | Akkarakaran et al. |
| 2018/0279186 A1 | 9/2018 | Park et al. |
| 2018/0279376 A1 | 9/2018 | Dinan et al. |
| 2018/0324865 A1 | 11/2018 | Hui et al. |
| 2019/0029053 A1 | 1/2019 | Quan et al. |
| 2019/0037605 A1 | 1/2019 | Agiwal et al. |
| 2019/0053271 A1 | 2/2019 | Islam et al. |
| 2019/0104552 A1 | 4/2019 | Hui et al. |
| 2019/0104554 A1 | 4/2019 | Amuru et al. |
| 2019/0215706 A1 | 7/2019 | Tsai |
| 2019/0335512 A1 | 10/2019 | Shi et al. |
| 2020/0100299 A1 | 3/2020 | Loehr et al. |
| 2020/0107372 A1 | 4/2020 | Agiwal et al. |
| 2020/0146069 A1 | 5/2020 | Chen et al. |
| 2020/0178308 A1 | 6/2020 | Chen |
| 2020/0221506 A1 | 7/2020 | Jeon et al. |
| 2020/0252973 A1 | 8/2020 | Zhang et al. |
| 2021/0227579 A1 | 7/2021 | Lee et al. |
| 2021/0274538 A1 | 9/2021 | Liu et al. |

FOREIGN PATENT DOCUMENTS

| | | |
|---|---|---|
| WO | 2018175809 A1 | 9/2018 |
| WO | 2019029363 A1 | 2/2019 |
| WO | 2019195563 A1 | 10/2019 |

OTHER PUBLICATIONS

CATT, "Consideration on 2-step RA", R2-1700205, 3GPP TSG RAN WG2 Meeting Ad Hoc, Spokane, USA, Jan. 17-19, 2017.
CMCC, "Discussion on procedure for two-step RACH", R1-1904725, 3GPP TSG RAN WG1 #96bis. Xi'an, China, Apr. 8-12, 2019.
LG Electronics, "Discussion on 2step RACH Procedure", R1-1902534, 3GPP TSG RAN WG1 meeting #96, Athens, Greece, Feb. 12-16, 2019.
Nokia, Nokia Shanghai Bell, "MsgB design", R2-1903716, 3GPP TSG-RAN WG2 Meeting #105bis, Xian, China, Apr. 8-12, 2019.
NTT Docomo, Inc. "Initial consideration on 2 step RACH", R2-1905118, 3GPP TSG-RAN WG2 Meeting #105bis, Xi'an China, Apr. 8-Apr. 12, 2019.
Qualcomm Incorporated, Report of Email Discussion [103#55][NR-U] 2-step RACH Model and Initial Information Contents (Qualcomm), R2-1813690, 3GPP TSG-RAN WG2 Meeting #103bis. Chengdu, China, Oct. 8-12, 2018.
Samsung, "2 step RA: MAC PDU Format for MsgB", R2-1903115, 3GPP TSG-RAN2 105bis, Xian, China, Apr. 8-Apr. 12, 2019.
LG Electronics Inc. "Contents in MAC layer of msgA and msgB", R2-1903731, 3GPP TSG-RAN WG2 Meeting #105bis, Xi'an, China, Apr. 8-12, 2019.
Zte, Sanechips, "MsgB content and format", R2-1906306, 3GPP TSG-WG2 Meeting #106, USA, Reno, May 13-17, 2019.
CATT, "MAC RAR PDU," R2-1710292, 3GPP TSG-RAN WG2 #99bis, Prague, Czech, Sep. 29, 2017.
OPPO, "On channel structure for 2-step RACH ", R1-1902747, 3GPP TSG RAN WG1 #96, Athens, Greece, Feb. 25-Mar. 1, 2019.
OPPO, "On Procedure for 2-step RACH," R1-1902748, 3GPP TSG RAN WG1 #96, Athens, Greece, Feb. 16, 2019.
Zte et al., "Considerations on 2-Step RACH Procedures," R1-1901627, 3GPP TSG RAN WG1 Meeting #96, Athens, Greece, Feb. 16, 2019.
Huawei, HiSilicon, "PDU format for MsgB", 3GPP TSG-RAN WG2 Meeting 107bis, Chongqing, China, Oct. 14-18, 2019, R2-1913006.
OPPO, "Draft TP for msgB MAC PDU format", 3GPP TSG-RAN WG2 Meeting #108, Reno, USA, Nov. 18-Nov. 22, 2019, R2-1914389.
Qualcomm Incorporated, "msgB MAC PDU format", 3GPP TSG-RAN WG2 Meeting #107bis, NR_2step_RACH-Core—Release 16, Chongqing, China, Oct. 14-18, 2019, R2-1913404.

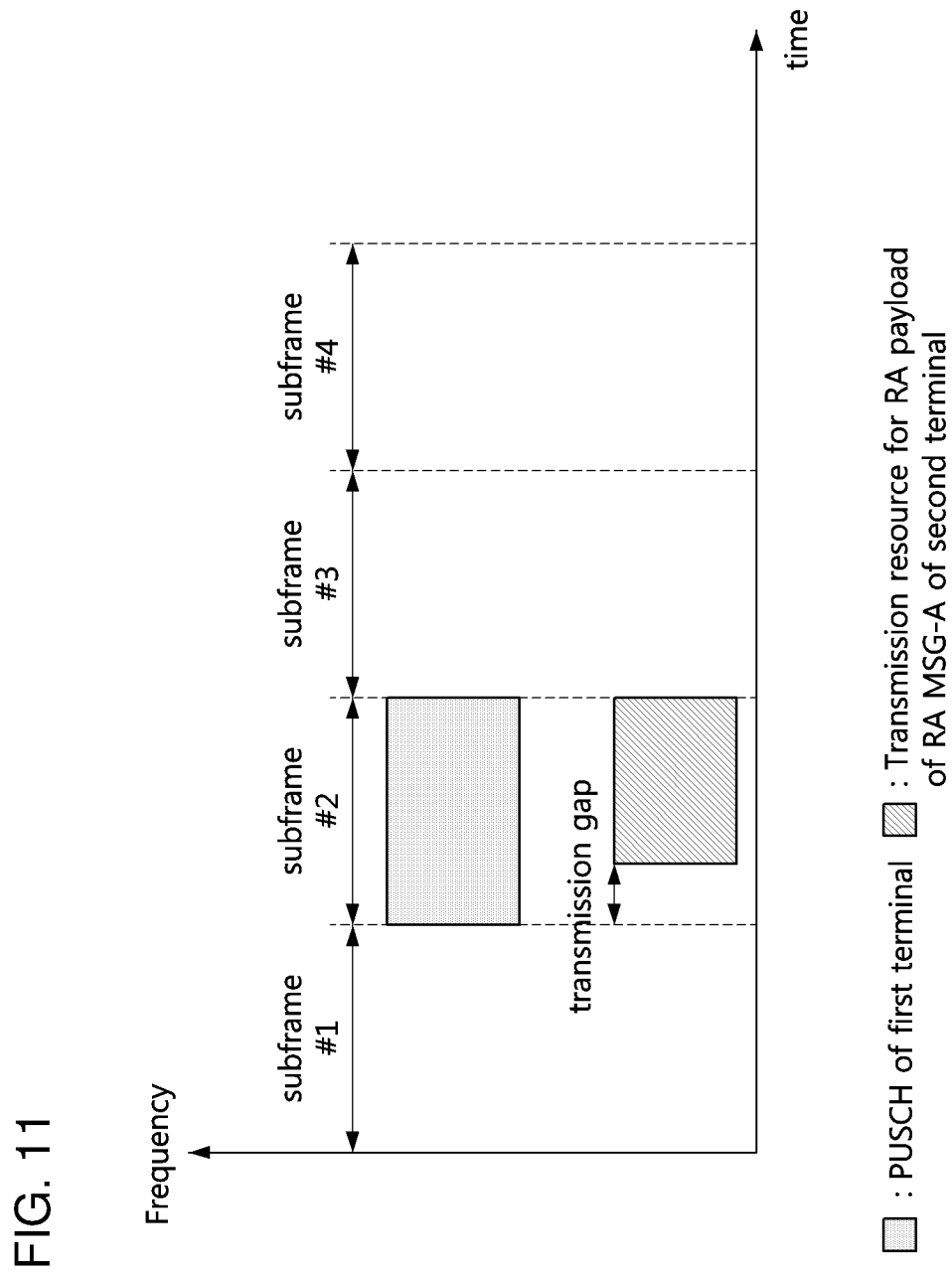

[BI subheader]

[RAPID subheader]

[Subheader #1 for successful RAR]

[Subheader #2 for successful RAR]

METHOD FOR CONTROLLING ACCESS OF TERMINAL IN COMMUNICATION SYSTEM

CROSS-REFERENCE TO RELATED APPLICATIONS

This is a continuation of U.S. application Ser. No. 17/043,503, filed Sep. 29, 2020, which was a National Stage application of PCT/KR2020/003325, filed on Mar. 10, 2020. The prior US application and the present continuation application also claim the benefit of priority of Korean Patent Application No. 10-2019-0029311, filed with the Korea Intellectual Property Office on Mar. 14, 2019, No. 10-2019-0031317, filed with the Korea Intellectual Property Office on Mar. 19, 2019, No. 10-2019-0034647, filed with the Korea Intellectual Property Office on Mar. 26, 2019, No. 10-2019-0045553, filed with the Korea Intellectual Property Office on Apr. 18, 2019, No. 10-2019-0046726, filed with the Korea Intellectual Property Office on Apr. 22, 2019, No. 10-2019-0050969, filed with the Korea Intellectual Property Office on Apr. 30, 2019, No. 10-2019-0054561, filed with the Korea Intellectual Property Office on May 9, 2019, No. 10-2019-0058665, filed with the Korea Intellectual Property Office on May 20, 2019, No. 10-2019-0064538, filed with the Korea Intellectual Property Office on May 31, 2019, No. 10-2019-0098338, filed with the Korea Intellectual Property Office on Aug. 12, 2019, No. 10-2019-0099010, filed with the Korea Intellectual Property Office on Aug. 13, 2019, No. 10-2019-0102362, filed with the Korea Intellectual Property Office on Aug. 21, 2019, No. 10-2019-0118359, filed with the Korea Intellectual Property Office on Sep. 25, 2019, No. 10-2019-0118971, filed with the Korea Intellectual Property Office on Sep. 26, 2019, No. 10-2019-0119970, filed with the Korea Intellectual Property Office on Sep. 27, 2019, and No. 10-2020-0029217, filed with the Korea Intellectual Property Office Mar. 9, 2020. The disclosures of these prior US and foreign applications are incorporated herein by reference.

TECHNICAL FIELD

The present invention relates to techniques for access of a terminal in a communication system, and more particularly, to techniques for contention and non-contention based access control in a communication system using a high frequency band.

BACKGROUND ART

With the development of information and communication technology, various wireless communication technologies have been developed. Typical wireless communication technologies include long term evolution (LTE) and new radio (NR), which are defined in the 3rd generation partnership project (3GPP) standards. The LTE may be one of 4th generation (4G) wireless communication technologies, and the NR may be one of 5th generation (5G) wireless communication technologies.

The communication system (hereinafter, a new radio (NR) communication system) using a higher frequency band (e.g., a frequency band of 6 GHz or above) than a frequency band (e.g., a frequency band of 6 GHz or below) of the long term evolution (LTE) (or, LTE-A) is being considered for processing of soaring wireless data. The 5G communication system can support enhanced mobile broadband (eMBB), ultra-reliable low-latency communication (URLLC), massive machine type communication (mMTC), and the like.

Meanwhile, a millimeter frequency band (e.g., a frequency band of 6 to 90 GHz) may be used to process rapidly increasing data. A small base station may be used to overcome deterioration of received signal performance due to path attenuation and reflection of radio waves in a high frequency band (e.g., millimeter frequency band). In a communication system supporting the millimeter frequency band, instead of a small base station supporting all functions of a radio protocol, a plurality of remote radio transmission/reception blocks (e.g., remote radio heads (RRHs)) and a centralized baseband processing function block may be deployed.

That is, all functions of a radio protocol can be distributedly supported in the remote radio transmission/reception blocks and the baseband processing function block in a functional split scheme. When the functional split technique is used, the communication system may be configured by a plurality of transmission and reception points (TRPs). The plurality of transmission and reception points may perform communications using a carrier aggregation scheme, a dual connectivity scheme, a duplication transmission scheme, or the like. In the communication system supporting the functional split scheme, the carrier aggregation scheme, the dual connectivity scheme, a bi-casting scheme, the duplication transmission scheme, or the like, methods for efficiently performing an access procedure (e.g., random access procedure) of a terminal are required.

DISCLOSURE

Technical Problem

An objective of the present invention for solving the above-described problem is directed to providing a method and an apparatus for controlling an access according to an operation state of a terminal in a communication system.

Technical Solution

An operation method of a terminal, according to a first exemplary embodiment of the present invention for achieving the above-described objective, may comprise receiving, from a base station, configuration information for a 2-step random access procedure; transmitting, to the base station, a random access (RA) message-A (MSG-A) including an RA preamble and an RA payload based on the configuration information; and receiving an RA MSG-B in response to the RA MSG-A from the base station, wherein the RA MSG-B includes one or more MAC sub protocol data units (subPDUs), each of the one or more MAC subPDUs includes a MAC subheader, and the MAC subheader includes a first indicator indicating a type of the MAC subPDU.

The operation method may further comprise receiving system information including information indicating a modulation and coding scheme (MCS) for the RA payload from the base station, wherein the RA payload is transmitted based on the MCS level indicated by the system information.

The first indicator may indicate that the MAC subPDU is a first type MAC subPDU including a backoff indicator (BI), that the MAC subPDU is a second type MAC subPDU including a fallback random access response (RAR), or that the MAC subPDU is a third type MAC subPDU including a successful RAR.

A size of the first indicator may be 2 bits, a first bit of the 2 bits may indicate the first type MAC subPDU or the second type MAC subPDU, and a second bit of the 2 bits may indicate the third type MAC subPDU.

The operation method may further comprise, when the first indicator included in the RA MSG-B indicates the first type MAC subPDU, performing the 2-step random access procedure or the 4-step random access procedure based on the BI included in the RA MSG-B.

The operation method may further comprise, when the first indicator included in the RA MSG-B indicates the second type MAC subPDU, transmitting an RA MSG3 according to the 4-step random access procedure to the base station.

The RA MSG3 may be transmitted using a resource indicated by an uplink (UL) grant included in the fallback RAR.

The RA MSG-B including the fallback RAR may be generated based on a format of an RA MSG2 of the 4-step random access procedure.

When the first indicator indicates the third type MAC subPDU, the 2-step random access procedure may be terminated.

When the RA MSG-B is received within an RAR window from a transmission ending time point of the RA preamble, a contention may be determined to be resolved in the 2-step random access procedure.

The MAC subheader may further include a second indicator indicating whether the MAC subPDU is a fourth type MAC subPDU including a MAC service data unit (SDU), and the MAC SDU may include data or control information.

The MAC subheader may further include a third indicator indicating whether another MAC subPDU exists.

An operation method of a base station, according to a second exemplary embodiment of the present invention for achieving the above-described objective, may comprise transmitting 2-step configuration information for a 2-step random access (RA) procedure to a terminal; transmitting 4-step configuration information for a 4-step random access procedure to the terminal; receiving a message 1 from the terminal by performing a monitoring operation using the 2-step configuration information and the 4-step configuration information; and when the message 1 is an RA message-A (MSG-A) of the 2-step RA procedure, transmitting an RA MSG-B including one or more MAC sub protocol data units (subPDUs) to the terminal, wherein each of the one or more MAC subPDUs includes a MAC subheader, and the MAC subheader includes a first indicator indicating a type of the MAC subPDU.

The operation method may further comprise transmitting system information including information indicating a modulation and coding scheme (MCS) for an RA payload included in the RA MSG-A to the terminal.

The first indicator may indicate that the MAC subPDU is a first type MAC subPDU including a backoff indicator (BI), that the MAC subPDU is a second type MAC subPDU including a fallback random access response (RAR), or that the MAC subPDU is a third type MAC subPDU including a successful RAR.

The operation method may further comprise, when the first indicator included in the RA MSG-B indicates the second type MAC subPDU, receiving an RA MSG3 according to the 4-step random access procedure from the base station through a resource indicated by an uplink (UL) grant included in the fallback RAR.

The RA MSG-B including the fallback RAR may be generated based on a format of an RA MSG2 of the 4-step random access procedure.

When the RA MSG-B is received from the terminal within an RAR window from a transmission ending time point of the RA preamble, and the first indicator included in the RA MSG-B indicates the third type MAC subPDU, the 2-step random access procedure may be terminated.

One MAC subPDU among the one or more MAC subPDUs may include a MAC service data unit (SDU) including control information or data, and a radio network temporary identifier (RNTI) for the one MAC subPDU including the MAC SDU may be configured independently from an RNTI for another MAC subPDU including the BI, the fallback RAR, or the successful RAR.

The MAC subheader may further include a second indicator indicating whether the MAC subPDU is a fourth type MAC subPDU including a MAC service data unit (SDU), and the MAC SDU may include data or control information.

The MAC subheader may further include a third indicator indicating whether another MAC subPDU exists.

An operation method of a terminal, according to a third exemplary embodiment of the present invention for achieving the above-described objective, may comprise receiving, from a base station, configuration information for a 2-step random access procedure; transmitting, to the base station, a random access (RA) message-A (MSG-A) including an RA preamble and an RA payload based on the configuration information; determining a random access-radio network temporary identifier (RA-RNTI) by using information of a radio resource through which the RA preamble is transmitted and a preconfigured offset; receiving downlink control information (DCI) including resource allocation information of an RA MSG-B from the base station by performing a physical downlink control channel (PDCCH) monitoring operation using the RA-RNTI; and receiving the RA MSG-B from the base station through a resource indicated by the resource allocation information included in the DCI.

The RA-RNTI for the 2-step random access procedure may be configured differently from an RA-RNTI for a 4-step random access procedure.

The RA-RNTI may be determined by applying the preconfigured offset to an RA-RNTI for a 4-step random access procedure.

The preconfigured offset may be received from the base station.

The PDCCH monitoring operation may be performed within a random access response (RAR) window.

When the 2-step random access procedure is performed in a contention free random access (CFRA) scheme, the configuration information may include information of a transmission resource of the RA MSG-A allocated dedicatedly to the terminal.

An operation method of a base station, according to a fourth exemplary embodiment of the present invention for achieving the above-described objective, may comprise transmitting, to a terminal, configuration information for a 2-step random access procedure; receiving, from the terminal, a random access (RA) message-A (MSG-A) including an RA preamble and an RA payload by performing a monitoring operation based on the configuration information; determining a random access-radio network temporary identifier (RA-RNTI) by using information of a radio resource through which the RA preamble is received and a preconfigured offset; performing a scrambling operation on downlink control information (DCI) including resource allocation information of an RA MSG-B by using the RA-RNTI; transmitting the scrambled DCI to the terminal; and transmitting the RA MSG-B to the terminal through a resource indicated by the resource allocation information included in the DCI.

The RA-RNTI may be determined by applying the preconfigured offset to an RA-RNTI for a 4-step random access procedure.

The operation method may further comprise transmitting the preconfigured offset to the terminal.

The scrambled DCI may be transmitted to the terminal within a random access response (RAR) window.

When the 2-step random access procedure is performed in a contention free random access (CFRA) scheme, the configuration information may include information of a transmission resource of the RA MSG-A allocated dedicatedly to the terminal.

Advantageous Effects

According to the exemplary embodiments of the present invention, the communication system can support both the 2-step random access procedure and the 4-step random access procedure. The terminal may perform the 2-step random access procedure when a first execution condition is satisfied, and may perform the 4-step random access procedure when a second execution condition is satisfied. The random access (RA) MSG-A of the 2-step random access procedure and the RA MSG1 of the 4-step random access procedure may be distinguished based on RA preamble indexes or transmission resources.

The RA-radio network temporary identifier (RA-RNTI) used for transmission and reception of the RA MSG-B of the 2-step random access procedure may be configured differently from the RA-RNTI used for transmission and reception of the RA MSG2 of the 4-step random access procedure. The terminal may receive the RA MSG-B or the RA MSG2 from the base station by using the RA-RNTIs. The medium access control (MAC) subheader of the RA MSG-B may include an indicator indicating the type of the RA MSG-B. The terminal can identify the type of the RA MSG-B based on the indicator. Therefore, the random access procedure can be efficiently performed, and the performance of the communication system can be improved.

DESCRIPTION OF DRAWINGS

FIG. 11 is a conceptual diagram illustrating a first exemplary embodiment of an RA MSG-A transmission method in a communication system.

MODES OF THE INVENTION

Figure 1:
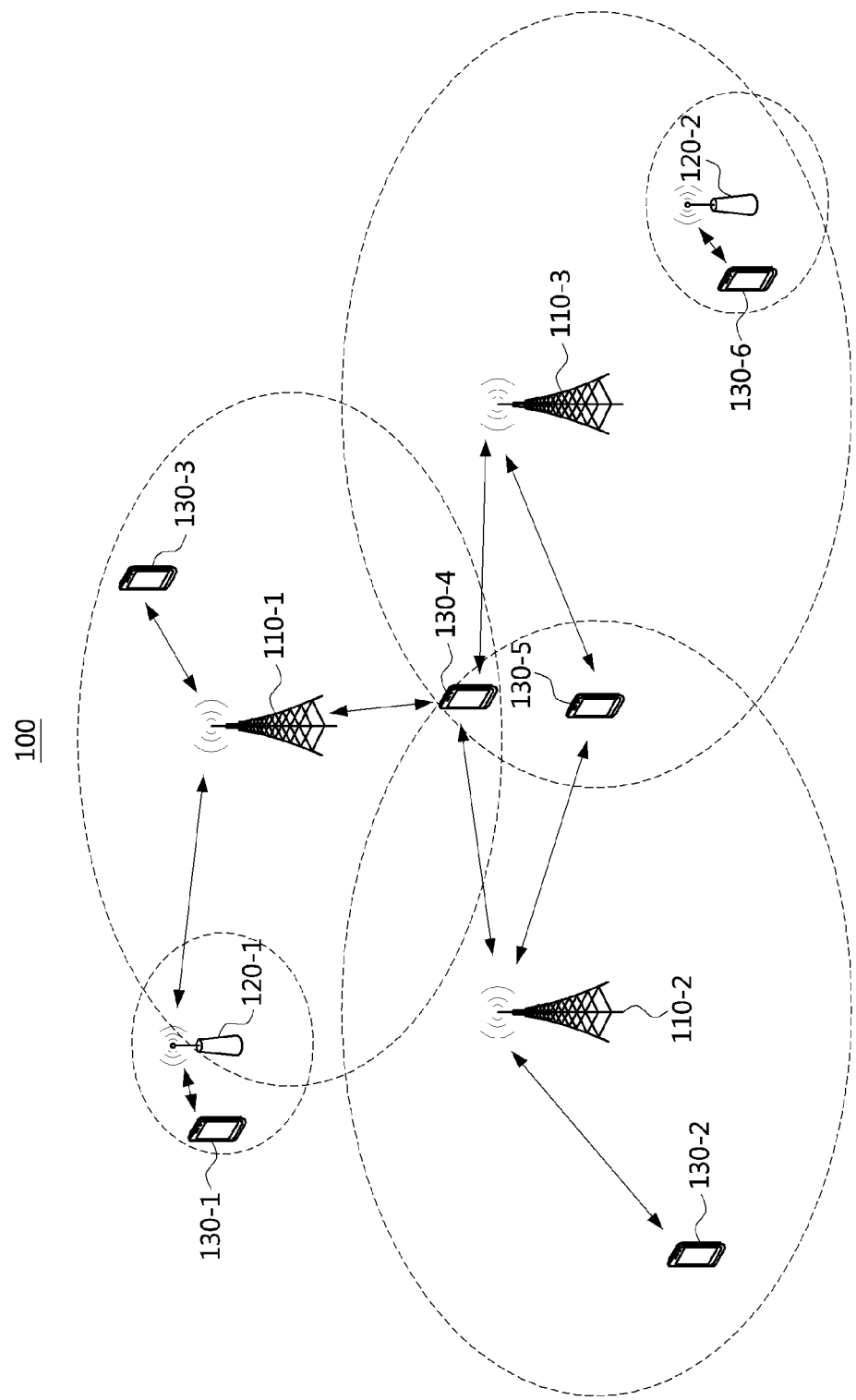
FIG. 1 is a conceptual diagram illustrating a first exemplary embodiment of a communication system.

While the present invention is susceptible to various modifications and alternative forms, specific embodiments are shown by way of example in the drawings and described in detail. It should be understood, however, that the description is not intended to limit the present invention to the specific embodiments, but, on the contrary, the present invention is to cover all modifications, equivalents, and alternatives that fall within the spirit and scope of the present invention. Although the terms "first," "second," etc. may be used herein in reference to various elements, such elements should not be construed as limited by these terms. These terms are only used to distinguish one element from another. For example, a first element could be termed a second element, and a second element could be termed a first element, without departing from the scope of the present invention. The term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directed coupled" to another element, there are no intervening elements.

The terminology used herein is for the purpose of describing particular embodiments only and is not intended to be limiting of embodiments of the present invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, parts, and/or combinations thereof, but do not preclude the presence or addition of one or more other features, integers, steps, operations, elements, parts, and/or combinations thereof.

Unless otherwise defined, all terms (including technical and scientific terms) used herein have the same meaning as commonly understood by those of ordinary skill in the art to which the present invention pertains. It will be further understood that terms defined in commonly used dictionaries should be interpreted as having a meaning that is consistent with their meaning in the context of the related art and will not be interpreted in an idealized or overly formal sense unless expressly so defined herein.

Hereinafter, exemplary embodiments of the present invention will be described in greater detail with reference to the accompanying drawings. To facilitate overall understanding of the present invention, like numbers refer to like elements throughout the description of the drawings, and description of the same component will not be reiterated.

A communication system to which exemplary embodiments according to the present invention will be described. However, the communication system to which exemplary embodiments according to the present invention are applied is not restricted to what will be described below. That is, the exemplary embodiments according to the present invention may be applied to various communication systems. Here, the term 'communication system' may be used with the same meaning as the term 'communication network'.

FIG. 1 is a conceptual diagram illustrating a first exemplary embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. The plurality of communication nodes may support 4th generation (4G) communication (e.g., long term evolution (LTE), LTE-advanced (LTE-A)), 5th generation (5G) communication (e.g., new radio (NR)), or the like. The 4G communication may be performed in a frequency band of 6 gigahertz (GHz) or below, and the 5G communication may be performed in a frequency band of 6 GHz or above.

For example, for the 4G and 5G communications, the plurality of communication nodes may support a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, a filtered OFDM based communication protocol, a cyclic prefix OFDM (CP-OFDM) based communication protocol, a discrete Fourier transform spread OFDM (DFT-s-OFDM) based communication protocol, an orthogonal frequency division multiple access (OFDMA) based communication protocol, a single carrier FDMA (SC-FDMA) based communication protocol, a non-orthogonal multiple access (NOMA) based communication protocol, a generalized frequency division multiplexing (GFDM) based communication protocol, a filter bank multi-carrier (FBMC) based communication protocol, a universal filtered multi-carrier (UFMC) based communication protocol, a space division multiple access (SDMA) based communication protocol, or the like.

Also, the communication system 100 may further include a core network. When the communication system 100 supports the 4G communication, the core network may comprise a serving gateway (S-GW), a packet data network (PDN) gateway (P-GW), a mobility management entity (MME), and the like. When the communication system 100 supports the 5G communication, the core network may comprise a user plane function (UPF), a session management function (SMF), an access and mobility management function (AMF), and the like.

Meanwhile, each of the plurality of communication nodes 110-1, 110-2, 110-3, 120-1, 120-2, 130-1, 130-2, 130-3, 130-4, 130-5, and 130-6 constituting the communication system 100 may have the following structure.

Figure 2:
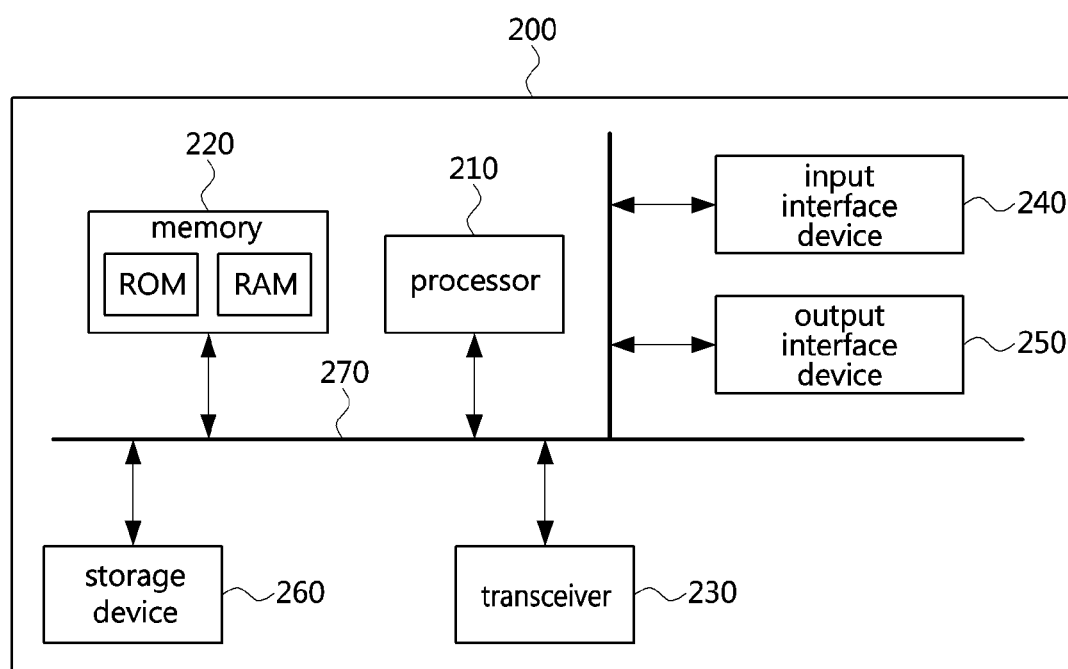
FIG. 2 is a block diagram illustrating a first exemplary embodiment of a communication node constituting a communication system.

FIG. 2 is a block diagram illustrating a first embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

However, each component included in the communication node 200 may be connected to the processor 210 via an individual interface or a separate bus, rather than the common bus 270. For example, the processor 210 may be connected to at least one of the memory 220, the transceiver 230, the input interface device 240, the output interface device 250, and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. The communication system 100 including the base stations 110-1, 110-2, 110-3, 120-1, and 120-2 and the terminals 130-1, 130-2, 130-3, 130-4, 130-5, and 130-6 may be referred to as an 'access network'. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may refer to a Node-B, a evolved Node-B (eNB), a base transceiver station (BTS), a radio base station, a radio transceiver, an access point, an access node, a road side unit (RSU), a radio remote head (RRH), a transmission point (TP), a transmission and reception point (TRP), an eNB, a gNB, or the like.

Here, each of the plurality of terminals 130-1, 130-2, 130-3, 130-4, 130-5, and 130-6 may refer to a user equipment (UE), a terminal, an access terminal, a mobile terminal, a station, a subscriber station, a mobile station, a portable subscriber station, a node, a device, an Internet of things (IoT) device, a mounted apparatus (e.g., a mounted module/device/terminal or an on-board device/terminal, etc.), or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul or a non-ideal backhaul, and exchange information with each other via the ideal or non-ideal backhaul. Also, each of the plurality of base stations 110-1, 110-2, 110-3, 120-1, and 120-2 may be connected to the core network through the ideal or non-ideal backhaul. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

Also, each of the plurality of base stations 110-1, 110-2, 110-3, 120-1, and 120-2 may support multi-input multi-output (MIMO) transmission (e.g., a single-user MIMO (SU-MIMO), multi-user MIMO (MU-MIMO), massive MIMO, or the like), coordinated multipoint (CoMP) transmission, carrier aggregation (CA) transmission, transmission in an unlicensed band, device-to-device (D2D) communications (or, proximity services (ProSe)), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2, and operations supported by the plurality of base stations 110-1, 110-2, 110-3, 120-1, and 120-2. For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

The first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Hereinafter, methods for configuring and managing radio interfaces in a communication system will be described. Even when a method (e.g., transmission or reception of a data packet) performed at a first communication node among communication nodes is described, the corresponding second communication node may perform a method (e.g., reception or transmission of the data packet) corresponding to the method performed at the first communication node. That is, when an operation of a terminal is described, the corresponding base station may perform an operation corresponding to the operation of the terminal. Conversely, when an operation of the base station is described, the corresponding terminal may perform an operation corresponding to the operation of the base station.

Meanwhile, in a communication system, a base station may perform all functions (e.g., remote radio transmission and reception function, baseband processing function, and the like) of a communication protocol. Alternatively, the remote radio transmission and reception function among all the functions of the communication protocol may be performed by a transmission reception point (TRP) (e.g., flexible TRP (f-TRP)), and the baseband processing function among all the functions of the communication protocol may be performed by a baseband unit (BBU) block. The TRP may be a remote radio head (RRH), a radio unit (RU), a transmission point (TP), or the like. The BBU block may include at least one BBU or at least one digital unit (DU). The BBU block may be referred to as a 'BBU pool', a 'centralized BBU', or the like. The TRP may be connected to the BBU block via a wired fronthaul link or a wireless fronthaul link. A communication system composed of a backhaul link and a fronthaul link may be as follows. When a functional-split technique of the communication protocol is applied, the TRP may selectively perform some functions of the BBU or some functions of a medium access control (MAC) or a radio link control (RLC).

Figure 3:
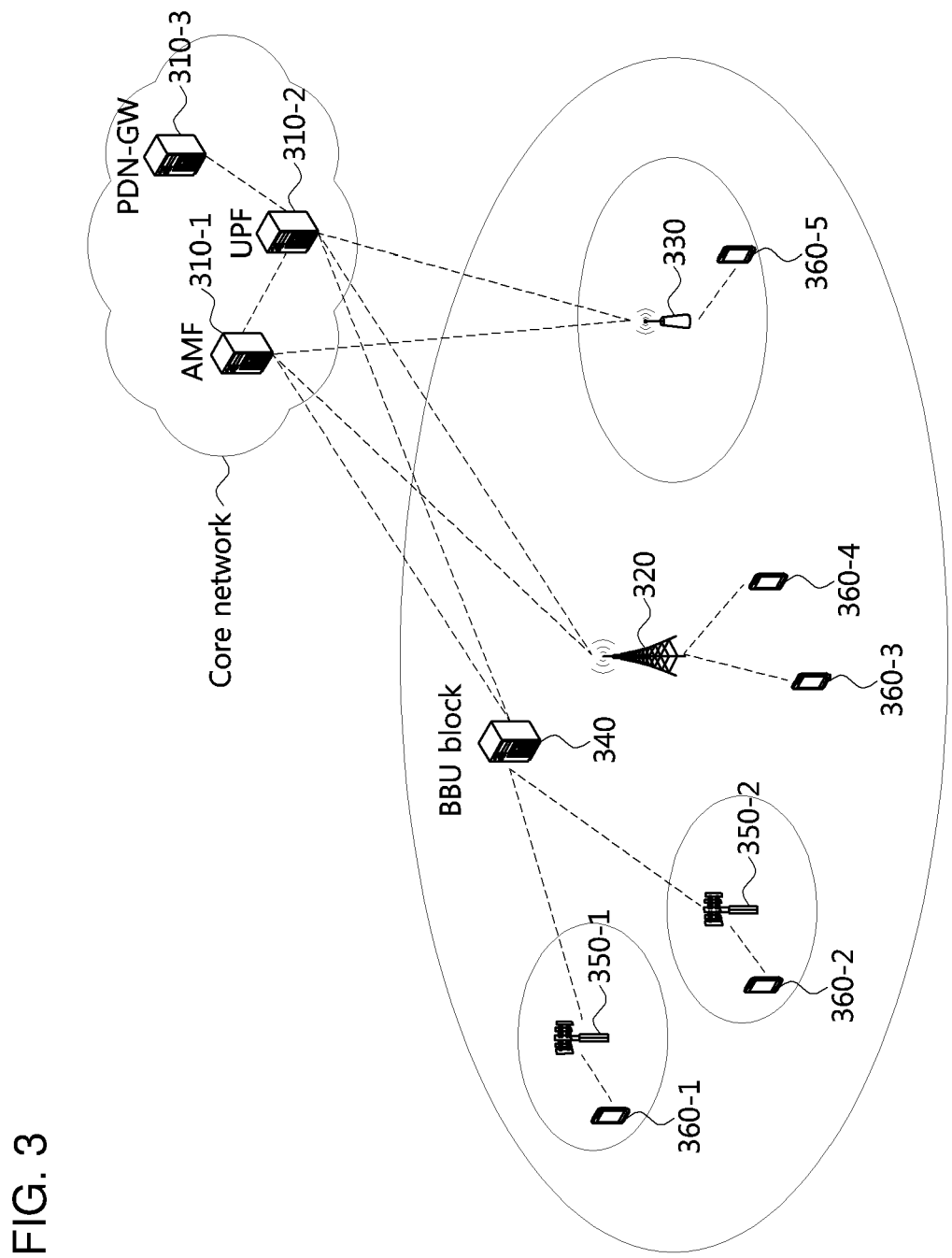
FIG. 3 is a conceptual diagram illustrating a second exemplary embodiment of a communication system.

FIG. 3 is a conceptual diagram illustrating a second exemplary embodiment of a communication system.

Referring to FIG. 3, a communication system may include a core network and an access network. The core network supporting the 4G communication may include an MME 310-1, an S-GW 310-2, a P-GW 310-3, and the like. The core network supporting the 5G communication may include an AMF 310-1, an UPF 310-2, a PDN-GW 310-3, and the like. The access network may include a macro base station 320, a small base station 330, TRPs 350-1 and 350-2, terminals 360-1, 360-2, 360-3, 360-4, and 360-5, and the like. The macro base station 320 or the small base station 330 may be connected to a termination node of the core network via a wired backhaul. The TRPs 350-1 and 350-2 may support the remote radio transmission and reception function among all the functions of the communication protocol, and the baseband processing function for the TRPs 350-1 and 350-2 may be performed by the BBU block 340. The BBU block 340 may belong to the access network or the core network. The communication nodes (e.g., MME, S-GW, P-GW, AMF, UPF, PDN-GW, macro base station, small base station, TRPs, terminals, and BBU block) belonging to the communication system may be configured identically or similarly to the communication node 200 shown in FIG. 2.

The macro base station 320 may be connected to the core network (e.g., AMF 310-1, UPF 310-2, MME, S-GW) using a wired backhaul link or a wireless backhaul link, and may provide communication services to the terminals 360-3 and 360-4 based on a communication protocol (e.g., 4G communication protocol, 5G communication protocol). The small base station 330 may be connected to the core network (e.g., AMF 310-1, UPF 310-2, MME, S-GW) using a wired backhaul link or a wireless backhaul link, and may provide communication services to the terminal 360-5 based on a communication protocol (e.g., 4G communication protocol, 5G communication protocol).

The BBU block 340 may be located in the AMF 310-1, the UPF 310-2, the MME, the S-GW, or the macro base station 320. Alternatively, the BBU block 340 may be located independently of each the AMF 310-1, the UPF 310-2, the MME, the S-GW, and the macro base station 320. For example, the BBU block 340 may be configured as a logical function between the macro base station 320 and the AMF 310-1 (or UPF 310-2). The BBU block 340 may support the plurality of TRPs 350-1 and 350-2, and may be connected to each of the plurality of TRPs 350-1 and 350-2 using a wired fronthaul link or a wireless fronthaul link. That is, the link between the BBU block 340 and the TRPs 350-1 and 350-2 may be referred to as a 'fronthaul link'.

The first TRP 350-1 may be connected to the BBU block 340 via a wired fronthaul link or a wireless fronthaul link, and provide communication services to the first terminal 360-1 based on a communication protocol (e.g., 4G communication protocol, 5G communication protocol). The second TRP 350-2 may be connected to the BBU block 340 via a wired fronthaul link or a wireless fronthaul link, and provide communication services to the second terminal 360-2 based on a communication protocol (e.g., 4G communication protocol, 5G communication protocol).

In the exemplary embodiments to be described below, a communication system including an access network, an Xhaul network, and a core network may be referred to as an 'integrated communication system'. The communication nodes (e.g., MME, S-GW, P-GW, AMF, UPF, BBU block, distributed unit (DU), central unit (CU), base station, TRP, terminal, and the like) may be configured identically or similarly to the communication node 200 shown in FIG. 2. The communication nodes belonging to the Xhaul network may be connected using Xhaul links, and the Xhaul link may be a backhaul link or a fronthaul link.

Also, the UPF (or, S-GW) of the integrated communication system may refer to a termination communication node of the core network that exchanges packets (e.g., control information, data) with the base station, and the AMF (or, MME) of the integrated communication system may refer to a communication node in the core network, which performs control functions in a radio access section (or, interface) of the terminal. Here, each of the backhaul link, the fronthaul link, the Xhaul link, the DU, the CU, the BBU block, the S-GW, the MME, the AMF, and the UPF may be referred to as a different term according to a function (e.g., function of the Xhaul network, function of the core network) of a communication protocol depending on a radio access technology (RAT).

Figure 4:
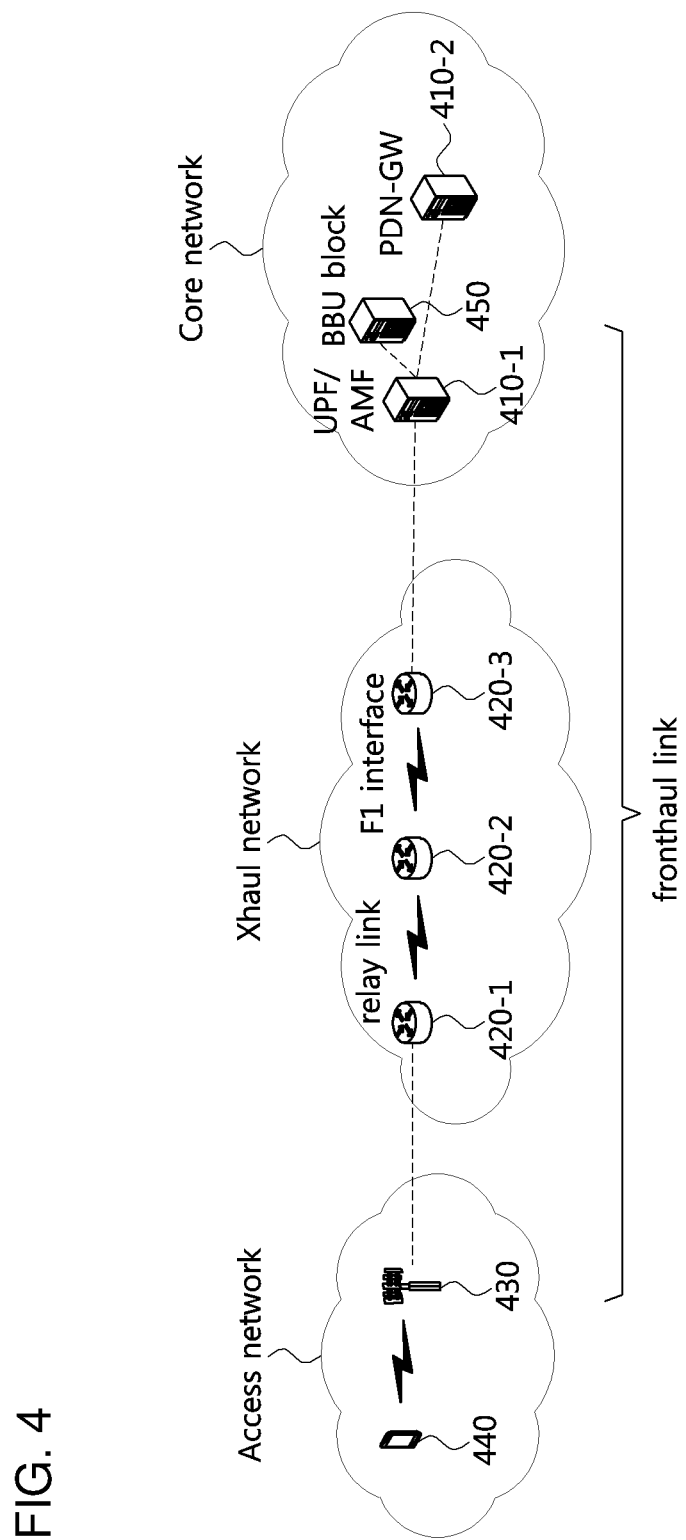
FIG. 4 is a conceptual diagram illustrating a first exemplary embodiment of an integrated communication system.

FIG. 4 is a conceptual diagram illustrating a first exemplary embodiment of an integrated communication system.

Referring to FIG. 4, the integrated communication system may include an access network, an Xhaul network, and a core network. The Xhaul network may be located between the access network and the core network, and may support communications between the access network and the core network. The communication nodes belonging to the integrated communication system may be configured to be the same as or similar to the communication node 200 shown in FIG. 2. The access network may include a TRP 430, a terminal 440, and the like. The Xhaul network may include a plurality of communication nodes 420-1, 420-2, and 420-3. The communication node constituting the Xhaul network may be referred to as a 'DU' or 'CU'. In the Xhaul network, the DUs 420-1 and 420-2 and the CU 420-3 may be connected using wireless Xhaul links, and may be connected based on a multi-hop scheme. The core network may include an UPF/AMF 410-1 (or, S-GW/MME), a PDN-GW 410-2, and the like. The UPF/AMF 410-1 may refer to a communication node including an UPF and an AMF, and the S-GW/MME may refer to a communication node including an S-GW and an MME. The BBU block 450 may be located in the UPF/AMF 410-1 and may be connected to the CU 420-3 via a wired link.

The first DU 420-1 of the Xhaul network may be connected to the TRP 430 using a wired link. Alternatively, the first DU 420-1 may be integrated into the TRP 430. The second DU 420-2 may be connected to each of the first DU 420-1 and the CU 420-3 using a wireless link (e.g., wireless Xhaul link), and the CU 420-3 may be connected to the termination communication node (e.g., the UPF/AMF 410-1) of the core network using a wired link. In the Xhaul network, the CU 420-3 connected to the termination communication node of the core network may be referred to as an 'aggregator'. The functions of the aggregator may be performed by the UPF/AMF 410-1.

The communications between the DUs 420-1 and 420-2 and the CU 420-3 may be performed using a communication protocol for the Xhaul link (hereinafter, 'Xhaul protocol'), which is different from an access protocol (e.g., a communication protocol used for communications between the terminal 440 and the TRP 430 (or, macro base station, small base station)). The packets to which the Xhaul protocol is applied may be transmitted to each of the core network and the access network through the Xhaul link. Here, the packets may be control information, data, and the like.

The TRP 430 may provide communication services to the terminal 440 using an access protocol (e.g., 4G communication protocol, 5G communication protocol), and may be connected to the first DU 420-1 using a wired link. The TRP 430 may support a remote radio transmission and reception function among all the functions of the communication protocol, and the baseband processing function for the TRP 430 may be performed by the BBU block 450. A link (e.g., 'TRP 430-first DU 420-1-second DU 420-2-CU 420-3-BBU block 450 (or, UPF/AMF 410-1)') between the TRP 430 performing the remote radio transmission and reception function and the BBU block 450 performing the baseband processing function may be referred to as a 'fronthaul link'. For example, the fronthaul link may be configured differently depending on the location of the BBU block 450 performing the baseband processing function.

Figure 5:
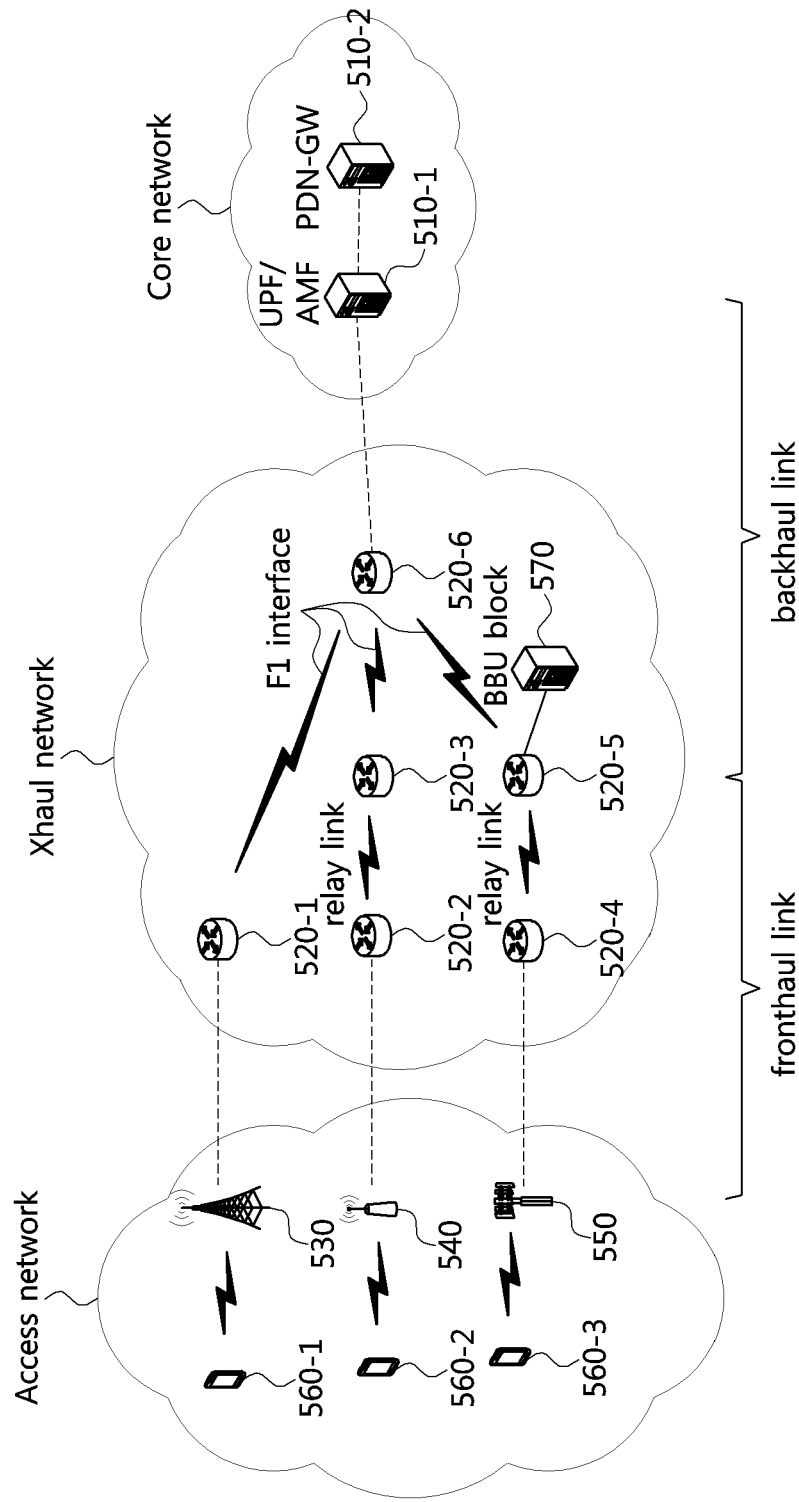
FIG. 5 is a conceptual diagram illustrating a second exemplary embodiment of an integrated communication system.

FIG. 5 is a conceptual diagram illustrating a second exemplary embodiment of an integrated communication system.

Referring to FIG. 5, an integrated communication system may include an access network, an Xhaul network, and a core network. The Xhaul network may be located between the access network and the core network, and may support communications between the access network and the core network. The communication nodes belonging to the integrated communication system may be configured to be the same as or similar to the communication node 200 shown in FIG. 2. The access network may include a macro base station 530, a small base station 540, a TRP 550, terminals 560-1, 560-2, and 560-3, and the like. The Xhaul network may include a plurality of communication nodes 520-1, 520-2, 520-3, 520-4, 520-5, and 520-6. The communication node constituting the Xhaul network may be referred to as a 'DU' or 'CU'. In the Xhaul network, the DUs 520-1, 520-2, 520-3, 520-4, and 520-5, and the CU 520-6 may be connected using wireless Xhaul links and may be connected based on a multi-hop scheme. A BBU block 570 may be located in one of the plurality of CU/DUs 520-1, 520-2, 520-3, 520-4, 520-5, and 520-6. For example, the BBU block 570 may be located in the fifth DU 520-5. The core network may include an UPF.AMF 510-1 (or, S-GW/MME), a PDN-GW 510-2, and the like. The UPF/AMF 510-1 may refer to a communication node including an UPF and an AMF, and the S-GW/MME may refer to a communication node including an S-GW and an MME.

The first DU 520-1 of the Xhaul network may be connected to the macro base station 530 using a wired link, or may be integrated into the macro base station 530. The second DU 520-2 of the Xhaul network may be connected to the small base station 540 using a wired link, or may be integrated into the small base station 540. The fourth DU 520-4 of the Xhaul network may be connected to the TRP 550 using a wired link, or may be integrated into the TRP 550.

The CU 520-6 may be connected to a termination communication node (e.g., the UPF/AMF 510-1) of the core network using a wired link. The CU 520-6 connected to the termination communication node of the core network may be referred to as an 'aggregator'. The communications between the plurality of CU/DUs 520-1, 520-2, 520-3, 520-4, 520-5, and 520-6 may be performed using the Xhaul protocol. The packets (e.g., data, control information) to which the Xhaul protocol is applied may be transmitted to each of the core network and the access network via the Xhaul link.

The macro base station 530 may provide communication services to the first terminal 560-1 using an access protocol (e.g., 4G communication protocol, 5G communication protocol), and may be connected to the first DU 520-1 via a wired link. The macro base station 530 may be connected to the core network via the Xhaul network, and a link of 'macro base station 530-first DU 520-1-CU 520-6-UPF/AMF 510-1' may be referred to as a 'backhaul link'. The small base station 540 may provide communication services to the second terminal 560-2 using an access protocol (e.g., 4G communication protocol, 5G communication protocol), and may be connected to the second DU 520-2 using a wired link. The small base station 540 may be connected to the core network via the Xhaul network, and a link of 'small base station 540-second DU 520-2-third DU 520-3-CU 520-6-UPF/AMF 510-1' may be referred to as a 'backhaul link'.

The TRP 550 may provide communication services to the third terminal 560-3 using an access protocol (e.g., 4G communication protocol, 5G communication protocol), and may be connected to the fourth DU 520-4 using a wired link. The TRP 550 may support a remote radio transmission and reception function among all the functions of the communication protocol, and the baseband processing function for the TRP 550 may be performed by the BBU block 570. A link (e.g., a link of 'TRP 550-fourth DU 520-4-BBU block 570 (or, fifth DU 520-5)') between the TRP 550 performing the remote radio transmission and reception function and the BBU block 570 performing the baseband processing function may be referred to as a 'fronthaul link', and a link (e.g., a link of 'BBU block 570 (or, fifth DU 520-5)-CU 520-6-UPF/AMF 510-1') between the BBU block 570 and the UPF/AMF 510-1 may be referred to as a 'backhaul link'. For example, the fronthaul link may be configured differently depending on the location of the BBU block 570 performing the baseband processing function.

Meanwhile, referring to FIGS. 4 and 5, when the functional split technique is applied, the CUs 420-3 and 520-6 and the DUs 420-1, 420-2, 520-1, 520-2, 520-3, 520-4, and 520-5 may perform different functions. The CUs 420-3 and 520-6 may be gNB-CUs of the NR communication system, and the DUs 420-1, 420-2, 520-1, 520-2, 520-3, 520-4, and 520-5 may be gNB-DUs of the NR communication system. The CUs 420-3 and 520-6 may control operations of one or more of the DUs 420-1, 420-2, 520-1, 520-2, 520-3, 520-4, and 520-5, and may be logical nodes performing radio resource control (RRC) functions, service data adaptation protocol (SDAP) functions, and/or packet data convergence protocol (PDCP) functions. The DUs 420-1, 420-2, 520-1, 520-2, 520-3, 520-4, and 520-5 may be logical nodes performing radio link control (RLC) functions, medium access control (MAC) functions, and/or physical (PHY) functions (e.g., some PHY functions).

One DU 420-1, 420-2, 520-1, 520-2, 520-3, 520-4, or 520-5 may support one or more cells, and one cell may support one DU 420-1, 420-2, 520-1, 520-2, 520-3, 520-4, or 520-5. The operations (e.g., some operations) of the DUs 420-1, 420-2, 520-1, 520-2, 520-3, 520-4, and 520-5 may be controlled by the CUs 420-3 and 520-6, and communications between the DUs 420-1, 420-2, 520-1, 520-2, 520-3, 520-4, and 520-5 and the CUs 420-3 and 520-6 may be performed through F1 interfaces.

Depending on the configurations, roles and/or attributes of the nodes for the functional split, the DUs 420-2, 520-3, and 520-5 for relaying may exist in communication sections between the DUs 420-1, 520-1, 520-2, and 520-4 and the CUs 420-3 and 520-6. In this case, relay links may be formed between the DUs 420-1, 520-1, 520-2, and 520-4 and the DUs 420-2, 520-3, and 520-5. The DUs 420-1 and 520-4 may be connected to the TRPs 430 and 550 wirelessly or wiredly. The DUs 520-1 and 520-2 may be configured as integrated with the base stations 530 and 540.

Figure 6:
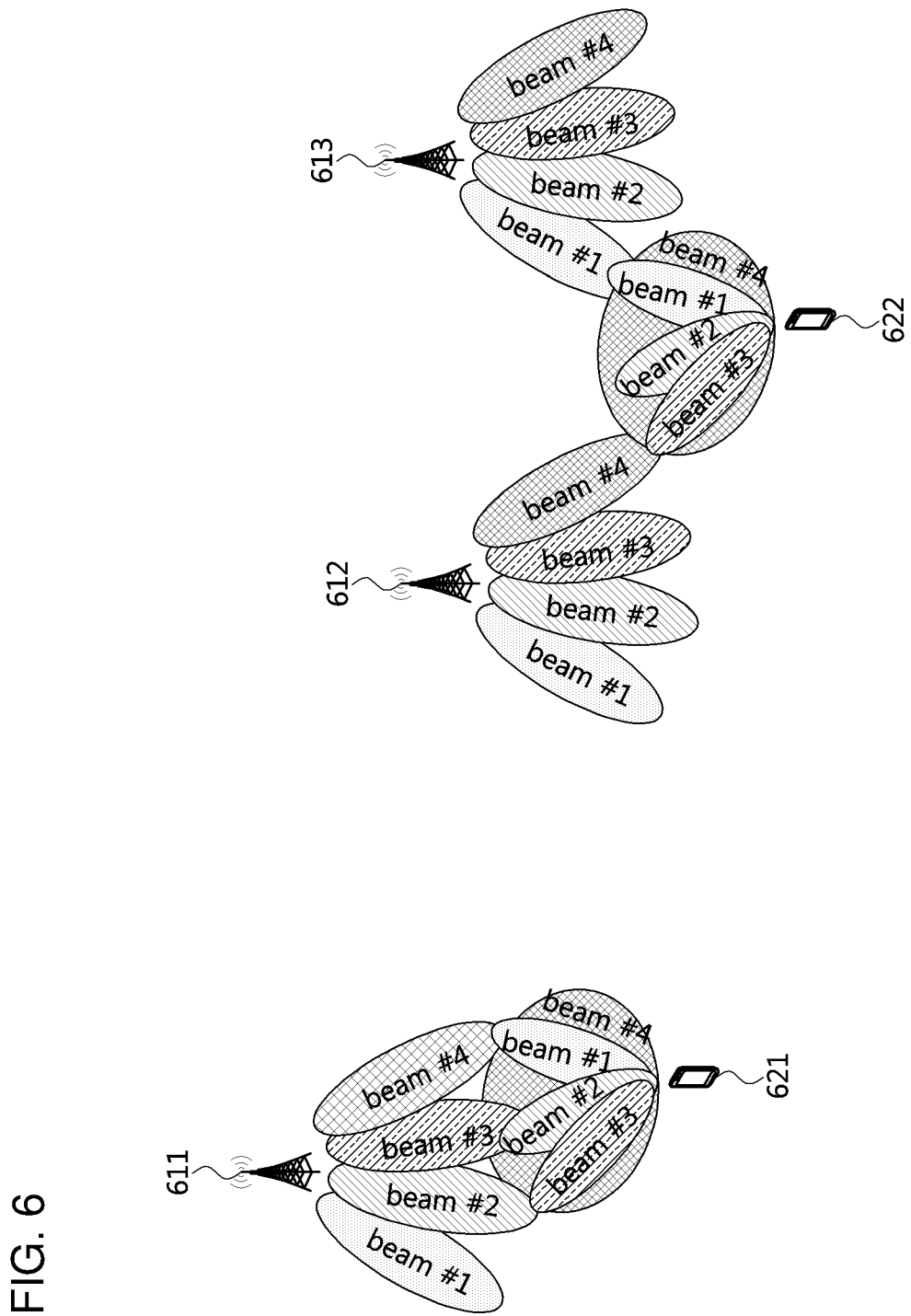
FIG. 6 is a conceptual illustrating a first exemplary embodiment of a beamforming-based communication method in a communication system.

FIG. 6 is a conceptual illustrating a first exemplary embodiment of a beamforming-based communication method in a communication system.

Referring to FIG. 6, a communication system may include base stations 611, 612 and 613, terminals 621 and 622, and the like, and the communication nodes (e.g., base stations, terminals) may perform communications based on a beamforming scheme. For example, each of the base stations 611, 612 and 613 may communicate using a plurality of beams (e.g., beams #1 to #4), and each of the terminals 621 and 622 may also communicate using a plurality of beams (e.g., beams #1 to #4).

An operation state of the first terminal 621 may be a state in which a connection establishment with the first base station 611 is completed. For example, the operation state of the first terminal 621 may be a radio resource control (RRC) connected state or an RRC inactive state. Alternatively, the first terminal 621 may operate in an RRC idle state within a service area of the first base station 611. An operation state of the second terminal 622 may be a state in which a connection establishment with the second base station 612 or the third base station 613 is completed. For example, the operation state of the second terminal 622 may be an RRC connected state or an RRC inactive state. Alternatively, the second terminal 622 may operate in an RRC idle state within a service area of the second base station 612 or the third base station 613.

The base stations 611, 612, and 613 may support mobility functions and thus the mobility of the terminals 621 and 622 may be ensured between the base stations 611, 612, and 613. Signals received from the terminals 621 and 622 may be used by the base stations 611, 612, and 613 to select an optimal beam.

A beam pair (e.g., a transmission beam (beam #3)—a reception beam (beam #2)) may be configured between the first base station 611 and the first terminal 621, and a communication service may be provided using the beam pair. Here, the reception beam may be a reception direction of the first terminal 621. The beam pair may be reconfigured according to a change in a radio channel quality between the first base station 611 and the first terminal 621. For example, the transmission beam of the first base station 611 may be changed from the beam #3 to the beam #2 or the beam #4, and the reception beam (e.g., reception direction) of the first terminal 621 may be changed from the beam #2 to the beam #1, the beam #3, or the beam #4.

Further, a beam pair may be configured between the second base station 612 and the second terminal 622, and a communication service may be provided using the beam pair. According to a change in a radio channel quality between the second base station 612 and the second terminal 622 and/or movement of the second terminal 622, the second terminal 622 may be connected to the third base station 613 by performing a handover procedure, and a beam pair may be configured between the third base station 613 and the second terminal 622. That is, in order to change the beam pair, mobility support functions and radio resource management functions based on a handover procedure may be performed.

In order to perform the mobility support function and the radio resource management function, the base station may transmit a synchronization signal (e.g., a synchronization signal/physical broadcast channel (SS/PBCH) block) and/or a reference signal. In order to support multiple numerologies, frame formats supporting symbols having different lengths may be configured. In this case, the terminal may perform a monitoring operation of the synchronization signal and/or reference signal in a frame according to an initial numerology, a default numerology, or a default symbol length. Each of the initial numerology and the default numerology may be applied to a frame format applied to radio resources in which a UE-common search space is configured, a frame format applied to radio resources in which a control resource set (CORESET) #0 of the NR communication system is configured, and/or a frame format applied to radio resources in which a synchronization symbol burst capable of identifying a cell in the NR communication system is transmitted.

The frame format may refer to information of configuration parameters (e.g., values of the configuration parameters, offset, index, identifier, range, periodicity, interval, duration, etc.) for a subcarrier spacing, a control channel (e.g., CORESET), a symbol, a slot, and/or a reference signal. The base station may inform the frame format to the terminal using system information and/or a control message (e.g., dedicated control message).

The terminal connected to the base station may transmit a reference signal (e.g., uplink dedicated reference signal) to the base station using resources configured by the corresponding base station. For example, the uplink dedicated reference signal may include a sounding reference signal (SRS). In addition, the terminal connected to the base station may receive a reference signal (e.g., downlink dedicated reference signal) from the base station in resources configured by the corresponding base station. The downlink dedicated reference signal may be a channel state information-reference signal (CSI-RS), a phase tracking-reference signal (PT-RS), a demodulation-reference signal (DM-RS), or the like. Each of the base station and the terminal may perform a beam management operation through monitoring on a configured beam or an active beam based on the reference signal.

For example, the first base station 611 may transmit a synchronization signal and/or a reference signal so that the first terminal 621 in its service area can search for itself to perform downlink synchronization maintenance, beam configuration, or link monitoring operations. Also, the first terminal 621 connected to the first base station 611 (e.g., serving base station) may receive physical layer radio resource configuration information for connection configuration and radio resource management from the first base station 611. The physical layer radio resource configuration information may mean configuration parameters included in RRC control messages of the LTE communication system or the NR communication system. For example, the resource configuration information may include PhysicalConfigDedicated, PhysicalCellGroupConfig, PDCCH-Config(Common), PDSCH-Config(Common), PDCCH-ConfigSIB1, ConfigCommon, PUCCH-Config(Common), PUSCH-Config(Common), BWP-DownlinkCommon, BWP-UplinkCommon, ControlResourceSet, RACH-ConfigCommon, RACH-ConfigDedicated, RadioResourceConfigCommon, RadioResourceConfigDedicated, ServingCellConfig, ServingCellConfigCommon, and the like.

The radio resource configuration information may include parameter values such as a configuration (or allocation) periodicity of a signal (or radio resource) according to a frame format of a base station (or transmission frequency), time resource allocation information for transmission, frequency resource allocation information for transmission, a transmission (or allocation) time, or the like. In order to support multiple numerologies, the frame format of the base station (or transmission frequency) may mean a frame format having different symbol lengths according to a plurality of subcarrier spacings within one radio frame. For example, the number of symbols constituting each of a mini-slot, a slot, and a subframe that exist within one radio frame (e.g., a frame of 10 ms) may be configured differently.

- Configuration information of transmission frequency and frame format of base station
- Transmission frequency information: information on all transmission carriers (i.e., cell-specific transmission frequency) in the base station, information on BWPs in the base station, information on a transmission time reference or time difference between transmission frequencies in the base station (e.g., transmission periodicity or offset parameter indicating the transmission reference time (or time difference) of the synchronization signal), etc.
- Frame format information: configuration parameters of a mini-slot, slot, subframe that supports a plurality of symbol lengths according to SCS Configuration information of downlink reference signal (e.g., channel state information-reference signal (CSI-RS), common reference signal (Common-RS), etc.)
- Configuration parameters such as a transmission periodicity, a transmission position, a code sequence, or a masking (or scrambling) sequence for a reference signal commonly applied in the coverage of the base station (or beam).
- Configuration information of uplink control signal
- Configuration parameters such as a sounding reference signal (SRS), uplink beam sweeping (or beam monitoring) reference signal (RS), uplink grant-free radio resources, or uplink radio resources (or RA preamble) for random access, etc.
- Configuration information of physical downlink control channel (e.g., PDCCH)
- Configuration parameters such as a reference signal for PDCCH demodulation, a beam common reference signal (e.g., a reference signal that can be received by all terminals in a beam coverage), a beam sweeping (or beam monitoring) reference signal, a reference signal for channel estimation, etc.
- Configuration information of physical uplink control channel (e.g., PUCCH)
- Scheduling request signal configuration information
- Configuration information for a feedback (ACK or NACK) transmission resource for supporting HARQ functions, etc.
- Number of antenna ports, antenna array information, beam configuration or beam index mapping information for application of beamforming techniques
- Configuration information of downlink and/or uplink signals (or uplink access channel resource) for beam sweeping (or beam monitoring)
- Configuration information of parameters for beam configuration, beam recovery, beam reconfiguration, or radio link re-establishment operation, a beam change operation within the same base station, a reception signal of a beam triggering handover execution to another base station, timers controlling the above-described operations, etc.

In case of a radio frame format that supports a plurality of symbol lengths for supporting multi-numerology, the configuration (or allocation) periodicity of the parameter, the time resource allocation information, the frequency resource allocation information, the transmission time, and/or the allocation time, which constitute the above-described information, may be information configured for each corresponding symbol length (or subcarrier spacing).

In the following exemplary embodiments, 'Resource-Config information' may be a control message including one or more parameters among the radio resource configuration information of the physical layer. In addition, the 'Resource-Config information' may mean attributes and/or configuration values (or range) of information elements (or parameters) delivered by the control message. The information elements (or parameters) delivered by the control message may be radio resource configuration information applied commonly to the entire coverage of the base station (or, beam) or radio resource configuration information allocated dedicatedly to a specific terminal (or, specific terminal group).

The configuration information included in the 'Resource-Config information' may be transmitted through one control message or different control messages according to the attributes of the configuration information. The beam index information may not express the index of the transmission beam and the index of the reception beam distinctly. For example, the beam index information may be expressed using a reference signal mapped or associated with the corresponding beam index or an index (or identifier) of a transmission configuration indicator (TCI) state for beam management.

Therefore, the first terminal 621 operating in the RRC connected state may receive a communication service through a beam (e.g., beam pair) configured between the first terminal 621 and the first base station 611. For example, when a communication service is provided using the beam #3 of the first base station 611 and the beam #2 of the first terminal 621, the first terminal 621 may perform a search operation or a monitoring operation of a radio channel by using a synchronization signal and/or a reference signal transmitted through the beam #3 of the first base station 611. Here, the expression that a communication service is provided through a beam may mean that a packet is transmitted and received through an active beam among one or more configured beams. In the NR communication system, the expression that a beam is activated may mean that a configured TCI state is activated.

The terminal 621 may operate in the RRC idle state or the RRC inactive state. In this case, the terminal 621 may perform a search operation (e.g., monitoring operation) of a downlink channel by using parameter(s) obtained from the system information or the common Resource-Config information. In addition, the terminal 621 operating in the RRC idle state or the RRC inactive state may attempt to access by using an uplink channel (e.g., a random access channel or a physical layer uplink control channel). Alternatively, the terminal 621 may transmit control information by using an uplink channel.

The terminal 621 may recognize or detect a radio link problem by performing a radio link monitoring (RLM) operation. Here, the expression that a radio link problem is detected may mean that physical layer synchronization configuration or maintenance for a radio link has a problem. For example, the expression that a radio link problem is detected may mean that it is detected that the physical layer synchronization between the base station 611 and the terminal 621 is not maintained during a preconfigured time. When a radio link problem is detected, the terminal may perform a recovery operation of the radio link. When the radio link is not recovered, the terminal may declare a radio link failure (RLF) and perform a re-establishment procedure of the radio link.

The procedure for detecting a physical layer problem of a radio link, the procedure for recovering a radio link, the procedure for detecting (or declaring) a radio link failure, and the procedure for re-establishing a radio link according to the RLM operation may be performed by functions of the layer 1 (e.g., physical layer), the layer 2 (e.g., MAC layer, RLC layer, PDCP layer, etc.), and/or the layer 3 (e.g., RRC layer) of the radio protocol.

The physical layer of the terminal may monitor a radio link by receiving a downlink synchronization signal (e.g., primary synchronization signal (PSS), secondary synchronization signal (SSS), SS/PBCH block) and/or a reference signal. In this case, the reference signal may be a base station common reference signal, a beam common reference signal, or a terminal (or terminal group) specific reference signal (e.g., a dedicated reference signal allocated to a terminal (or terminal group)). Here, the common reference signal may be used for channel estimation operations of all terminals located within a corresponding base station or beam coverage (or service area). The dedicated reference signal may be used for a channel estimation operation of a specific terminal or a specific terminal group located within a base station or beam coverage.

Accordingly, when the base station or the beam (e.g., the configured beam between the base station and the terminal) is changed, the dedicated reference signal for beam management may be changed. The beam may be changed based on the configuration parameter(s) between the base station and the terminal. A procedure for changing the configured beam may be required. The expression that a beam is changed in the NR communication system may mean that an index (or identifier) of a TCI state is changed to an index of another TCI state, that a TCI state is newly configured, or that a TCI state is changed to an active state. The base station may transmit system information including configuration information of the common reference signal to the terminal. The terminal may obtain the common reference signal based on the system information. In a handover procedure, a synchronization reconfiguration procedure, or a connection reconfiguration procedure, the base station may transmit a dedicated control message including the configuration information of the common reference signal to the terminal.

In order to provide service continuity between the base station and the terminal, a method in which the base station allocates a plurality of beams to one terminal for service provision may be considered. For example, in the exemplary embodiment shown in FIG. 6, the base stations 611, 612, and 613 may allocate a plurality of beams to the terminals 621 and 622. The base station 611 may allocate the beams #2 to #4 to the terminal 621. The base station 612 may allocate the beams #3 and #4 to the terminal 622. A procedure for allocating the plurality of beams may be performed in consideration of the movement speed, movement direction, and location information of the terminal, a radio channel quality, and/or beam interferences. For example, when the movement speed of the terminal 621 is low, the base station 611 may allocate the contiguous beams #2 and #3 to the terminal 621. When the movement speed of the terminal 621 is high, the base station 611 may allocate the non-contiguous beams #2 and #4 to the terminal 621.

The base station 612 may allocate the beams #3 and #4 to the terminal 622, and provide a service to the terminal 622 by using the beams #3 and #4. In this case, the terminal 622 may move from the coverage of the base station 612 to the coverage of the base station 613. When the cell (or sector) of the base station 612 is different from the cell (or sector) of the base station 613, the terminal 622 may perform a handover procedure. In the handover procedure, the base station 612 may transmit a handover (or mobility) control message including beam configuration information (e.g., configuration information of the beams #1 and #2) of the base station 613 to the terminal 622. The terminal 622 may receive the beam configuration information of the base station 613 from the base station 612.

The beam configuration information may include indexes of a transmission beam and/or a reception beam configured according to a result of the beam monitoring operation or the beam measurement operation, configuration information of each beam (e.g., transmission power, beam width, vertical angle, horizontal angle, etc.), transmission and/or reception timing information of each beam (e.g., subframe index, slot index, mini-slot index, symbol index, offset), configuration information of a reference signal of each beam (e.g., sequence, index), or the like. In order to allocate the plurality of beams, control messages including configuration information of the plurality of beams, information on a mobility status of the terminal (e.g., movement speed, movement direction, location information, etc.), the beam monitoring (or, measurement) result, etc. may be transmitted and received between the base stations 612 and 613 and the terminal 622. Here, the control message may be a control signaling message for performing the handover.

The base station 612 may allocate the beams #3 and #4 to the terminal 622, and provide a service to the terminal 622 by using the beams #3 and #4. In this case, the terminal 622 may move from the coverage of the base station 612 to the coverage of the base station 613. When the cell (or sector) of the base station 612 is the same as the cell (or sector) of the base station 613, a procedure for changing the transmission node within the cell may be performed. In this case, the base stations 612 and 613 may be transmission nodes (e.g., RRH, TRP) to which the functional split is applied. For example, the base stations 612 and 613 may support function(s) of some layer(s) among the physical layer (i.e., PHY layer), MAC layer, RLC layer, PDCP layer, adaptation layer, and RRC layer. Here, the adaptation layer may be a higher layer than the PDCP layer. The adaptation layer may perform a function of mapping between a QoS flow and a data radio bearer (DRB) and/or a function of marking a QoS flow identifier for a downlink (or uplink) packet.

When the base stations 612 and 613 belonging to the same cell support function(s) of some layer(s) other than the RRC layer among the radio protocol layers, the terminal 622 may perform a change procedure from the base station 612 to the base station 613 by exchanging MAC layer control messages (e.g., MAC control element (CE) or control protocol data unit (PDU), etc.) without exchanging RRC layer control messages.

The layer(s) performing functions of generating, transmitting, or receiving the control messages for changing the base station may be determined according to the layer(s) included in the base stations 612 and 613. For example, when the base stations 612 and 613 include from the physical layer to the MAC layer or from the physical layer to the RLC layer, the control messages for changing the base station may be generated, transmitted, or received in a higher layer than the MAC layer (or RLC layer). The MAC functions (or MAC functions and RLC functions) of the base stations 612 and 613 and the terminal 622 may be newly configured after being reset.

When the base stations 612 and 613 support only some function(s) of the MAC layer or when base stations 612 and 613 support only the function(s) of the physical layer, the control messages for changing the base station may be generated, transmitted, or received by the MAC layer. The procedure for changing the base station may be performed without resetting the MAC functions of the base stations 612 and 613 and the terminal 622.

In the procedure for changing the base station, information for identifying the base station may be delivered to the terminal 622 by using a control message of the RRC layer, a control message of the MAC layer, or a physical layer control channel according to the layer(s) included in the base stations 612 and 613. In the exemplary embodiments, the control message of the RRC layer may be referred to as an 'RRC control message' or 'RRC message', the control message of the MAC layer may be referred to as a 'MAC control message' or 'MAC message', and the physical layer control channel may be referred to as a 'PHY control channel', 'PHY control message', or 'PHY message'.

Here, the information for identifying the base station may include one or more among a base station identifier, reference signal information, reference symbol information, configured beam information, and configured TCI state information. The reference signal information (or reference symbol information) may include configuration information (e.g., radio resource, sequence, index) of a reference signal allocated to each base station, and/or configuration information (e.g., radio resource, sequence, index) of a dedicated reference signal allocated to the terminal.

Here, the radio resource information of the reference signal may include time domain resource information (e.g., frame index, subframe index, slot index, symbol index) and frequency domain resource information (e.g., a parameter indicating a relative or absolute position of subcarriers). The parameters indicating the radio resource of the reference signal may be a resource element (RE) index, a resource set index, a resource block (RB) index, a subcarrier index, or the like. The RB index may be a physical resource block (PRB) index or a common resource block (CRB) index.

In the following exemplary embodiments, the reference signal information may include transmission periodicity information, sequence information (e.g., code sequence), masking information (e.g., scrambling information), radio resource information, and/or index information of the reference signal. The reference signal identifier may mean a parameter (e.g., resource ID, resource set ID) used to identify each of a plurality of reference signal information. The reference signal information may refer to the configuration information of the reference signal.

The configured beam information may include a configured beam index (or identifier), a configured TCI state index (or identifier), configuration information of each beam (e.g., transmission power, beam width, vertical angle, horizontal angle), transmission and/or reception timing information of each beam (e.g., subframe index, slot index, mini-slot index, symbol index, offset), reference signal information corresponding to each beam, and a reference signal identifier.

In the exemplary embodiments, the base station may be a base station installed in the air. For example, the base station may be installed on an unmanned aerial vehicle (e.g., drone), a manned aircraft, or a satellite.

The terminal may receive configuration information of the base station (e.g., identification information of the base station) from the base station through one or more of an RRC message, a MAC message, and a PHY message, and may identify a base station with which the terminal performs a beam monitoring operation, a radio access operation, and/or a control (or data) packet transmission and reception operation.

When a plurality of beams are configured, communications between the base station and the terminal may be performed using the plurality of beams. In this case, the number of downlink beams may be the same as the number of uplink beams. Alternatively, the number of downlink beams may be different from the number of uplink beams. For example, the number of downlink beams may be two or more, and the number of uplink beams may be one.

When a plurality of beams are configured, communications between the base station and the terminal may be performed using some beam(s) among the plurality of beams, and the remaining beam(s) may be configured as reserved beam(s) or candidate beam(s). For example, control information and data may not be transmitted through the reserved beam(s) and/or candidate beam(s). The plurality of beams may be classified into a primary beam, a secondary beam, and a reserved beam(s) (or candidate beam(s)). In the NR communication system, configuring a plurality of beams may mean that configured TCI state identifiers (IDs) are configured by classifying them into a primary TCI state, a secondary TCI state, and a reserved TCI state.

For example, the primary beam (e.g., a beam for a primary TCI state ID) may mean a beam capable of transmitting and receiving data and control information. The secondary beam (e.g., a beam for a secondary TCI state ID or a beam for a deactivated TCI state ID) may mean a beam capable of transmitting and receiving data excluding control information. The expression that control information is excluded may mean that control signaling by the physical layer, the layer 2 (e.g., MAC layer, RLC layer, PDCP layer), and/or the layer 3 (e.g., RRC layer) is restricted for the respective layers, that the control signaling is partially restricted according to functions of the physical layer, the layer 2, and/or the layer 3, or that the control signaling is restricted according to the type of the control message.

The control message (e.g., RRC message, MAC message, and PHY message) may be a control message used for a discontinuous transmission/reception operation (e.g., discontinuous reception (DRX) operation, discontinuous transmission (DTX) operation), a retransmission operation, a connection configuration/management operation, a measurement/reporting operation, a paging operation, and/or an access operation.

The reserved (or candidate) beam (e.g., a beam for a reserved TCI state ID or a beam for a deactivated TCI state ID) may not be used for transmission and reception of data and/or control information. The reserved (or candidate) beam may be a beam used for a beam monitoring operation and a beam measurement/reporting operation for beam matching (or configuration) of the base station and/or the terminal.

Therefore, the measurement result for the reserved (or candidate) beam may be reported through the primary beam or the secondary beam. The measurement/reporting operation for the reserved (or candidate) beam may be performed based on preconfigured parameter(s). Alternatively, the measurement/reporting operation for the reserved (or candidate) beam may be performed according to determination of the terminal or event conditions. The measurement/reporting operation for the reserved (or candidate) beam may be performed periodically or aperiodically.

The result of the measurement operation (e.g., beam monitoring operation) for the reserved (or candidate) beam may be reported through a physical layer control channel (e.g., PUCCH) and/or a MAC message (e.g., MAC CE, control PDU). Here, the result of the beam monitoring operation may be a measurement result for one or more beams (or beam groups). For example, the result of the beam monitoring operation may be a measurement result for beams (or beam groups) according to a beam sweeping operation of the base station.

The base station may obtain the result of the beam measurement operation or the beam monitoring operation from the terminal, and may change the properties of the beam or the properties of the TCI state based on the result of the beam measurement operation or the beam monitoring operation. The beam may be classified into a primary beam, a secondary beam, a reserved (or candidate) beam, an active beam, and a deactivated beam according to its properties. The TCI state may be classified into a primary TCI state, a secondary TCI state, a reserved (or candidate) TCI state, a serving TCI state, a configured TCI state, an active TCI state, and a deactivated TCI state according to its properties. Each of the primary TCI state and the secondary TCI state may be assumed to be an active TCI state and a serving TCI state. The reserved (or candidate) TCI state may be assumed to be a deactivated TCI state or a configured TCI state.

A procedure for changing the beam (or TCI state) property may be controlled by the RRC layer and/or the MAC layer. When the procedure for changing the beam (or TCI state) property is controlled by the MAC layer, the MAC layer may inform the higher layer of information regarding a change in the beam (or TCI state) property. The information regarding the change in the beam (or TCI state) property may be transmitted to the terminal through a MAC message and/or a physical layer control channel (e.g., PDCCH). The information regarding the change in the beam (or TCI state) property may be included in downlink control information (DCI) or uplink control information (UCI). The information regarding the change in the beam (or TCI state) property may be expressed as a separate indicator or field.

The terminal may request to change the property of the TCI state based on the result of the beam measurement operation or the beam monitoring operation. The terminal may transmit control information (or feedback information) requesting to change the property of the TCI state to the base station by using one or more of a PHY message, a MAC message, and an RRC message. The control information (or feedback information, control message, control channel) requesting to change the property of the TCI state may be configured using one or more of the configured beam information described above.

The change in the property of the beam (or TCI state) may mean a change from the active beam to the deactivated beam, a change from the deactivated beam to the active beam, a change from the primary beam to the secondary beam, a change from the secondary beam to the primary beam, a change from the primary beam to the reserved (or candidate) beam, or a change from the reserved (or candidate) beam to the primary beam. The procedure for changing the property of the beam (or TCI state) may be controlled by the RRC layer and/or the MAC layer. The procedure for changing the property of the beam (or TCI state) may be performed through partial cooperation between the RRC layer and the MAC layer.

When a plurality of beams are allocated, one or more beams among the plurality of beams may be configured as beam(s) for transmitting physical layer control channels. For example, the primary beam and/or the secondary beam may be used for transmission and reception of a physical layer control channel (e.g., PHY message). Here, the physical layer control channel may be a PDCCH or a PUCCH. The physical layer control channel may be used for transmission of one or more of scheduling information (e.g., radio resource allocation information, modulation and coding scheme (MCS) information), feedback information (e.g., channel quality indication (CQI), preceding matrix indicator (PMI), HARQ ACK, HARQ NACK), resource request information (e.g., scheduling request (SR)), a result of the beam monitoring operation for supporting beamforming functions, a TCI state ID, and measurement information for the active beam (or deactivated beam).

The physical layer control channel may be configured to be transmitted through the primary beam of downlink. In this case, the feedback information may be transmitted and received through the primary beam, and data scheduled by the control information may be transmitted and received through the secondary beam. The physical layer control channel may be configured to be transmitted through the primary beam of uplink. In this case, the resource request information (e.g., SR) and/or the feedback information may be transmitted and received through the primary beam.

In the procedure of allocating the plurality of beams (or the procedure of configuring the TCI states), the allocated (or configured) beam indexes, information indicating a spacing between the beams, and/or information indicating whether contiguous beams are allocated may be transmitted and received through a signaling procedure between the base station and the terminal. The signaling procedure of the beam allocation information may be performed differently according to status information (e.g., movement speed, movement direction, location information) of the terminal and/or the quality of the radio channel. The base station may obtain the status information of the terminal from the terminal. Alternatively, the base station may obtain the status information of the terminal through another method.

The radio resource information may include parameter(s) indicating frequency domain resources (e.g., center frequency, system bandwidth, PRB index, number of PBRs, CRB index, number of CRBs, subcarrier index, frequency offset, etc.) and parameter(s) indicating time domain resources (e.g., radio frame index, subframe index, transmission time interval (TTI), slot index, mini-slot index, symbol index, time offset, and periodicity, length, or window of transmission period (or reception period)). In addition, the radio resource information may further include a hopping pattern of radio resources, information for beamforming (e.g., beam shaping) operations (e.g., beam configuration information, beam index), and information on resources occupied according to characteristics of a code sequence (or bit sequence, signal sequence).

The name of the physical layer channel and/or the name of the transport channel may vary according to the type (or attribute) of data, the type (or attribute) of control information, a transmission direction (e.g., uplink, downlink, sidelink), and the like.

The reference signal for beam (or TCI state) or radio link management may be a synchronization signal (e.g., PSS, SSS, SS/PBCH block), CSI-RS, PT-RS, SRS, DM-RS, or the like. The reference parameter(s) for reception quality of the reference signal for beam (or TCI state) or radio link management may include a measurement time unit, a measurement time interval, a reference value indicating an improvement in reception quality, a reference value indicating a deterioration in reception quality, or the like. Each of the measurement time unit and the measurement time interval may be configured in units of an absolute time (e.g., millisecond, second), TTI, symbol, slot, frame, subframe, scheduling periodicity, operation periodicity of the base station, or operation periodicity of the terminal.

The reference value indicating the change in reception quality may be configured as an absolute value (dBm) or a relative value (dB). In addition, the reception quality of the reference signal for beam (or TCI state) or radio link management may be expressed as a reference signal received power (RSRP), a reference signal received quality (RSRQ), a received signal strength indicator (RSSI), a signal-to-noise ratio (SNR), a signal-to-interference ratio (SIR), or the like.

Meanwhile, in the NR communication system using a millimeter frequency band, flexibility for a channel bandwidth operation for packet transmission may be secured based on a bandwidth part (BWP) concept. The base station may configure up to 4 BWPs having different bandwidths to the terminal. The BWPs may be independently configured for downlink and uplink. That is, downlink BWPs may be distinguished from uplink BWPs. Each of the BWPs may have a different subcarrier spacing as well as a different bandwidth. For example, BWPs may be configured as follows.

Figure 7:
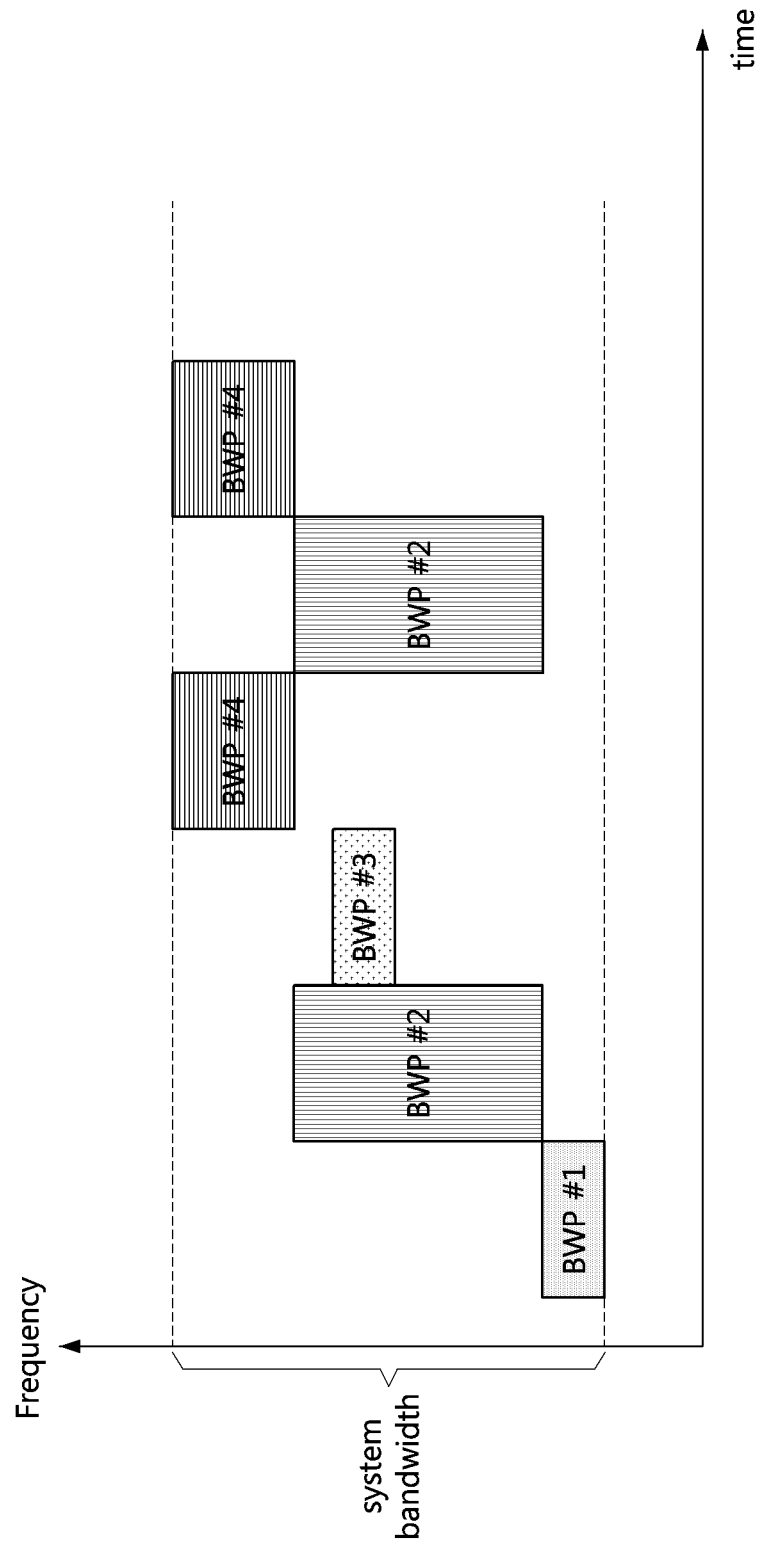
FIG. 7 is a conceptual diagram illustrating a first exemplary embodiment of a method for configuring bandwidth parts (BWPs) in a communication system.

FIG. 7 is a conceptual diagram illustrating a first exemplary embodiment of a method for configuring bandwidth parts (BWPs) in a communication system.

As shown in FIG. 7, a plurality of bandwidth parts (e.g., BWPs #1 to #4) may be configured within a system bandwidth of the base station. The BWPs #1 to #4 may be configured not to be larger than the system bandwidth of the base station. The bandwidths of the BWPs #1 to #4 may be different, and different subcarrier spacings may be applied to the BWPs #1 to #4. For example, the bandwidth of the BWP #1 may be 10 MHz, and the BWP #1 may have a 15 kHz subcarrier spacing. The bandwidth of the BWP #2 may be 40 MHz, and the BWP #2 may have a 15 kHz subcarrier spacing. The bandwidth of the BWP #3 may be 10 MHz, and the BWP #3 may have a 30 kHz subcarrier spacing. The bandwidth of the BWP #4 may be 20 MHz, and the BWP #4 may have a 60 kHz subcarrier spacing.

The BWPs may be classified into an initial BWP (e.g., first BWP), an active BWP (e.g., activated BWP), and a default BWP. The terminal may perform an initial access procedure (e.g., access procedure) with the base station in the initial BWP. One or more BWPs may be configured through an RRC connection configuration message, and one BWP among the one or more BWPs may be configured as the active BWP. Each of the terminal and the base station may transmit and receive packets in the active BWP among the configured BWPs. Therefore, the terminal may perform a monitoring operation on control channels for packet transmission and reception in the active BWP.

The terminal may switch the operating BWP from the initial BWP to the active BWP or the default BWP. Alternatively, the terminal may switch the operating BWP from the active BWP to the initial BWP or the default BWP. The BWP switching operation may be performed based on an indication of the base station or a timer. The base station may transmit information indicating the BWP switching to the terminal using one or more of an RRC message, a MAC message (e.g., MAC control element (CE)), and a PHY message (e.g., DCI). The terminal may receive the information indicating the BWP switching from the base station, and may switch the operating BWP of the terminal to a BWP indicated by the received information.

When a random access (RA) resource is not configured in the active uplink (UL) BWP in the NR communication system, the terminal may switch the operating BWP of the terminal from the active UL BWP to the initial UL BWP in order to perform a random access procedure. The operating BWP may be a BWP in which the terminal performs communication (e.g., transmission and reception operation of a signal and/or channel).

Measurement operations (e.g., monitoring operations) for beam (or TCI state) or radio link management may be performed at the base station and/or the terminal. The base station and/or the terminal may perform the measurement operations (e.g., monitoring operations) according to parameter(s) configured for the measurement operations (e.g., monitoring operations). The terminal may report a measurement result according to parameter(s) configured for measurement reporting.

When a reception quality of a reference signal according to the measurement result meets a preconfigured reference value and/or a preconfigured timer condition, the base station may determine whether to perform a beam (or, radio link) management operation, a beam switching operation, or a beam deactivation (or, activation) operation according to a beam blockage situation. When it is determined to perform a specific operation, the base station may transmit a message triggering execution of the specific operation to the terminal. For example, the base station may transmit a control message for instructing the terminal to execute the specific operation to the terminal. The control message may include configuration information of the specific operation.

When a reception quality of a reference signal according to the measurement result meets a preconfigured reference value and/or a preconfigured timer condition, the terminal may report the measurement result to the base station. Alternatively, the terminal may transmit to the base station a control message triggering a beam (or, radio link) management operation, a beam switching operation (or a TCI state ID change operation, a property change operation), or a beam deactivation operation (or a beam activation operation) according to a beam blockage situation. The control message may request to perform a specific operation.

A basic procedure for beam (or TCI state) management through the radio link monitoring may include a beam failure detection (BFD) procedure, a beam recovery (BR) request procedure, and the like for a radio link. An operation of determining whether to perform the beam failure detection procedure and/or the beam recovery request procedure, an operation triggering execution of the beam failure detection procedure and/or the beam recovery request procedure, and a control signaling operation for the beam failure detection procedure and/or the beam recovery request procedure may be performed by one or more of the PHY layer, the MAC layer, and the RRC layer.

The procedure for the terminal to access the base station (e.g., random access procedure) may be classified into an initial access procedure and a non-initial access procedure. The terminal operating in the RRC idle state may perform the initial access procedure. Alternatively, when there is no context information managed by the base station, the terminal operating in the RRC connected state may also perform the initial access procedure. The context information may include RRC context information, access stratum (AS) configuration information (e.g., AS context information), and the like. The context information may include one or more among RRC configuration information for the terminal, security configuration information for the terminal, PDCP information including a robust header compression (ROHC) state for the terminal, an identifier (e.g., cell-radio resource temporary identifier (C-RNTI)) for the terminal, and an identifier of the base station for which a connection configuration with the terminal has been completed.

The non-initial access procedure may refer to an access procedure performed by the terminal in addition to the initial access procedure. For example, the non-initial access procedure may be performed for an access request for transmission or reception data arrival at the terminal, connection resumption, resource allocation request, user (UE) request based information transmission request, link reconfiguration request after a radio link failure (RLF), mobility function (e.g., handover function) support, secondary cell addition/change, active beam addition/change, or physical layer synchronization configuration.

The random access procedure may be performed based on the initial access procedure or the non-initial access procedure according to the operation state of the terminal.

Figure 8:
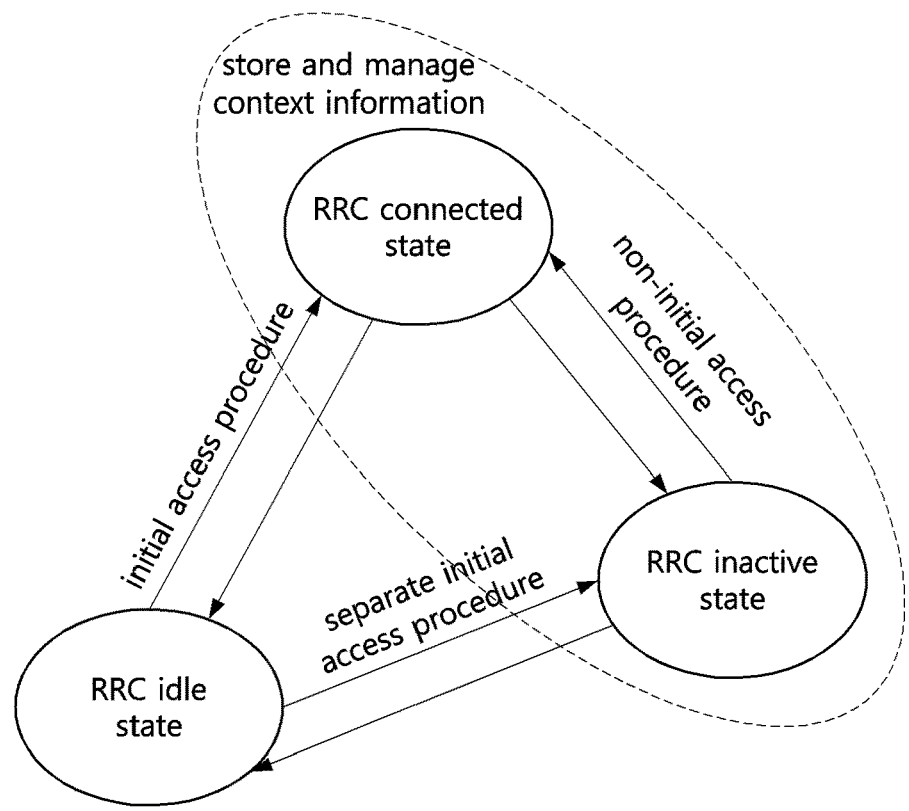
FIG. 8 is a conceptual diagram illustrating a first exemplary embodiment of operation states of a terminal in a communication system.

FIG. 8 is a conceptual diagram illustrating a first exemplary embodiment of operation states of a terminal in a communication system.

As shown in FIG. 8, operation states of the terminal may be classified into an RRC connected state, an RRC inactive state, and an RRC idle state. When the terminal operates in the RRC connected state or the RRC inactive state, a radio access network (RAN) (e.g., a control function block of the RAN) and the base station may store and manage RRC connection configuration information and/or context information (e.g., RRC context information, AS context information) of the corresponding terminal.

The terminal operating in the RRC connected state may receive configuration information of physical layer control channels and/or reference signals required for maintaining connection configuration and transmission/reception of data from the base station. The reference signal may be a reference signal for demodulating the data. Alternatively, the reference signal may be a reference signal for channel quality measurement or beamforming. Therefore, the terminal operating in the RRC connected state may transmit and receive the data without delay.

When the terminal operates in the RRC inactive state, mobility management functions/operations identical or similar to mobility management functions/operations supported in the RRC idle state may be supported for the corresponding terminal. That is, when the terminal operates in the RRC inactive state, a data bearer for transmitting and receiving data may not be configured, and functions of the MAC layer may be deactivated. Accordingly, the terminal operating in the RRC inactive state may transition the operation state of the terminal from the RRC inactive state to the RRC connected state by performing the non-initial access procedure to transmit data. Alternatively, the terminal operating in the RRC inactive state may transmit data having a limited size, data having a limited quality of service, and/or data associated with a limited service.

When the terminal operates in the RRC idle state, there may be no connection configuration between the terminal and the base station, and the RRC connection configuration information and/or context information (e.g., RRC context information, AS context information) of the terminal may be stored in the RAN (e.g., a control function block of the RAN) and the base station. In order to transition the operation state of the terminal from the RRC idle state to the RRC connected state, the terminal may perform the initial access procedure. Alternatively, when the initial access procedure is performed, the operation state of the terminal may transition from the RRC idle state to the RRC inactive state according to determination of the base station.

The terminal may transition from the RRC idle state to the RRC inactive state by performing the initial access procedure or a separate access procedure defined for the RRC inactive state. When a limited service is provided to the terminal, the operation state of the terminal may transition from the RRC idle state to the RRC inactive state. Alternatively, depending on capability of the terminal, the operation state of the terminal may transition from the RRC idle state to the RRC inactive state.

The base station and/or the control function block of the RAN may configure condition(s) for transitioning to the RRC inactive state by considering one or more of the type, capability, and service (e.g., a service currently being provided and a service to be provided) of the terminal, and may control the operation for transitioning to the RRC inactive state based on the configured condition(s). When the base station allows the transition to the RRC inactive state or when the transition to the RRC inactive state is configured to be allowed, the operation state of the terminal may be transitioned from the RRC connected state or the RRC idle state to the RRC inactive state.

Figure 9:
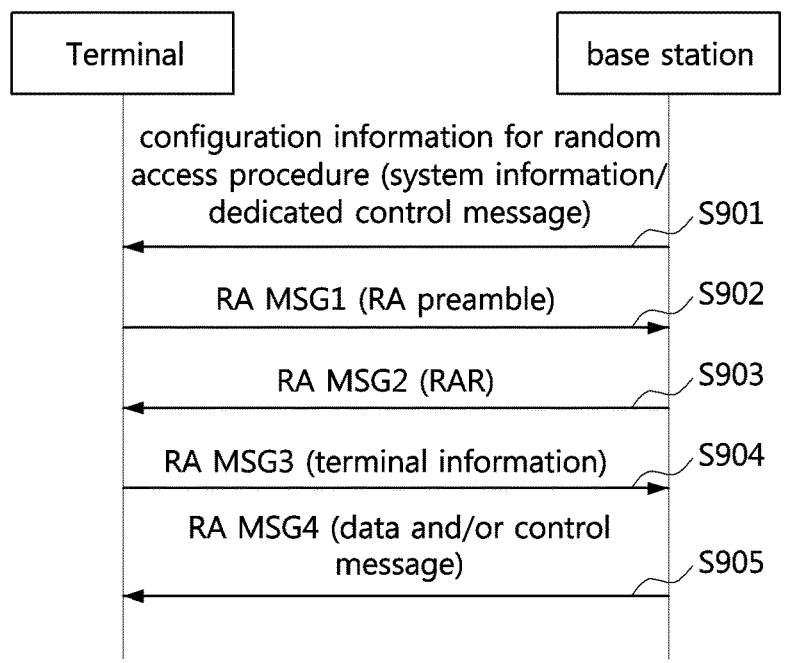
FIG. 9 is a sequence chart illustrating a first exemplary embodiment of a random access procedure in a communication system.

FIG. 9 is a sequence chart illustrating a first exemplary embodiment of a random access procedure in a communication system.

Referring to FIG. 9, a communication system may include a base station, a terminal, and the like. The base station may be the base station 110-1, 110-2, 110-3, 120-1, or 120-2 shown in FIG. 1, and the terminal may be the terminal 130-1, 130-2, 130-3, 130-4, 130-5, or 130-6 shown in FIG. 1. The base station and the terminal may be configured to be the same or similar to the communication node shown in FIG. 2. A random access procedure may be performed in four steps.

The base station may transmit system information and/or a control message including configuration information of a radio resource (e.g., uplink radio resource) for the random access procedure to the terminal (S901). The terminal may obtain the configuration information of the radio resource for the random access procedure by receiving the system information and/or control message from the base station. The system information may be common system information used for a plurality of base stations or base station-specific system information (e.g., cell-specific system information). The control message may be a dedicated control message.

The system information may be configured for each base station, for each beam group, or for each beam. The system information may include allocation information of a radio resource (e.g., uplink radio resource) for the random access procedure. The configuration information of the radio resource for the random access procedure may include one or more of transmission frequency information of the physical layer, system bandwidth information (or BWP configuration information), subcarrier spacing information, beam configuration information according to a beamforming technique (e.g., beam width, beam index), variable radio resource configuration information (e.g., radio resource reference value, offset) in the frequency and/or time domain, and inactive (or unused) radio resource region/interval information.

The terminal may transmit an RA-message 1 (RA-MSG1) including an RA preamble to the base station using the radio resource (e.g., physical random access channel (PRACH)) configured by the base station (S902). The message 1 including the RA preamble may be referred to as an 'RA MSG1' in the 4-step random access procedure, the RA preamble in the 4-step random access procedure may be referred to as a '4-step-RA preamble'.

The terminal may randomly select a code sequence (e.g., RA preamble, signature) defined for the random access procedure, and transmit the RA MSG1 including the selected code sequence. In a contention-based random access (CBRA) procedure, the terminal may randomly select the RA preamble. In a contention-free random access (CFRA) procedure, the base station may pre-allocate the RA preamble to the terminal. The pre-allocation of the RA preamble may mean that an index, masking information, etc. of the RA preamble for the RA MSG1 is allocated dedicatedly to the terminal. In this case, the terminal may perform the random access procedure (e.g., CFRA procedure) without competing with other terminals.

The base station may receive the RA MSG1 from the terminal. The base station may generate an RA MSG2 in response to the RA MSG1, and may transmit the RA MSG2 to the terminal (S903). In the 4-step random access procedure, the RA MSG2 may mean a message 2, a random access response (RAR), or an RA response message. The base station may identify information required by the terminal based on the RA MSG1 received in the step S902 or a radio resource through which the RA MSG1 is received. In this case, the base station may transmit the required information to the terminal in the step S903.

The identification of the required information at the terminal may mean identification of an on-demand transmission request of system information according to a request of the terminal, a transmission request of downlink data according to update of a firmware or essential software of the terminal, or an uplink resource allocation request based on the information received in the step S901 (e.g., a preamble index, a specific signal sequence (e.g., sequence, signature) for uplink resource request, a specific field value of an uplink control channel).

In this case, allocation information of an uplink radio resource may be transmitted in the step S903. Alternatively, the RA MSG2 may be transmitted on a PDCCH or a physical downlink shared channel (PDSCH).

In the step S903, the base station may transmit only a PDCCH (e.g., DCI) without an RA response message (e.g., RA MSG2) transmitted on the PDSCH. In this case, the corresponding DCI may include one or more among uplink resource allocation information (e.g., scheduling information), transmission timing adjustment information (e.g., a timing advance (TA) value, a TA command), transmission power adjustment information, backoff information, beam configuration information, TCI state information, configured scheduling (CS) state information, state transition information, PUCCH configuration information, the index of the RA MSG1 received in the step S902 (e.g., the index of the RA preamble), and uplink resource allocation information for transmission of an RA MSG3 in a step S904.

Here, the beam configuration information may be information indicating activation or deactivation of a specific beam. The TCI state information may be information indicating activation or deactivation of a specific TCI state. The CS state information may be information indicating activation or deactivation of radio resources allocated in the CS scheme. The state transition information may be information indicating transition of the operation state of the terminal shown in FIG. 8. The state transition information may indicate transition from a specific operation state to the RRC idle state, the RRC connected state, or the RRC inactive state. Alternatively, the state transition information may indicate maintaining of the current operation state. The PUCCH configuration information may be allocation information of scheduling request (SR) resources. Alternatively, the PUCCH configuration information may be information indicating activation or deactivation of SR resources.

When the base station transmits only the PDCCH (e.g., DCI) without the RA MSG2 in the step S903, the terminal may identify that there is no RA MSG2 transmitted on a PDSCH by using control information included in the PDCCH, a DCI format included in the PDCCH, and/or a scheduling identifier used for the transmission of the PDCCH. The base station may transmit scheduling information of the RA MSG2 to the terminal using a random access (RA)-RNTI. For example, a cyclic redundancy check (CRC) of the DCI including the scheduling information of the RA MSG2 may be scrambled by the RA-RNTI, and the corresponding DCI may be transmitted through the PDCCH. In addition, the base station may transmit the RA MSG2 using a cell-RNTI (C-RNTI). The base station may transmit the RA MSG2 on a PDSCH indicated by the scheduling information addressed by the scheduling identifier (e.g., RA-RNTI, C-RNTI). The terminal may receive the RA MSG2 from the base station. The terminal may transmit an RA MSG3 (i.e., message 3) including its own information to the base station (S904). The terminal information may include one or more among the identifier of the terminal, capability, property, mobility status, location information, a reason for the radio access, size information of uplink data (e.g., buffer status report (BSR)), connection configuration request information, and uplink data. In addition, in the step S904, the terminal may transmit information requesting information required by the terminal to the base station.

In addition, the terminal may use the RA MSG3 to transmit one or more among request information of a beam failure recovery, BWP switching request information, BWP deactivation/activation request information, measurement result information for a base station (or cell) in a carrier aggregation (CA) environment, and CA activation/deactivation request information. Here, the request information of the beam failure recovery may request to perform a beam recovery procedure based on a beam measurement result when the random access procedure is performed for beam recovery after detection of a beam failure. In this case, the terminal may transmit measurement result information for each beam and/or TCI state information for configuring a new beam to the base station.

Each of the BWP switching request information or the BWP deactivation/activation request information may include one or more among active BWP switching request information based on measurement results for BWPs, measurement result information for deactivated BWPs, and information on an active BWP preferred by the terminal. In addition, the RA MSG3 may include one or more among a BWP identifier, a base station (or cell) identifier, and configured beam information (e.g., a TCI state, CSI-RS index, or SS/PBCH index capable of identifying a beam). The RA MSG3 may be transmitted in form of a MAC CE or an RRC message.

When the RA MSG2 is received based on the PDCCH (or DCI) in the step S903, the terminal may perform an operation according to the information element(s) included in the PDCCH (or DCI). The information element(s) included in the PDCCH (or DCI) may include one or more among transition request information of the operation state of the terminal, request information for maintaining the operation state of the terminal, information indicating activation or deactivation of a beam, information indicating activation or deactivation of a TCI state, information indicating activation or deactivation of a CS state. In this case, the random access procedure may be terminated without performing the step S904.

In the step S903, if the RA MSG2 is received based on the PDCCH (or DCI), and an uplink radio resource for the RA MSG3 is not allocated, the terminal may wait until allocation information of the uplink radio resource for the RA MSG3 is received. When the allocation information of the uplink radio resource for the RA MSG3 is received before a preconfigured timer expires, the terminal may transmit the RA MSG3 to the base station using the uplink radio resource. On the other hand, when the allocation information of the uplink radio resource for the RA MSG3 is not received until the preconfigured timer expires, the terminal may perform the random access procedure again. That is, the terminal may perform again from the step S902.

In a step S905, the base station may transmit downlink information requested by the terminal. Alternatively, the base station may transmit downlink data or a control message to the terminal. In the step S905, the base station may transmit the terminal identifier received from the terminal (e.g., the terminal identifier received in the step S904) to the terminal. The message 4 transmitted by the base station in the step S905 may be referred to as an 'RA MSG4'.

The base station may transmit resource allocation information (e.g., scheduling information) for transmission of the RA MSG3 to the terminal using the RA MSG2. The scheduling information may include one or more among the identifier of the base station transmitting the scheduling information, a beam index, an identifier for identifying the scheduling information, radio resource allocation information, MCS information, and resource allocation information for transmission of feedback information (e.g., ACK or NACK) indicating whether the scheduling information is received. The radio resource allocation information may include frequency domain resource allocation information (e.g., transmission band information, subcarrier allocation information) and/or time domain resource allocation information (e.g., frame index, subframe index, slot index, symbol index, transmission period, transmission timing).

In the random access procedure shown in FIG. 9, the RA MSG3 may include one or more of the following information elements.

Terminal identifier (ID)
Capability, properties, mobility status, and location information of the terminal
Reason for attempting the access procedure (e.g., random access procedure)
Uplink data and/or size information of the uplink data (e.g., length indicator (LI))
Size information of an uplink buffer (e.g., BSR)
Control message for connection configuration request
Measurement result of a radio channel
Uplink resource allocation information
Handover request information or measurement result information
Transition (or change) request information of the operation state of the terminal
Resumption information of a radio channel
Re-establishment information of a radio channel
Information on beam sweeping, beam reconfiguration, or beam change for beamforming
Information on physical channel synchronization acquisition
Update information of location information
Mobility status or buffer status report The reason for attempting the access procedure may be a transmission request of system information according to a request of the terminal, a transmission request of downlink data according to update of a firmware or essential software of the terminal, or an uplink resource allocation request. The information indicating the reason for attempting the access procedure may be information capable of distinguishing the reason for performing the access procedure.

When the RA MSG3 includes the above-described information elements, control field(s) indicating one or more among information indicating whether the information element(s) are included, and an attribute and a length of the corresponding data (or control information) may be configured in form of a MAC header, a logical channel identifier (e.g., LCID), or a MAC CE.

Figure 10:
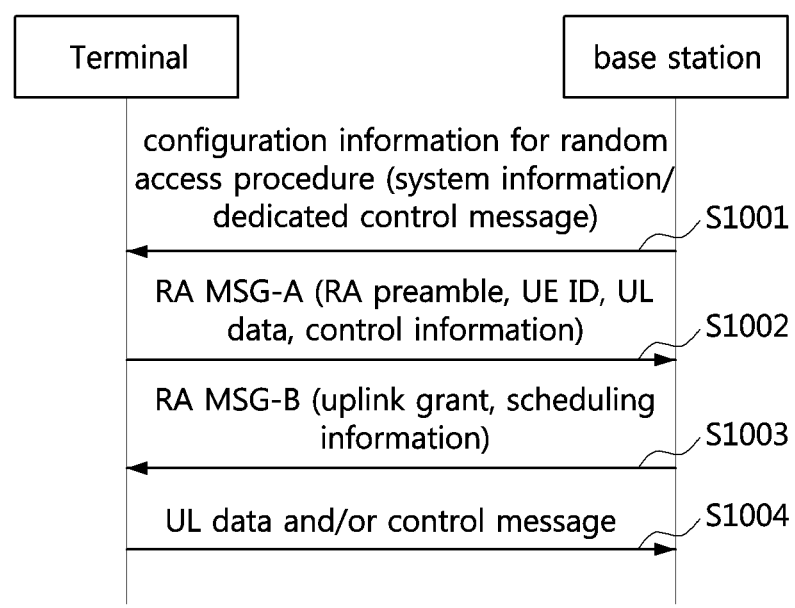
FIG. 10 is a sequence chart illustrating a second exemplary embodiment of a random access procedure in a communication system.

FIG. 10 is a sequence chart illustrating a second exemplary embodiment of a random access procedure in a communication system.

Referring to FIG. 10, a communication system may include a base station, a terminal, and the like. The base station may be the base station 110-1, 110-2, 110-3, 120-1, or 120-2 shown in FIG. 1, and the terminal may be the terminal 130-1, 130-2, 130-3, 130-4, 130-5, or 130-6 shown in FIG. 1. The base station and the terminal may be configured to be the same or similar to the communication node shown in FIG. 2. A random access procedure may be performed in two steps.

The base station may transmit system information and/or a control message including configuration information of a radio resource (e.g., uplink radio resource) for the random access procedure to the terminal (S1001). The terminal may obtain the configuration information of the radio resource for the random access procedure by receiving the system information and/or the control message from the base station. Here, the control message may be a dedicated control message. The system information and/or dedicated control message may be the same or similar to the system information and/or dedicated control message in the step S901 shown in FIG. 9.

The terminal may transmit an RA MSG-A to the base station using the radio resource configured by the base station (S1002). The RA MSG-A may include an RA preamble and a terminal identifier (e.g., UE ID, C-RNTI). In addition, the RA MSG-A may further include uplink data and/or control information. In the 2-step random access procedure, a message 1 may be referred to as the 'RA MSG-A', and the RA MSG-A may be distinguished from the RA MSG1 in the 4-step random access procedure.

The RA MSG-A may include an RA preamble and an RA payload. In the 2-step random access procedure, the RA preamble may be referred to as a '2-step-RA preamble', and in the 2-step random access procedure, the RA payload may be referred to as a '2-step-RA payload'. The RA preamble of the RA MSG-A may be selected by the MAC layer of the terminal. The RA payload of the RA-MSG-A may be generated by the MAC layer or the RRC layer. The RA preamble selected by the MAC layer of the terminal and the RA payload generated by the MAC layer or RRC layer of the terminal may be delivered to the physical layer. The RA payload of the RA MSG-A may include one or more among the terminal identifier (e.g., UE ID, C-RNTI), uplink data, and control information.

The control information may include a BSR, measurement result information (e.g., quality information), BFR request information, RLF report information, request information of RRC connection setup, request information of RRC connection re-establishment, resumption request information, location information of the terminal (e.g., a position estimated based on a GPS signal, a positioning scheme, or a built-in sensor), and transmission request information of system information. When the CBRA procedure or the CFRA procedure is performed, the RA payload may include the terminal identifier. The uplink radio resource for transmission of the RA preamble may be configured independently of the uplink radio resource for transmission of the RA payload.

For example, the radio resources configured (or allocated) for the radio access procedure may be non-contiguous in the time domain or frequency domain. When the radio resource of the RA preamble included in the RA MSG-A and the radio resource of the RA payload included in the RA MSG-A are non-contiguous, a time domain offset may be configured between the radio resources configured (or allocated) for the RA preamble and the RA payload. Alternatively, the radio resources configured (or allocated) for the radio access procedure may be contiguous in the time domain or frequency domain. The radio resources for the radio access procedure may be radio resources configured (or allocated) in different schemes. Alternatively, the radio resources for the radio access procedure may be radio resources defined by different physical layer channels.

The expression that the radio resources for the radio access procedure are different may mean that one or more among the positions of the radio resources in the time domain or frequency domain, the indexes of the radio resources, the indexes of the RA preamble, the transmission timing, and the offset are configured differently. The RA preamble or RA payload may be transmitted using different radio resources. For example, the RA preamble may be transmitted on a PRACH, and the RA payload may be transmitted on a physical uplink shared channel (PUSCH).

In order to configure the transmission resource for the RA preamble of the RA MSG-A differently from the transmission resource for the RA payload of the RA MSG-A, the uplink radio resource for transmission of the RA payload of the RA MSG-A (e.g., PUSCH configured for transmission of the RA payload of the RA MSG-A) may be configured to correspond to the RA preamble of the RA MSG-A. That is, a mapping relationship between the uplink radio resource for transmitting the RA preamble of the RA MSG-A and the uplink radio resource for transmitting the RA payload of the RA MSG-A may be configured.

For example, the transmission resource of the RA preamble may be mapped one-to-one with the transmission resource of the RA payload. In this case, one PRACH may be mapped to one PUSCH. Alternatively, a plurality of transmission resources of the RA preamble may be mapped to one transmission resource of the RA payload. In this case, a plurality of PRACHs may be mapped to one PUSCH. Alternatively, one transmission resource of the RA preamble may be mapped to a plurality of transmission resources of the RA payload. In this case, one PRACH may be mapped to a plurality of PUSCHs. In order to improve the reception quality of the RA payload, the RA payload may be repeatedly transmitted. The uplink radio resources for the repetitive transmission of the RA payload may be configured, and the corresponding uplink radio resources may be mapped to the transmission resources of the RA preamble. That is, one or more uplink radio resources may be configured for the repetitive transmission of the RA payload or transmission of the RA payload according to other reasons. When one or more radio resources for transmission of the RA payload are configured, configuration information of the RA payload may include information indicating a time interval for the transmission of the plurality of RA payloads, the number of radio resources for the transmission of the RA payload within the time interval, an interval between the radio resources, the number of symbols (or, starting symbol, ending symbol, and/or length) of each of the radio resources, or the like.

For example, when the transmission resource of the RA MSG-A is preconfigured or when the RA preamble of the RA MSG-A is transmitted through a preconfigured region (or group), the base station may configure radio resources for the repetitive transmission of the RA payload of the RA MSG-A. Therefore, when a coverage extension function is applied or when a preconfigured reference condition is satisfied, the terminal may select an RA preamble resource or an RA preamble index for the repetitive transmission of the RA payload, and may repeatedly transmit the RA payload based on the selected resource or index. The terminal may repeatedly transmit the RA payload using uplink radio resources mapped to the RA preamble index. The uplink radio resources (e.g., repeated radio resources) for transmission of the RA payload may be configured within a predetermined period in the frequency domain or time domain. Information on a mapping relationship of the uplink radio resources for transmission of the RA MSG-A may be transmitted to the terminal through system information and/or an RRC message.

When the 2-step random access procedure is performed in a non-contention scheme, the transmission resources of the RA preamble and/or the RA payload of the RA MSG-A may be allocated dedicatedly to the terminal. In the CFRA procedure, resource information of the RA preamble configured dedicatedly for the terminal may include an SS/PBCH resource list, a CSI-RS resource list, an SS/PBCH index, a CSI-RS index, an RA preamble index, and the like. The transmission resource of the RA payload of the RA MSG-A may be determined based on the mapping relationship (e.g., one-to-one mapping relationship) between the transmission resource of the RA preamble and the transmission resource of the RA payload. In the CFRA procedure, the resource information of the RA payload configured dedicatedly for the terminal may include allocation information of an uplink radio resource, beam configuration information, MCS information, etc. for transmission of the RA payload.

In the 2-step random access procedure, the transmission resource of the RA preamble may be contiguous with the transmission resource of the RA payload in the time domain. The transmission resource of the RA payload may be allocated within a time window. The terminal performing the 2-step random access procedure may transmit the RA payload using a radio resource contiguous with the RA preamble. Alternatively, the terminal may transmit the RA payload by using a radio resource non-contiguous with the radio resource of the RA preamble (e.g., a radio resource after a time domain offset from the radio resource of the RA preamble within the time window).

In addition, parameter(s) for allocation of the transmission resource of the RA preamble and the transmission resource of the RA payload may include a frequency offset and/or a time offset. Accordingly, the terminal may transmit the RA payload by using a radio resource for the RA payload mapped to the RA preamble. Alternatively, the terminal may randomly select one radio resource among a plurality of radio resources mapped to the RA preamble, which are configured for transmission of the RA payload, and transmit the RA payload by using the selected radio resource.

The RA payload of the RA MSG-A transmitted in the step 1002 may be configured to be the same or similar to the RA MSG3 transmitted in the step S904 shown in FIG. 9. For example, the RA payload of the RA MSG-A may include one or more among the identifier, capability, property, mobility status, and position information of the terminal, the reason for attempting the access procedure, request information of a beam failure recovery, a measurement result on a base station (or cell) in the CA environment, request information of activation/deactivation of the CA, BWP switching request information, BWP deactivation/activation request information, uplink data, size of the uplink data, uplink buffer size information (e.g., BSR), a control message for requesting connection configuration, and a measurement result of a radio channel.

Here, the request information of the beam failure recovery may refer to information for the terminal detecting a beam failure to request beam recovery based on a beam measurement result in the random access procedure. In this case, the terminal may transmit a measurement result for each beam and/or TCI state information for configuring a new beam to the base station. Each of the BWP switching request information and the BWP deactivation/activation request information may include one or more among an active BWP switching request based on measurement results for the configured BWPs, measurement results for the deactivated BWPs, and information on an active BWP preferred by the terminal. Each of the beam failure recovery request information, the measurement result for the base station (or cell) in the CA environment, the CA activation/deactivation request information, the BWP switching request information, and the BWP deactivation/activation request information may include one or more among a measurement result, a BWP identifier, a base station (or cell) identifier, and configured beam information (e.g., TCI state, CSI-RS index, or SS/PBCH index for identifying a beam). The beam failure recovery request information, the measurement result on the base station (or cell) in the CA environment, the CA activation/deactivation request information, the BWP switching request information, and the BWP deactivation/activation request information may be transmitted through a MAC message and/or an RRC message.

When the RA payload is transmitted together with the RA preamble in the step 1002, the RA payload may include one or more among the terminal identifier, uplink data, and control information. The attribute of the uplink data, the length of the uplink data, the attribute of the control information, the length of the control information, and whether the control information is included may be indicated by a MAC header, a logical channel identifier (e.g., LCID), or a MAC CE. For transmission timing adjustment (e.g., adjustment of a TA value) or transmission power control, the terminal may insert a preamble, a pilot symbol, or a reference signal in the first symbol or some symbols within the RA payload of the RA MSG-A.

The base station may receive the RA MSG-A from the terminal, and may obtain the RA preamble and RA payload included in the RA MSG-A. In addition, the base station may obtain one or more among the terminal identifier, uplink data, and control information from the RA payload. The base station may generate an RA MSG-B (e.g., message 2, RAR) in response to the RA MSG-A, and may transmit the RA MSG-B to the terminal (S1003). The terminal may receive the RA MSG-B from the base station, and may identify information element(s) included in the RA MSG-B.

The RA MSG-B may include one or more among a backoff indicator (BI), uplink radio resource allocation information, information indicating the RA preamble (i.e., index of the RA preamble) of the RA MSG-A, transmission timing adjustment information (e.g., TA value or TA Command), a scheduling identifier (e.g., C-RNTI, temporary cell (TC)-RNTI, etc.), and a terminal identifier for contention resolution (e.g., UE contention resolution ID).

The RA MSG-B (e.g., MAC PDU) may include one or more MAC subPDUs. Each of the one or more MAC subPDUs included in the RA MSG-B may be configured based on one of the following configuration schemes. Information indicating the configuration scheme of the MAC subPDU may be included in a MAC subheader of the corresponding MAC subPDU. The MAC subPDU may mean 'MAC sub PDU'.

Configuration scheme #1: a MAC subheader including a backoff indicator (BI)
 Configuration scheme #2: a MAC subheader and a fallback RAR
 Configuration scheme #3: a MAC subheader and a successful RAR
 Configuration scheme #4: a MAC subheader and a MAC service data unit (SDU) (e.g., data or control information)
 Configuration scheme #5: a MAC subheader and a padding When the RA MSG-B is scheduled by the C-RNTI assigned to the terminal or when the RA MSG-B includes the terminal identifier (e.g., UE contention resolution ID) included in the RA MSG-A, the terminal may determine that the contention is resolved. That is, the terminal may determine that the 2-step random access procedure is completed.

When a CRC of DCI including scheduling information of the PDSCH on which the RA MSG-B (e.g., RAR for the RA MSG-A) is transmitted is scrambled by the C-RNTI, and the RA MSG-B including TA information and/or a UL grant is received within an RAR window (or before a timer expires), the terminal may determine that the contention for the 2-step random access procedure is resolved. Here, the TA information may be a TA value or a TA command.

A specific field (or bit) of the PDCCH (e.g., DCI or UCI) may indicate that the RA MSG-B scheduled by the PDCCH is an RA MSG-B scheduled by the C-RNTI. Alternatively, a field of the MAC subheader or a logical channel identifier (LCID) for transmission of the MAC CE for the RA MSG-B may indicate that the RA MSG-B scheduled by the PDCCH is an RA MSG-B scheduled by the C-RNTI.

In the 4-step random access procedure, the RAR window may start at the ending time point of the transmission of RA MSG1. In the 2-step random access procedure, the RAR window may start at the ending time point of the transmission of the RA payload of the RA MSG-A. When the RA MSG-B (e.g., RA MSG-B scheduled by the C-RNTI) including the TA information and/or UL grant is not received within the RAR window (or before a timer expires), the terminal may determine that the contention for the 2-step random access procedure is not resolved.

When the RA MSG-B scheduled by the C-RNTI is transmitted in response to the RA MSG-A in the 2-step random access procedure, the PDCCH (e.g., DCI or UCI) may include the TA information, an indicator informing that the corresponding PDCCH includes scheduling information for a response to the RA MSG-A, and the like. The RA MSG-B may be transmitted in form of a MAC message (e.g., MAC CE) or an RRC message. When the RA MSG-B is transmitted in form of a MAC message, the RRC layer of the base station obtaining the information of the RA MSG-A may deliver parameter(s) to be included in the RA MSG-B to the MAC layer of the base station, and the MAC layer of the base station may generate the RA MSG-B in form of a MAC CE. The RA MSG-B may include the terminal identifier obtained through the RA payload of the RA MSG-A.

When the RA preamble of the RA MSG-A is allocated dedicatedly to the terminal or when the radio resource of the RA preamble of the RA MSG-A is mapped one-to-one with the radio resource of the RA payload of the RA MSG-A, the RA MSG-B may not include the index of the RA preamble received from the terminal.

When the RA preamble of the RA MSG-A is allocated dedicatedly to the terminal or when the RA payload of the RA MSG-A includes the scheduling identifier (e.g., C-RNTI) assigned to the terminal, the base station may transmit DCI including scheduling information for the transmission resource of the RA MSG-B to the terminal using the scheduling identifier assigned to the terminal. That is, a CRC of the DCI may be scrambled by the scheduling identifier assigned to the terminal. The terminal may receive the DCI using the scheduling identifier assigned to the terminal, obtain the scheduling information for the transmission resource of the RA MSG-B included in the DCI, and receive the RA MSG-B in the transmission resource indicated by the scheduling information.

In the step S1003, the base station may transmit a PDCCH for scheduling an uplink radio resource, a PDCCH (e.g., DCI) for the RAR (e.g., RA MSG-B), or the RA MSG-B. The RA MSG-B may be transmitted on a PDSCH. When only the PDCCH is transmitted in the step S1003, the corresponding PDCCH may include one or more among allocation information (e.g., scheduling information) of an uplink radio resource for the terminal, transmission timing adjustment information (e.g., TA information), transmission power adjustment information, backoff information, beam configuration information, TCI state information, CS state information, state transition information, PUCCH configuration information, the index of the RA preamble included in the RA MSG-A, and allocation information of a radio resource for transmission of the RA payload of the RA MSG-A. In addition, when only the PDCCH is transmitted in the step S1003, the terminal may recognize that there is no RA response transmitted on a PDSCH based on a DCI format of the PDCCH and/or the above-described PDCCH configuration information.

The beam configuration information may be information indicating activation or deactivation of a specific beam. The TCI state information may be information indicating activation or deactivation of a specific TCI state. The CS state information may be information indicating activation or deactivation of radio resources allocated in the CS scheme. The state transition information may be information indicating transition of the operation state shown in FIG. 8. The state transition information may indicate transition from the current operation state to the RRC idle state, RRC inactive state, or RRC connected state. Alternatively, the state transition information may indicate maintaining the current operation state. The PUCCH configuration information may be allocation information of transmission resources of an SR. Alternatively, the PUCCH configuration information may be information indicating activation or deactivation of the transmission resources of the SR.

The base station may transmit the control information described in the step S1003 on a PDSCH by transmitting only the PDCCH. The control message transmitted on the PDSCH may include one or more among allocation information (e.g., scheduling information) of an uplink radio resource, transmission timing adjustment information (e.g., TA information), transmission power adjustment information, backoff information, beam configuration information, TCI state information, configured scheduled (CS) state information, state transition information, PUCCH configuration information, the index of the RA preamble included in the RA MSG-A, and allocation information of an uplink radio resource for transmission of uplink data and/or a control message in a step S1004.

In the procedure for generating and transmitting the RA MSG-B, the base station may transmit the DCI including scheduling information for transmission of the RA MSG-B by using an RA-RNTI or the scheduling identifier (e.g., C-RNTI) assigned to the terminal. That is, the CRC of DCI may be scrambled by the RA-RNTI or the C-RNTI. The base station may transmit the RA MSG-B to the terminal using the PDSCH indicated by the DCI.

When the terminal successfully receives the RA MSG-B from the base station, the 2-step random access procedure may be terminated. The terminal receiving the RA-MSG B may transmit uplink data and/or a control message to the base station by using uplink scheduling information (e.g., scheduling information included in the RA-MSG B) (S1004).

Information indicating whether the base station (or cell) allows the execution of the 2-step random access procedure and/or a condition for performing the 2-step random access procedure may be transmitted to the terminal through system information transmitted in a broadcast scheme, a control message transmitted in a multicast scheme, or a dedicated control message. The information indicating whether the base station (or cell) allows the execution of the 2-step random access procedure may be information indicating whether the base station allows the terminal located in a service area to attempt to access through the 2-step random access procedure, information indicating whether the base station restrict the access attempt of the terminal located in a service area through the 2-step random access procedure, or information indicating whether the base station partially restricts the access attempt of the terminal located in a service area through the 2-step random access procedure.

When the access attempt through the 2-step random access procedure is restricted, the base station may inform the terminal of a restriction condition of the 2-step random access procedure. When the access attempt through the 2-step random access procedure is partially restricted, the base station may inform the terminal of a partial restriction condition of the 2-step random access procedure. When the base station does not allow the 2-step random access procedure or when the restriction condition or the partial restriction condition of the 2-step random access procedure is met, the terminal may not attempt the 2-step random access procedure.

When an execution condition (e.g., allowance condition) of the 2-step random access procedure is met, the terminal may perform the 2-step random access procedure. For example, if a quality of a radio channel measured by the terminal is equal to or greater than a threshold (e.g., reference value) configured by the base station, the terminal may perform the 2-step random access procedure. When the quality of the radio channel measured by the terminal is less than a threshold configured by the base station, the terminal may perform the 4-step random access procedure. For example, the quality of the radio channel may be measured as a received signal strength indicator (RSSI), a received signal code power (RSCP), a reference signal received power (RSRP), or a reference signal received quality (RSRQ). Alternatively, the quality of the radio channel may be measured as other parameters (e.g., a reference parameter for measuring a quality of a radio section between the base station (or, cell or TRP) and the terminal).

The RA preamble (e.g., signature) of the RA MSG1 in the 4-step random access procedure may be configured to be the same as the RA preamble (e.g., signature) of the RA MSG-A in the 2-step random access procedure. In the procedure of generating the RA preamble of the RA MSG1 and the RA MSG-A, a code sequence may be generated using the same code generation formula.

The transmission resource of the RA preamble of the RA MSG1 in the 4-step random access procedure may be configured to be the same or different from the transmission resource of the RA preamble of the RA MSG-A in the 2-step random access procedure.

When the transmission resource of the RA preamble of the RA MSG1 and the transmission resource of the RA preamble of the RA MSG-A are the same, the index of the RA preamble of the RA MSG1 and the index of the RA preamble of the RA MSG-A may be configured differently. That is, a range of the index for the RA preamble of the RA MSG1 and a range of the index for the RA preamble of the RA MSG-A may be configured differently within the same transmission resources of the RA preambles.

When the transmission resource of the RA preamble of the RA MSG1 and the transmission resource of the RA preamble of the RA MSG-A are different, the transmission resource of the RA preamble of the RA MSG1 may be configured differently from the transmission resource of the RA preamble of the RA MSG-A in the time and/or frequency domain. The transmission resource of the RA preamble in the frequency domain may include one or more among frequency band information, PRB information, CRB information, subcarrier information, and beam information according to a beamforming technique. The transmission resource of the RA preamble in the time domain may be configured or indicated in units of a radio frame, a subframe, a TTI, a slot, a mini-slot, a symbol, or a specific time interval. The base station may determine whether the 4-step random access procedure or the 2-step random access procedure is performed based on the RA preamble received from the terminal or the radio resource through which the RA preamble is received.

The size of the RA payload of the RA MSG-A and/or the MCS level for the RA payload of the RA MSG-A may be determined as follows. The base station may configure the size of the RA payload of the RA MSG-A to one fixed value among a plurality of candidate values, and the MCS level for transmitting the RA payload of the RA MSG-A may be fixed to one fixed level of a plurality of candidate levels. The base station may inform the terminal of the size and/or MCS level of the RA payload configured by the base station. The base station may configure the terminal to select the RA preamble of the RA MSG-A according to the size and/or MCS level of the RA payload of the RA MSG-A. For example, the terminal may select the RA preamble of the RA MSG-A based on at least one of radio quality information (e.g., pathloss information), the size of the RA payload of the RA MSG-A, and the MCS level for transmitting the RA payload of the RA MSG-A which are received from the base station. The terminal may transmit the selected RA preamble of the RA MSG-A to the base station.

Accordingly, the base station may estimate one or more of the MCS level, size, and radio quality of the downlink channel of the RA payload of the corresponding RA MSG-A based on the RA preamble of the RA MSG-A received from the terminal. The RA preamble of the RA MSG-A, which can be used, may vary according to the radio quality of the downlink channel, the size of the RA payload of the RA MSG-A, and/or the MCS level. The base station may transmit to the terminal system information and/or a control message (e.g., dedicated control message) including information on the RA preamble that can be used according to the radio quality of the downlink channel, the size of the RA payload of the RA MSG-A, and/or the MCS level.

In addition, the system information and/or control messages (e.g., dedicated control messages) may include configuration parameter(s) for selecting the RA preamble of the RA MSG-A which can be used according to the radio quality of the downlink channel, the size of the RA payload of the RA MSG-A, and/or the MCS level. The configuration parameter(s) may include one or more among reference values for the radio quality information of the downlink channel, the size of the RA payload of the RA MSG-A, and the MCS level, information of the RA preamble of the RA MSG-A (e.g., index or index range) corresponding to the corresponding reference value, and transmission resource information of the RA preamble of the RA MSG-A corresponding to the reference value.

Alternatively, the MCS level for transmitting the RA payload of the RA MSG-A may be fixed. The base station may set the MCS level for transmitting the RA payload of the RA MSG-A to one fixed level. The base station may transmit to the terminal system information and/or a control messages (e.g., dedicated control messages) including the MCS level for transmitting the RA payload of the RA MSG-A. The terminal may receive the system information and/or control message (e.g., dedicated control message) from the base station, and identify the MCS level for transmitting the RA payload of the RA MSG-A configured by the base station (e.g., fixed MCS level). The terminal may transmit the RA payload of the RA MSG-A by using the fixed MCS level.

In addition, the RA payload of the RA MSG-A may include the MCS level applied to the corresponding RA payload. For example, the terminal may determine the MCS level for the RA payload of the RA MSG-A, and transmit the RA payload of the RA MSG-A including the determined MCS level to the base station. The RA payload of the RA MSG-A may include other information elements as well as the MCS level. The base station may configure an MCS level range of the RA payload of the RA MSG-A, and transmit system information and/or a control message (e.g., dedicated control messages) including the MCS level range to the terminal.

In this case, the terminal may select the MCS level within the MCS level range configured by the base station, and transmit the RA payload of the RA MSG-A to the base station using the selected MCS level. Here, the RA payload of the RA MSG-A may include the MCS level selected by the terminal. The base station may receive the RA payload of the RA MSG-A from the terminal, and identify the MCS level applied to the RA payload by checking a specific part (e.g., UCI) within the RA payload of the RA MSG-A. The base station may perform demodulation and decoding operations on the RA payload of the RA MSG-A based on the identified MCS level.

Alternatively, the RA preamble of the RA MSG-A may be selected through a combination of the methods described above. In addition, the size and/or MCS level of the RA payload of the RA MSG-A may be selected through a combination of the methods described above. For example, the RA preamble of the RA MSG-A may be selected according to the radio quality of the downlink channel and/or the size of the RA payload of the RA MSG-A. The MCS level of the RA payload of the RA MSG-A may be fixed to a specific level. A specific part (e.g., UCI) within the RA payload of the RA MSG-A may indicate the MCS level applied to the corresponding RA payload.

The index (e.g., RA preamble index), masking information, and/or offset of the RA MSG1 may be configured differently according to the path loss of the downlink and/or the size of the RA MSG3. When the base station supports both the 4-step random access procedure and the 2-step random access procedure, the condition (or criterion) for the terminal to select the RA preamble of the RA MSG-A in the 2-step random access procedure may be configured to be the same as the condition (or criterion) for the terminal to select the RA MSG1 (e.g., RA preamble).

The base station may transmit to the terminal one or more among information indicating whether to support the 4-step random access procedure, information indicating whether to support the 2-step random access procedure, the condition (e.g., criterion) for selecting the RA MSG1 (e.g., RA preamble) in the 4-step random access procedure, and the condition (e.g., criterion) for selecting the RA preamble of the RA MSG-A in the 2-step random access procedure, by using system information and/or a control message (e.g., dedicated control message).

The terminal may obtain resource configuration information for the 2-step random access procedure configured by the base station according to the purpose of performing the 2-step random access procedure (e.g., BFR procedure, resumption request, connection configuration request, system information request), the size of the RA payload to be transmitted by the terminal, the radio quality of the downlink channel, and the like through system information and/or a control message. The resource configuration information for the 2-step random access procedure may include transmission resource information and/or an MCS level of the RA MSG-A (e.g., RA preamble, RA payload). The terminal may select a resource that satisfies the above-described selection condition (e.g., selection criterion), and may transmit the RA MSG-A (e.g., RA preamble, RA payload) using the selected resource to perform the 2-step random access procedure.

The terminal may determine the MCS level for the corresponding RA payload based on the radio resource selection scheme for transmission of the RA payload of the RA MSG-A. For example, the base station may configure radio resources for transmission of the corresponding RA payload according to the size and/or MCS level of the RA payload of the RA MSG-A, and transmit resource configuration information of the RA payload to the terminal by using system information and/or a control message (e.g., dedicated control message). The radio resources for transmission of the RA payload may be configured differently according to the size and/or MCS level of the RA payload.

The terminal may receive the resource configuration information of the RA payload of the RA MSG-A from the base station, and may select a radio resource corresponding to the size and/or MCS level of the RA payload based on the resource configuration information. The terminal may transmit the RA preamble of the RA MSG-A corresponding to (e.g., mapped to) the selected radio resource to the base station, and may transmit the RA payload of the RA MSG-A to the base station using the selected radio resource. The base station may receive the RA preamble of the RA MSG-A from the terminal, and identify the size and/or MCS level of the RA payload corresponding to (e.g., mapped to) the radio resource through which the RA preamble is received. The base station may receive the RA payload of the RA MSG-A based on the identified size and/or MCS level of the RA payload.

The scheduling identifier (e.g., RA-RNTI) for transmission of the RA MSG-B in the 2-step random access procedure may be distinguished from the RA-RNTI for transmission of the message 2 (e.g., RA MSG2) in the 4-step random access procedure. In the 2-step random access procedure, the RA-RNTI may be an RA-RNTI (e.g., MSG-B RA-RNTI) configured separately for transmission of the RA MSG-B. The MSG-B RA-RNTI may be mapped to the transmission resource (e.g., radio resource) of the RA preamble of the RA MSG-A. When the terminal selects the transmission resource of the RA preamble of the RA MSG-A, the MSG-B RA-RNTI for reception of the RA MSG-B in the 2-step random access procedure may be determined.

In the 2-step random access procedure, the format of the RA MSG-B may vary depending on the parameter(s) included in the RA MSG-B. In order to support various RA MSG-B formats, a separate MAC subheader or a separate field in a MAC CE may be defined for the RA MSG-B. A 'MsgB-type' field indicating the format of the RA MSG-B may be configured in the separate MAC subheader or the MAC CE for the RA MSG-B. For example, the MsgB-type field may be configured within the first octet in the separate MAC subheader or the MAC CE for the RA MSG-B. When the size of the MsgB-type field is 2 bits, the format of the RA MSG-B may be defined as follows. The parameter(s) included in the RA MSG-B may vary depending on the format of the corresponding RA MSG-B.

00: TA information, UL grant, TC-RNTI, UE ID (e.g., terminal identifier included in the RA MSG-A)
01: UL grant, TC-RNTI, UE ID
10: TA information, UL grant, beam configuration information, TCI state information
11: UL grant, beam configuration information, TCI state information The TA information (e.g., TA value, TA command) may be used to adjust uplink transmission timing. The UL grant may be uplink scheduling information. The TC-RNTI may be a scheduling identifier (e.g., Temporary C-RNTI) assigned to the terminal.

The size of the MsgB-type field may be 1 bit or more. The MsgB-type field may indicate the parameter(s) included in the RA MSG-B. The parameter(s) included in the RA MSG-B may be one or more among the TA information, UL grant, TC-RNTI, UE ID, beam configuration information, TCI state information, other control information, and downlink data.

When the resource for the RA preamble of the RA MSG-A and the resource for the RA MSG1 (e.g., RA preamble) are configured in the same scheme, the scheduling identifier for transmission and reception of the RA MSG-B may not be distinguished from the scheduling identifier for transmission and reception of the RA MSG2. Here, the scheduling identifier may be an RA-RNTI.

The transmission resource of the RA preamble of the RA MSG-A may be the same as the transmission resource of the RA MSG1, and the index of the RA preamble of the RA MSG-A may be different from the index of the RA MSG1 (e.g., the index of the RA preamble). The scheduling identifier for transmission and reception of the RA MSG-B may be determined according to the transmission resource and/or index of the RA preamble of the RA MSG-A. The scheduling identifier for transmission and reception of the RA MSG2 may be determined according to the transmission resource and/or index of the RA MSG1 (e.g., RA preamble). When the transmission resource of the RA preamble of the RA MSG-A is the same as the transmission resource of the RA MSG1, and the index of the RA preamble of the RA MSG-A is different from the index of the RA MSG1 (e.g., the index of the RA preamble), the scheduling identifier for transmission and reception of the RA MSG-B may be the same as the scheduling identifier for transmission and reception of the RA MSG2.

Even when the scheduling identifier for transmission and reception of the RA MSG-B and the scheduling identifier for transmission and reception of the RA MSG2 are configured in the same scheme, the RA-RNTI for the RA MSG-B (e.g., MSG-B RA-RNTI) may be configured differently from the RA-RNTI for the RA MSG2. The RA-RNTI for the RA MSG-B may be an RA-RNTI determined by adding a preconfigured offset value to the RA-RNTI for the RA MSG2. That is, the RA-RNTI for the RA MSG-B may be determined by adding a constant value to the RA-RNTI for the RA MSG2.

The base station may transmit to the terminal information indicating whether the resource for the RA preamble of the RA MSG-A is configured in the same scheme as the resource for the RA MSG1 by using system information and/or a control message (e.g., dedicated control message). The RA-RNTI determined by the same scheme may be used in the 2-step random access procedure and the 4-step random access procedure. In this case, the terminal may identify whether a received RAR is the RA MSG-B of the 2-step random access procedure or the RA MSG2 of the 4-step random access procedure based on a specific field within a MAC header (or MAC subheader) of the corresponding RAR received based on the RA-RNTI.

For example, reserved bit(s) in the MAC subheader included in the RAR (e.g., RA MSG-B) may indicate whether the corresponding RAR is the RA MSG-B or the RA-MSG2. The reserved bits set to '00' may indicate that the corresponding RAR is the RA MSG2. The reserved bits set to '01', '10', or '11' may indicate that the corresponding RAR is the RA MSG-B.

When the RA MSG-B and the RA MSG2 are transmitted through one radio resource region, the RA MSG-B may be transmitted earlier than the RA MSG2 within the one radio resource region. For this operation, the MAC subheader of the RA MSG-B may be located before the MAC subheader of the RA MSG2. Alternatively, within the one radio resource region, the RA MSG-B may be transmitted after the RA MSG2. For this operation, the MAC subheader of the RA MSG-B may be located after the MAC subheader of the RA MSG2.

When the MAC subheader of the RA MSG-B is located after the MAC subheader of the RA MSG2, all MAC subheaders for one or more RA MSG2s may be located before the MAC subheader(s) for the RA MSG-Bs within a downlink message for transmission of the RA MSG-B(s) and/or the RA MSG2(s). If there is no RA MSG2 to be transmitted by the base station, the downlink message may include only the MAC subheader(s) for the RA MSG-B(s).

On the other hand, when the MAC subheader of the RA MSG-B is located before the MAC subheader of the RA MSG2, all MAC subheaders for one or more RA MSG-Bs may be located before the MAC subheader(s) for RA MSG2 within the downlink message for transmission of the RA MSG-B and/or the RA MSG2.

The RA MSG-B may include the parameter(s) described above and an RRC message (e.g., RRC control information). When the RA MSG-A (e.g., the RA payload of the RA MSG-A) including an RRC message (e.g., connection request message, resumption request message) is received, the base station may generate a MAC PDU of a RA MSG-B for each terminal, and transmit the MAC PDU of the RA MSG-B to each terminal.

In the 2-step random access procedure, the MAC PDU of the RA MSG-B may include the above-described parameter(s) (e.g., TA information, UL grant, TC-RNTI, UE ID, beam configuration information, etc.) without RRC control information. The MAC PDU of the RA MSG-B including the parameter(s) described above without the RRC control information may be referred to as a 'MSG-B with UEsMux'. Alternatively, the MAC PDU of the RA MSG-B may include the parameter(s) described above with the RRC control information. The MAC PDU of the RA MSG-B including the above-described parameter(s) together with the RRC control information may be referred to as a 'MSG-B with SRB'. The MSG-B with UEsMux may include RA MSG-Bs for a plurality of terminals, and the MSG-B with SRB may include an RA MSG-B for one terminal. The RA MSG-Bs of a plurality of terminals may be multiplexed in the MSG-B with UEsMux composed of one MAC PDU.

A scheduling identifier addressing a PDCCH (e.g., DCI) including scheduling information for a PDSCH on which the MSG-B with SRB is transmitted may be separately assigned. An RA-RNTI for transmission and reception of the MSG-B with UEsMux may be configured independently of the RA-RNTI for transmission and reception of the MSG-B with SRB. The RA-RNTI addressing the scheduling information for the PDSCH on which the MSG-B with SRB is transmitted may be configured differently from the RA-RNTI addressing the scheduling information for a PDSCH on which the MSG-B with UEsMux is transmitted. In the 2-step random access procedure, the terminal transmitting the RA MSG-A may perform a PDCCH monitoring operation by using both the RA-RNTI for the MSG-B with SRB and the RA-RNTI for the MSG-B with UEsMux. For example, the RA-RNTI for the MSG-B with SRB may be an RA-RNTI obtained by applying a preconfigured offset to the RA-RNTI for the MSG-B with UEsMux.

Alternatively, the RA-RNTI for the MSG-B with SRB may be an RA-RNTI obtained by applying a first preconfigured offset to the RA-RNTI of the RA MSG2, and the RA-RNTI for the MSG-B with UEsMux may be an RA-RNTI obtained by applying a second preconfigured offset to the RA-RNTI of the RA-MSG2. The first offset may be different from the second offset. In the above-described exemplary embodiments, the base station may inform the terminal of the preconfigured offsets (e.g., first offset and second offset). The terminal may identify the RA-RNTI for the MSG-B with SRB and the RA-RNTI for the MSG-B with UEsMux by using the preconfigured offset(s) obtained from the base station. When the scheduling identifiers (e.g., RA-RNTIs) are configured differently in the 2-step random access procedure and/or the 4-step random access procedure, the terminal may use the corresponding scheduling identifier to discriminate the RA response messages (e.g., RA MSG2, RA MSG-B, MSG-B with SRB, or MSG-B with UEsMux) in the 2-step random access procedure and/or the 4-step random access procedure. The RA response message of the 2-step random access procedure may be a successful RAR (e.g., MSG-B with SRB MAC PDU, MSG-B with UEsMux MAC PDU) or a fallback RAR described below. Therefore, the RA MSG-B of the 2-step random access procedure may be composed of the above-described backoff indicator (BI), contention resolution information using the terminal identifier (e.g., successful RAR), or a fallback RAR. If the scheduling identifier for transmission of the RA response message of the 2-step random access procedure is set to the MSG-B RA-RNTI, the terminal may use the scheduling identifiers RA-RNTI and MSG-B RA-RNTI to discriminatively receive the RA MSG2 of the 4-step random access procedure and the RA MSG-B of the 2-step random access procedure.

When uplink measurement results are reported using the RA payload of the RA MSG-A in the 2-step random access procedure, when the uplink measurement results are reported using the message of the step S1004 shown in FIG. 10, or when the uplink measurement result information is reported using the RA MSG3 in the 4-step random access procedure, the uplink measurement result information may include information for identifying a downlink beam (e.g., TCI state configuration information, SS/PBCH index, CSI-RS index) and/or a BWP identifier. When the uplink measurement result information is transmitted according to the order of beams within a beam configuration list included in the control message for configuring a plurality of beams, the uplink measurement result information may not include information for identifying a downlink beam (e.g., downlink beam identifier). When the uplink measurement result information is transmitted according to the order of BWPs within the BWP configuration list included in the control message for configuring a plurality of BWPs, the uplink measurement result information may not include a BWP identifier.

The RA MSG3 in the 4-step random access procedure and the RA MSG-A (e.g., RA payload) in the 2-step random access procedure may be configured according to the same format. Alternatively, the RA MSG3 and the RA MSG-A (e.g., RA payload) may be configured according to different formats. Here, the format may mean a form constituting a MAC message or an RRC message. The expression that the same format is used may mean that the same parameter(s), field(s), and/or information element(s) are included in the MAC message or the RRC message.

Regardless of whether the format of the RA MSG3 is identical to the format of the RA MSG-A (e.g., RA payload), a field and/or a logical channel identifier (e.g., LCID) within a MAC header (or MAC subheader) for distinguishing the RA MSG3 from the RA MSG-A (e.g., RA payload) may be configured.

The field in the MAC header (or MAC subheader) indicating the RA MSG3 may be configured differently from the field in the MAC header (or MAC subheader) indicating the RA MSG-A (e.g., RA payload). The field in the MAC header (or MAC subheader) for distinguishing between the RA MSG3 and the RA MSG-A (e.g., RA payload) may be referred to as an 'RA-M3' field. The RA-M3 field set to '1' may indicate that the corresponding message is the RA MSG3. The RA-M3 field set to '0' may indicate that the corresponding message is the RA MSG-A (e.g., RA payload).

The LCID indicating the RA MSG3 may be configured differently from the LCID indicating the RA MSG-A (e.g., RA payload). Accordingly, the base station may distinguish the RA MSG3 from the RA MSG-A (e.g., RA payload) based on the LCID included in the MAC header (or MAC subheader, MAC message).

The terminal may perform the above-described 4-step random access procedure and the 2-step random access procedure, respectively, based on the CBRA scheme or the CFRA scheme. When the terminal has transmitted the message 1 (e.g., RA MSG-A (e.g., RA preamble, RA payload), RA MSG1) more than a preconfigured number of times in the CFRA procedure or when the terminal does not receive an RAR for the message 1 within a time corresponding to a preconfigured timer, the terminal may switch from the CFRA procedure to the CBRA procedure. That is, the terminal may perform the 2-step random access procedure or the 4-step random access procedure according to the CBRA scheme.

When a dedicated radio resource for the 2-step random access procedure or the 4-step random access procedure is configured in the CFRA procedure, if a reference condition (e.g., radio channel quality) for transmitting the RA preamble is not satisfied, the CBRA procedure may be performed instead of the CFRA procedure. For example, when the radio channel quality is higher than the reference condition, the terminal may perform the CFRA procedure by using the dedicated radio resource allocated for the CFRA procedure. When the radio channel quality is less than the reference condition, the terminal may perform the CBRA procedure instead of the CFRA procedure.

When the 2-step random access procedure shown in FIG. 10 is performed, the base station may receive the RA preamble or the RA payload included in the RA MSG-A in the step S1002. That is, the base station may not receive both the RA preamble and the RA payload. In this case, the base station may not transmit to the terminal the RA MSG-B in response to the RA MSG-A. When the RA MSG-B is not received from the base station within the RAR window, the terminal may perform a retransmission operation of the RA MSG-A during a preconfigured time period (or a predetermined number of times).

Alternatively, when the base station receives the RA preamble or the RA payload in the step S1002, the base station and/or the terminal may operate as follows. In the 2-step random access procedure, the RAR window (or timer) for receiving the RA MSG-B may start at the time point of transmission of the RA payload of the RA MSG-A. When the RA payload of the RA MSG-A is repeatedly transmitted, the RAR window may start at the time point of transmission of the last RA payload. The transmission time point of the RA payload of the RA MSG-A may be a transmission starting time point or a transmission ending time point of the RA payload. The transmission time point of the RA payload of the RA MSG-A may be expressed based on a subframe, a slot, a mini-slots, or a symbol.

In the 2-step random access procedure, the RAR window for receiving the RA MSG-B may be configured identically to the RAR window for receiving the RA MSG2. The RAR window for receiving the RA MSG-B may be configured based on parameter(s) related to the RAR window for receiving the RA MSG2. When the base station (or cell) is configured according to the functional split scheme of the radio protocol, the base station may transmit to the terminal at least one of configuration information (e.g., parameter(s)) of the RAR window for receiving the RA MSG-B and configuration information (e.g., parameters(s)) of the RAR window for receiving the RA MSG2 by using system information and/or a control message (e.g., RRC message).

When only the RA preamble of the RA MSG-A is received at the base station, a retransmission procedure of the RA payload of the RA MSG-A may be performed. The retransmission procedure of the RA payload of the RA MSG-A may be performed as follows.

The 2-step random access procedure may be performed according to the CFRA scheme. The base station may receive the RA preamble of the RA MSG-A from the terminal in the step S1002. When a decoding operation of the RA payload of the RA MSG-A fails or when the RA payload of the RA MSG-A is not received before a preconfigured timer (hereinafter referred to as '$T_{2\text{-}stepRA}$') expires, the base station may identify the terminal that initiated the 2-step random access procedure based on the RA preamble of the RA MSG-A.

The $T_{2\text{-}stepRA}$ may be started at the time point (e.g., reception starting time point, reception ending time point) at which the RA preamble is received at the base station. The base station may inform the terminal of the $T_{2\text{-}stepRA}$ using system information and/or a control message (e.g., dedicated control message). The terminal should transmit the RA payload to the base station before the expiry of the $T_{2\text{-}stepRA}$. When the RA preamble of the RA MSG-A is mapped to the RA payload of the RA MSG-A, the $T_{2\text{-}stepRA}$ may be a timer according to a time relation corresponding to a mapping relationship between the RA preamble and the RA payload.

When the RA payload is not received from the terminal before the expiry of the $T_{2\text{-}stepRA}$ from the reception time point (e.g., reception starting time point, reception ending time point) of the RA preamble, the base station may transmit DCI including scheduling information for a PDSCH on which the RA MSG-B is transmitted by using one of the following scheduling identifiers. The DCI may be transmitted on a PDCCH.

Scheduling identifier configured dedicatedly for the terminal

Scheduling identifier for transmission of the RA MSG-B (e.g., MSG-B RA-RNTI)

Scheduling identifier for transmission of the RA MSG-B requesting retransmission of the RA payload of the RA MSG-A In the step S1003, the base station may transmit DCI including allocation information (e.g., scheduling information) of an uplink radio resource through the PDCCH. Alternatively, in the step S1003, the base station may transmit the RA MSG-B through the PDSCH. The RA MSG-B requesting retransmission of the RA payload of the RA MSG-A may be transmitted on the PDSCH (e.g., PDSCH scheduled by the DCI). The RA MSG-B requesting retransmission of the RA payload may include some information element(s). For example, the RA MSG-B may include one or more among allocation information of an uplink radio resource (e.g., scheduling information), transmission timing adjustment information, transmission power adjustment information, beam configuration information, retransmission request information of the RA payload of the RA MSG-A (e.g., retransmission indication information), radio resource allocation information for (re)transmission of the RA payload of the RA MSG-A, and a MCS level. Each of the plurality of information elements included in the RA MSG-B may be configured in form of a MAC CE. Alternatively, the plurality of information elements included in the RA MSG-B may be configured in form of one MAC CE. In this case, an additional MAC header format may be used.

When the base station receiving only the RA preamble of the RA MSG-A transmits the RA MSG-B requesting retransmission of the RA payload of the RA MSG-A, the terminal may receive the RA MSG-B from the base station, and identify the Information element(s) included in the RA MSG-B. The information element(s) included in the RA MSG-B may be radio resource allocation information for (re)transmission of the RA payload, a MCS level, TA information, transmission power adjustment information, and/or configured beam information. The terminal may retransmit the RA payload of the RA MSG-A based on the information element(s) included in the RA MSG-B. When the retransmitted RA payload is received from the terminal, the base station may transmit the RA MSG-B to the terminal. The terminal may receive the RA MSG-B from the base station. When the RA MSG-B is received from the base station, the terminal may determine that the RA payload of the RA MSG-A is successfully received at the base station.

On the other hand, when only the RA preamble of the RA MSG-A is received at the base station, the 2-step random access procedure may be switched to the 4-step random access procedure. The 2-step random access procedure may be performed according to the CFRA scheme. In the step S1002, the base station may receive the RA preamble of the RA MSG-A from the terminal. When a decoding operation of the RA payload of the RA MSG-A fails or when the RA payload of the RA MSG-A is not received before expiry of a preconfigured timer (hereinafter referred to as '$T_{2\text{-}stepMsgA}$'), the base station may identify the terminal that initiated the 2-step random access procedure based on the RA preamble of the RA MSG-A. That is, when the 2-step random access procedure according to the CFRA scheme is performed, the base station may identify the corresponding terminal based on the radio resource or index of the RA preamble of the RA MSG-A according to the CFRA scheme, which is received from the terminal. The $T_{2\text{-}stepMsgA}$ may be started at the time point (e.g., reception starting time point, reception ending time point) at which the RA preamble is received at the base station. The base station may inform the terminal of the $T_{2\text{-}stepMsgA}$ using system information and/or a control message (e.g., dedicated control message). The terminal should transmit the RA payload to the base station before the expiry of the $T_{2\text{-}stepMsgA}$. When the RA payload is received from the terminal before the expiry of the $T_{2\text{-}stepMsgA}$, the base station may transmit the RA MSG-B to the terminal. The $T_{2\text{-}stepMsgA}$ may be greater than the $T_{2\text{-}stepRA}$.

When the RA payload is not received from the terminal before the expiry of the $T_{2\text{-}stepMsgA}$ from the time point of reception of the RA preamble of the 2-step random access procedure according to the CFRA scheme, the base station may identify the corresponding terminal based on the RA preamble of the RA MSG-A according to the CFRA scheme, which is received from the terminal. Accordingly, the base station may transmit to the terminal DCI including scheduling information for a PDSCH on which the RA MSG-B is transmitted by using the scheduling identifier (e.g., C-RNTI) assigned dedicatedly to the corresponding terminal or the scheduling identifier for transmission of the RAR (e.g., RA-RNTI or RNTI for transmission and reception of the RA MSG-B). The DCI may be transmitted on a PDCCH.

Accordingly, the terminal may receive the DCI by performing a PDCCH monitoring operation using the scheduling identifier for reception of the RAR or the scheduling identifier assigned to itself. The terminal may obtain one or more among scheduling information for the PDSCH on which the RA MSG-B is transmitted, downlink scheduling information, and uplink scheduling information by receiving the DCI from the base station.

In the step S1003, the base station may transmit DCI including allocation information (e.g., scheduling information) of an uplink radio resource through the PDCCH. Alternatively, in the step S1003, the base station may transmit the RA MSG-B through the PDSCH. The RA MSG-B may be transmitted through the PDSCH (e.g., PDSCH scheduled by the DCI). The RA MSG-B may include some information element(s). For example, the RA MSG-B may include one or more among allocation information of an uplink radio resource (e.g., scheduling information), transmission timing adjustment information, transmission power adjustment information, beam configuration information, retransmission request information of the RA payload of the RA MSG-A (e.g., retransmission indication information), radio resource allocation information for (re) transmission of the RA payload of the RA MSG-A, and a MCS level. Each of the plurality of information elements included in the RA MSG-B may be configured in form of a MAC CE. Alternatively, the plurality of information elements included in the RA MSG-B may be configured in form of one MAC CE. In this case, an additional MAC header format may be used. The transmission operation of the RA MSG-B based on the RA-RNTI may be the transmission operation of the message 2 in the step S903 shown in FIG. 9.

The DCI transmitted in response to the RA MSG-A may include one or more information elements among the information elements included in the above-described RA MSG-B. The terminal may receive the DCI from the base station in response to the RA MSG-A. In this case, the terminal may retransmit the RA payload of the RA MSG-A using the radio resource indicated by the scheduling information included in the DCI. Alternatively, the terminal may transmit the uplink data and/or control information of the step S1004 shown in FIG. 10 to the base station by using the radio resource indicated by the scheduling information included in the DCI.

In the step S1002 according to the CBRA scheme, the base station may receive the RA preamble of the RA MSG-A from the terminal. When a decoding operation of the RA payload of the RA MSG-A fails or when the RA payload of the RA MSG-A is not received before expiry of a preconfigured timer (e.g., $T_{2\text{-}stepRA}$ or $T_{2\text{-}stepMsgA}$), the base station may not be able to identify the terminal that initiated the 2-step random access procedure based on the RA preamble of the RA MSG-A. In this case, when the preconfigured timer expires, the base station may transmit the RA MSG2 of the step S903 shown in FIG. 9 or the RA MSG-B (e.g., fallback RAR) configured in the same manner as the RA MSG2 to the terminal. That is, the 2-step random access procedure may be switched to the 4-step random access procedure. Therefore, the terminal transmitting the RA MSG-A in the step S1002 according to the CBRA scheme may perform the PDCCH monitoring operation (e.g., PDCCH monitoring operation on a UE specific search space (USS)) for receiving the RA MSG-B of the step S1003 shown in FIG. 10 together with the PDCCH monitoring operation (e.g., PDCCH monitoring operation on a common search space (CSS)) for receiving the RA MSG2 of the step S903 shown in FIG. 9.

When the RA MSG-B (e.g., fallback RAR) or the RA MSG2 is received from the base station after the step S1002, the terminal may transmit the RA MSG3 of the step S904 shown in FIG. 9 to the base station. That is, when the RA MSG-B (e.g., fallback RAR) or the RA MSG2 is received from the base station, the terminal may determine that the 2-step random access procedure has been switched to the 4-step random access procedure, and may transmit the RA MSG3 of the 4-step random access procedure to the base station. The base station may receive the RA MSG3 from the terminal, and may transmit the RA MSG4 to the terminal.

On the other hand, when the base station receives only the RA payload of the RA MSG-A, the following operations may be performed. In the step S1002 according to the CFRA scheme, the terminal may transmit the RA MSG-A including the RA preamble and the RA payload to the base station. The base station may receive only the RA payload of the RA MSG-A. That is, the base station may not receive the RA preamble of the RA MSG-A. In this case, the base station may identify the terminal identifier based on the information element(s) included in the RA payload of the RA MSG-A. Alternatively, the base station may obtain information for identifying the terminal that has transmitted the RA payload based on a resource allocation rule according to the CFRA scheme. For example, when the transmission resource of the RA payload is allocated dedicatedly to the terminal or when the transmission resource of the RA payload is allocated dedicatedly to the terminal and the transmission resource of the RA preamble is mapped to the transmission resource of the RA payload, the terminal may identify the terminal that initiated the random access procedure based on the resource through which the RA payload is received according to the resource allocation rule according to the CFRA scheme.

When only the RA payload of the RA MSG-A is received, and the terminal that initiated the corresponding random access procedure is identified based on the RA payload, the base station may transmit the RA MSG-B of the step S1003 shown in FIG. 10 to the terminal.

The base station receiving the RA preamble may transmit DCI including scheduling information for a PDSCH on which the RA MSG-B is transmitted by using the terminal-specific scheduling identifier or the scheduling identifier for transmission of the RAR (e.g., MSG-B RA-RNTI). The DCI may be transmitted on the PDCCH. Here, the base station may transmit uplink resource allocation information to the terminal through the PDCCH. The base station may transmit the RA MSG-B to the terminal through the PDSCH indicated by the scheduling information included in the DCI. The RA MSG-B may include the above-mentioned information element(s). The transmission operation of the RA MSG-B based on the RA-RNTI may be the same as or similar to the transmission operation of the RA MSG2 in the step S903 shown in FIG. 9.

The DCI transmitted in response to the message 1 (e.g., RA MSG-A, RA preamble) may include one or more among uplink resource allocation information (e.g., scheduling information), transmission timing adjustment information, transmission power adjustment information, and resource allocation information for transmission of the RA payload. When only the DCI is received in response to the RA MSG-A, the terminal may retransmit the RA MSG-A (e.g., RA payload) of the step S1002 shown in FIG. 10 by using the radio resource indicated by the scheduling information included in the DCI. Alternatively, the terminal may transmit the uplink data and/or control message of the step S1004 shown in FIG. 10 by using the radio resource indicated by the scheduling information included in the DCI.

In the step S1002 according to the CBRA scheme, the base station may receive the RA preamble of the RA MSG-A from the terminal. When a decoding operation of the RA payload of the RA MSG-A fails or when the RA payload of the RA MSG-A is not received before expiry of a preconfigured timer (e.g., $T_{2\text{-}stepRA}$ or $T_{2\text{-}stepMsgA}$), the base station may not be able to identify the terminal that initiated the 2-step random access procedure based on the RA preamble of the RA MSG-A. In this case, when the preconfigured timer expires, the base station may transmit the RA MSG2 of the step S903 shown in FIG. 9 to the terminal. That is, the 2-step random access procedure may be switched to the 4-step random access procedure. Therefore, the terminal transmitting the RA MSG-A in the step S1002 according to the CBRA scheme may perform the PDCCH monitoring operation (e.g., PDCCH monitoring operation on a USS) for receiving the RA MSG-B of the step S1003 shown in FIG. 10 together with the PDCCH monitoring operation (e.g., PDCCH monitoring operation on a CSS) for receiving the message 2 (e.g., RA MSG2 or fallback RAR) of the step S903 shown in FIG. 9.

The RA-RNTI for the MSG-B with SRB may be configured differently from the RA-RNTI for the MSG-B with UEsMux. In this case, the terminal may perform a PDCCH monitoring operation based on the RA-RNTI for the MSG-B with SRB and a PDCCH monitoring operation based on the RA-RNTI for the MSG-B with UEsMux.

When the RA MSG2 of the 4-step random access procedure is received instead of the RA MSG-B of the 2-step random access procedure after the step S1002, the terminal may transmit the RA MSG3 of the step S904 shown in FIG. 9 to the base station. In this case, the RA MSG3 may be configured based on the RA payload of the RA MSG-A. The RA MSG3 may include information element(s) constituting the RA payload of the RA MSG-A. When the configuration of the RA MSG3 is different from the configuration of the RA payload of the RA MSG-A, the RA MSG3 and the RA payload of the RA MSG-A may be distinguished by using a field and/or LCID in a MAC header (or MAC subheader). When the RA MSG3 of the step S904 shown in FIG. 9 is received from the terminal, the base station may transmit the RA MSG4 of the step S905 to the terminal.

When the 2-step random access procedure is switched to the 4-step random access procedure, the terminal may identify whether the RAR received from the base station is the RA MSG-B (e.g., fallback RAR) of the 2-step random access procedure or the RA MSG2 of the 4-step random access procedure. For this operation, the base station may indicate whether the RAR is the RA MSG-B (e.g., fallback RAR) of the 2-step random access procedure or the RA MSG2 of the 4-step random access procedure based on the following methods.

Method #1: Method of configuring the scheduling identifier for transmission of the RA MSG-B (e.g., fallback RAR) differently from the scheduling identifier for transmission of the RA MSG2

Method #2: Method of configuring each of the CORESET, search interval, and PDCCH for the scheduling information of the RA MSG-B (e.g., fallback RAR) differently from each of the CORESET, search interval, and PDCCH for the scheduling information of the RA MSG2

Method #3: Method in which DCI (e.g., a specific field in the DCI) includes information indicating that the scheduling information included in the DCI is scheduling information for the RA MSG-B (e.g., fallback RAR) or the RA MSG2

Method #4: Method in which the RAR includes information indicating whether the corresponding RAR is the RA MSG-B (e.g., fallback RAR) or the RA MSG2

The RA MSG-B of the 2-step random access procedure may be distinguished from the RA MSG2 of the 4-step random access procedure by the scheduling identifier (e.g., RA-RNTI) of the RAR. In this case, the RA MSG-B may be transmitted based on scheduling information addressed by the RA-RNTI configured for the RA MSG-B, and the RA MSG2 may be transmitted based on scheduling information addressed by the RA-RNTI configured for the RA MSG2.

Alternatively, when the 2-step random access procedure is switched to the 4-step random access procedure, a separate RA-RNTI for the message 2 (e.g., fallback RA-RNTI) may be allocated. The terminal that initiated the 2-step random access procedure may transmit the RA MSG2 of the 4-step random access procedure. In this case, the RA MSG2 may be transmitted based on scheduling information addressed by the fallback RA-RNTI.

The scheduling information for the transmission resource of the RA MSG-B may be transmitted and received using the RA-RNTI configured for the RA MSG-B. The scheduling information for the transmission resource of the fallback RAR may be transmitted and received using the RA-RNTI for the 4-step random access procedure or the RA-RNTI configured for the fallback RAR. Therefore, the RA-RNTI for the RA MSG2, the RA-RNTI for the RA MSG-B (e.g., successful RAR), and the RA-RNTI for the fallback RAR may be configured differently, and the configured RA-RNTIs may be signaled from the base station to the terminal. The RA MSG-B may be classified into a successful RAR and a fallback RAR. The successful RAR may be an RA MSG-B transmitted from the base station that has successfully received both the RA preamble and RA payload of the RA MSG-A. The fallback RAR may be an RA MSG-B transmitted from the base station that has received only the RA preamble of the RA MSG-A.

The CORESET, search interval, and/or PDCCH may be configured differently for the RA MSG2, successful RAR, and/or fallback RAR. The base station may configure a different CORESET, search interval, and/or PDCCH resource for each message 2 (e.g., RA MSG2, successful RAR, fallback RAR), and transmit configuration information of the CORESET, search interval, and/or PDCCH resource to the terminal by using system information and/or a control message (e.g., dedicated control message).

Alternatively, the DCI including resource allocation information (e.g., scheduling information) of a PDSCH on which the message 2 is transmitted may include a field indicating whether the message 2 scheduled by the DCI is the RA MSG2, the successful RAR, or the fallback RAR. In this case, the terminal may receive the DCI including the scheduling information by using the RA-RNTI, and identify whether the message 2 scheduled by the DCI is the RA MSG2, the successful RAR, or the fallback RAR based on the field included in the DCI.

Alternatively, a separate MAC subheader for transmission of the message 2 or an 'MsgB-type' field indicating a format of the RA MSG-B may be configured. The MAC subheader or the MsgB-type field may indicate whether the message 2 is the RA MSG2, the successful RAR, or the fallback RAR. The base station may transmit the MAC subheader or the MsgB-type field indicating whether the message 2 is the RA MSG2, the successful RAR, or the fallback RAR. The terminal may receive the MAC subheader or the MsgB-type field from the base station, and may identify whether the message 2 is the RA MSG2, the successful RAR, or the fallback RAR based on the MAC subheader or the MsgB-type field.

When the carrier aggregation (CA) function is supported, a plurality of cells (or base stations) may provide communication services to the terminal. A primary cell (PCell) controlling CA operations may activate or deactivate a secondary cell (SCell) supporting the CA function. In addition, the terminal may perform the CFRA procedure or the CBRA procedure with each of PCell and SCell for a beam recovery procedure with the plurality of cells. When a radio resource for the CFRA procedure is allocated dedicatedly to the terminal, if the quality of the radio resource does not satisfy the existing condition, the terminal may perform the CBRA procedure instead of the CFRA procedure for beam recovery.

The CFRA procedure or the CBRA procedure may be performed for beam recovery of each of PCell and SCell. In this case, the terminal may transmit to the base station one or more among the terminal identifier, configured beam information (e.g., TCI state, CSI-RS index, or SS/PBCH index capable of identifying a beam), beam measurement result information, and cell measurement result information by using the RA MSG3 or the RA payload of the RA MSG-A. In addition, the terminal may transmit information of a preferred beam to the base station.

When the random access procedure is performed to support mobility of the terminal, the terminal may transmit information requesting deactivation of the base station (or cell) by using the RA MSG3 or the RA payload of the RA MSG-A. For example, when a source base station and a target base station simultaneously provide communication services to the terminal in a handover procedure, the terminal may transmit information requesting (or, information triggering) deactivation of the source base station or the target base station by using the RA MSG3 or the RA payload of the RA MSG-A. In this case, the terminal may transmit the identifier of the base station required to be deactivated together with the information requesting deactivation.

In the handover procedure, a beam failure or an RLF may occur. In this case, the base station and the terminal may store/maintain context information (e.g., RRC context information, AS context information) until expiry of a preconfigured timer (e.g., $T_{RRC\_CONT}$). When a beam failure or an RLF occurs in the handover procedure, an RRC connection re-establishment procedure may be performed. In this case, if the RRC connection re-establishment procedure is completed before the expiry of the preconfigured timer (e.g. $T_{RRC\_CONT}$), the base station and the terminal may reuse the stored context information (e.g., RRC context information, AS context information).

In this case, in the CBRA procedure or the CFRA procedure performed in the RRC connection re-establishment procedure, some parameter(s) may be reconfigured based on the measurement result described above. In the RRC connection re-establishment procedure, some parameter(s) of the context information between the base station and the terminal may be updated (e.g., changed), and the remaining parameter(s) of the context information may be reused. For example, beam configuration parameter(s) or BWP configuration parameter(s) of the context information may be newly configured, and the remaining parameter(s) of the context information may be maintained. For this operation, the base station may configure the $T_{RRC\_CONT}$ and deliver the $T_{RRC\_CONT}$ to the terminal using system information and/or a control message (e.g., dedicated control message).

Each of the RA MSG1 of the 4-step random access procedure and the RA MSG-A of the 2-step random access procedure may be transmitted one or more times within one random access opportunity (e.g., random access occasion (RO)). The terminal may repeatedly transmit the RA MSG1 or the RA MSG-A by using different radio resources in the time and/or frequency domain before receiving the message 2 from the base station. In such the repetitive transmission procedure, the terminal may randomly select a random access (RA) resource based on a mapping relationship for the SS/PBCH index or the CSI-RS index (e.g., a resource index of CSI-RS). Alternatively, in such the repetitive transmission procedure, the terminal may select a radio resource associated with the initially-selected RA resource (e.g., transmission resource of the RA MSG1, transmission resource of the RA MSG-A (e.g., RA preamble, RA payload)) according to a mapping relationship.

For the BFR procedure or the handover procedure, the base station may allocate a plurality of RA resources dedicatedly to the terminal (e.g., CFRA scheme). For example, the base station may transmit information of a plurality of RA resources mapped to a plurality of beams to the terminal. Alternatively, the base station may transmit information of a plurality of RA resources configured in the time and/or frequency domain to the terminal regardless of the beams. The terminal may receive the information of the dedicatedly allocated RA resources from the base station, and may repeatedly transmit the RA MSG1 or the RA MSG-A by using the plurality of RA resources.

When uplink physical layer synchronization between a plurality of terminals is maintained in the OFDMA-based communication system, interferences between the plurality of terminals may be reduced. The base station may transmit transmission timing adjustment information (e.g., TA information) to the terminal. The terminal may adjust uplink physical layer synchronization with the base station based on the transmission timing adjustment information received from the base station. Therefore, signals received from the plurality of terminals may be aligned at the base station within a specific time period, and in this case, interferences between the plurality of terminals may be reduced.

In the 2-step random access procedure, the terminal may transmit the RA payload of the RA MSG-A to the base station without the transmission timing adjustment information. When the uplink synchronization between the terminal and the base station is not maintained, the RA payload of the RA MSG-A may cause interference between the terminals, and the reception performance of the RA payload of the RA MSG-A may deteriorate. To solve this problem, a transmission gap may be configured in a front part of an uplink radio resource (e.g., PUSCH) through which the RA payload of the RA MSG-A is transmitted.

FIG. 11 is a conceptual diagram illustrating a first exemplary embodiment of an RA MSG-A transmission method in a communication system.

Referring to FIG. 11, a PUSCH resource for a first terminal may be aligned with a subframe. For example, a starting time point of the PUSCH resource for the first terminal may be aligned at a starting time point of a subframe #2 in the time domain, and an ending time point of the PUSCH resource for the first terminal may be aligned at an ending time point of the subframe #2 in the time domain. The transmission resource of the RA payload of the RA MSG-A may be allocated in the subframe #2. In the subframe #2, a transmission gap may be configured before the transmission resource of the RA payload of the RA MSG-A. The RA payload of the RA MSG-A may be transmitted using a transmission resource after the transmission gap. The exemplary embodiment shown in FIG. 11 may be applied even when the transmission resource of the PUSCH and the RA payload is configured in a slot or a mini-slot instead of a subframe.

The subframe in which the transmission resource of the RA payload of the RA MSG-A is located may be the same as the subframe in which the transmission resource for the uplink transmission procedure (e.g., PUSCH of the first terminal) other than the random access procedure is located. Alternatively, the subframe in which the transmission resource of the RA payload of the RA MSG-A is located may be different from the subframe in which the transmission resource for the uplink transmission procedure (e.g., PUSCH of the first terminal) other than the random access procedure is located.

For example, a subframe #1 may be configured as a radio resource (e.g., RA resource) for the random access procedure, and other subframes (e.g., subframes #2 to #3) may be configured as radio resources for a general uplink transmission procedure other than the random access procedure. The transmission gap may be configured in units of symbols or as an absolute time. The base station may transmit information indicating whether a transmission gap exists and length information of the transmission gap to the terminal (e.g., second terminal) by using system information and/or a control message (e.g., a dedicated control message).

The second terminal may identify the information indicating whether a transmission gap exists and the length information of the transmission gap by receiving the system information and/or control message (e.g., dedicated control message) from the base station before performing the 2-step random access procedure. When a transmission gap exists, the second terminal may transmit the RA payload of the RA MSG-A to the base station by using a radio resource after the transmission gap. When no transmission gap exists, the second terminal may transmit the RA payload of the RA MSG-A to the base station based on an estimated subframe synchronization. In this case, the RA payload of the RA MSG-A may be transmitted from the starting time point of the subframe. For example, the transmission resource of the RA payload of the RA MSG-A may be configured identically to that of the PUSCH in the subframe #2.

The transmission gap may be used for transmission of a reference signal or a preamble signal for the 2-step random access procedure (e.g., RA MSG-A). The reference signal (or preamble signal) may be a signal designed to compensate for a delay spread of the base station or a transmission delay in a radio section. The reference signal (or preamble signal) may be designed in consideration of the cyclic prefix (CP) of the OFDMA symbol. The reference signal (or preamble signal) may be transmitted in the transmission gap. Alternatively, the reference signal (or preamble signal) may be transmitted through a radio resource after the transmission gap. The RA payload of the RA MSG-A may be transmitted after transmission of the reference signal (or preamble signal). For example, in the time domain, the transmission resource of the reference signal (or preamble signal) may be located after the transmission gap, and the transmission resource of the RA payload of the RA MSG-A may be located after the transmission resource of the reference signal (or preamble signal).

Figure 12A:
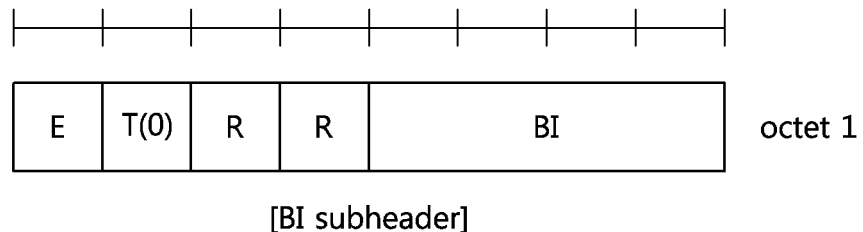
FIG. 12A is a conceptual diagram illustrating a first exemplary embodiment of a MAC subheader in a random access procedure.
Figure 12B:
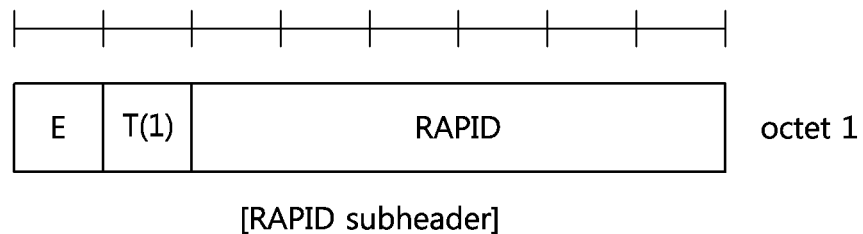
FIG. 12B is a conceptual diagram illustrating a second exemplary embodiment of a MAC subheader in a random access procedure.
Figure 12C:
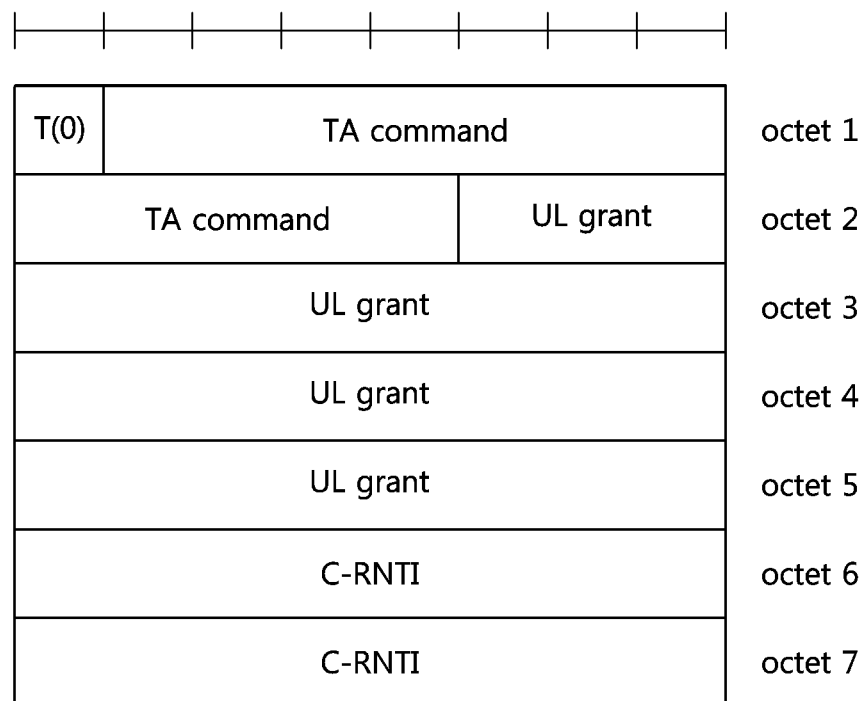
FIG. 12C is a conceptual diagram illustrating a first exemplary embodiment of an RA MSG-B in a random access procedure.
Figure 12D:
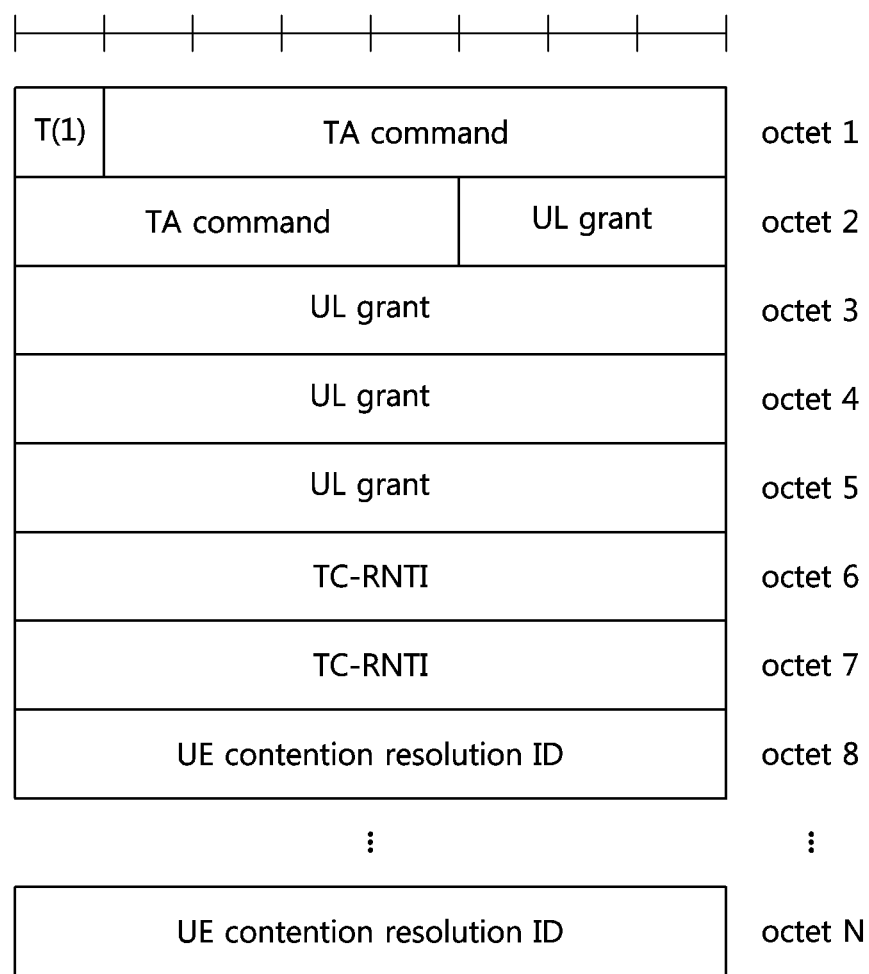
FIG. 12D is a conceptual diagram illustrating a second exemplary embodiment of an RA MSG-B in a random access procedure.
Figure 12E:
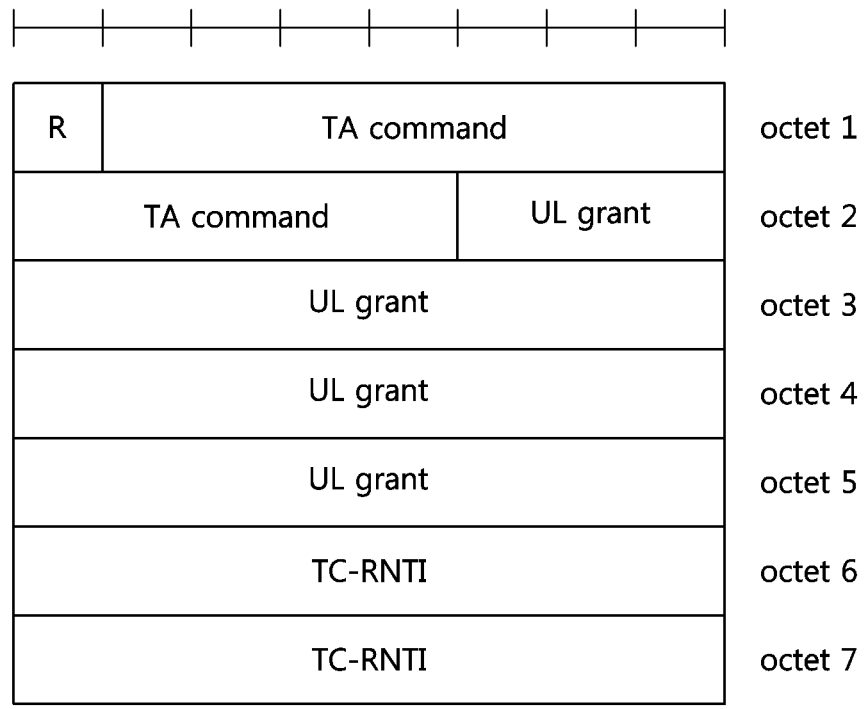
FIG. 12E is a conceptual diagram illustrating a third exemplary embodiment of an RA MSG-B in a random access procedure.
Figure 12F:
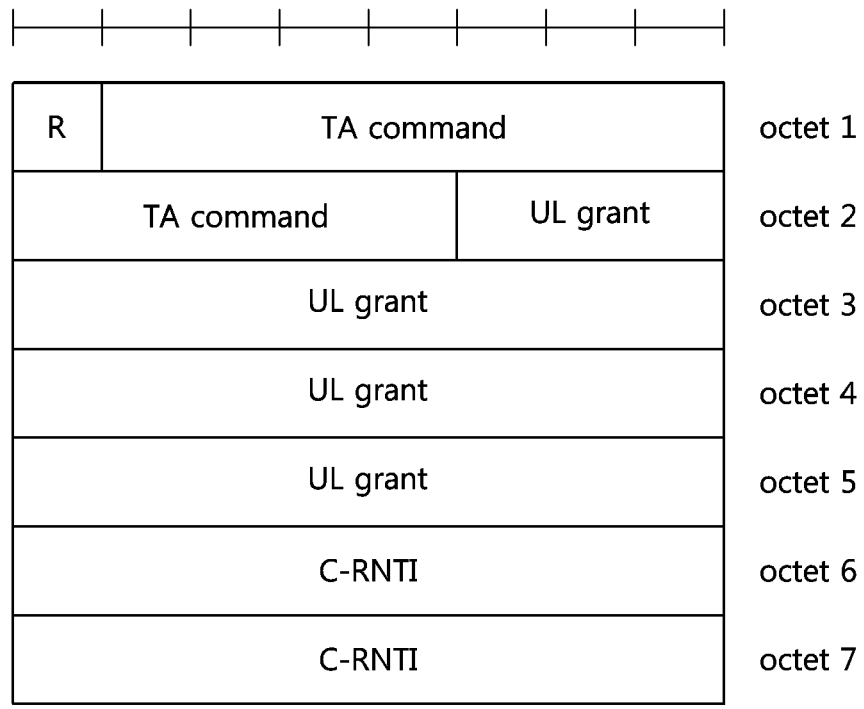
FIG. 12F is a conceptual diagram illustrating a fourth exemplary embodiment of an RA MSG-B in a random access procedure.

FIG. 12A is a conceptual diagram illustrating a first exemplary embodiment of a MAC subheader in a random access procedure, FIG. 12B is a conceptual diagram illustrating a second exemplary embodiment of a MAC subheader in a random access procedure, FIG. 12C is a conceptual diagram illustrating a first exemplary embodiment of an RA MSG-B in a random access procedure, FIG. 12D is a conceptual diagram illustrating a second exemplary embodiment of an RA MSG-B in a random access procedure, FIG. 12E is a conceptual diagram illustrating a third exemplary embodiment of an RA MSG-B in a random access procedure, and FIG. 12F is a conceptual diagram illustrating a fourth exemplary embodiment of an RA MSG-B in a random access procedure.

Referring to FIGS. 12A to 12F, the RA MSG-B may be classified into a successful RAR and a fallback RAR. The RA MSG-B may include a MAC header (e.g., MAC subheader) and/or a MAC payload (e.g., MAC RAR or MAC subPDU). Alternatively, when the RA MSG-B includes only the MAC payload (e.g., MAC RAR), the MAC header (e.g., MAC subheader) may be configured separately from the MAC RAR (or MAC subPDU). The exemplary embodiments shown in FIGS. 12C to 12F may be the MAC payload (e.g., MAC RAR).

The MAC subheader included in the RA MSG-B may be a backoff indicator (BI) subheader or a random access preamble identifier or random access preamble index (RAPID) subheader. The BI subheader and the RAPID subheader may be distinguished by using a T field of the MAC subheader. As shown in FIG. 12A, a MAC subheader having the T field set to '0' may be a BI subheader, and as shown in FIG. 21B, a MAC subheader having the T field set to '1' may be an RAPID subheader. When the terminal performs the random access procedure to request transmission of system information, the RA MSG-B in the corresponding random access procedure may include an RAPID subheader.

The RA MSG-B may be transmitted based on scheduling information addressed by the scheduling identifier (e.g., MSG-B RA-RNTI) for the 2-step random access procedure. The RAPID subheader shown in FIG. 12B may be generated based on the RA preamble of the RA MSG-A. The RAPID of the RAPID subheader may indicate the RA preamble index of the RA MSG-A. The T field included in each of the BI subheader and the RAPID subheader may be used to distinguish different RA MSG-Bs (e.g., MAC RARs).

When the C-RNTI is assigned to the terminal and the RA MSG-A is received from the terminal, as shown in the exemplary embodiment shown in FIG. 12C, the T field may be set to '0'. The RA MSG-B may include transmission timing adjustment information (e.g., TA command), uplink resource allocation information (e.g., UL grant), and the C-RNTI assigned to the terminal. When the C-RNTI is not assigned to the terminal and the RA MSG-A is received from the terminal, as shown in the exemplary embodiment shown in FIG. 12D, the T field may be set to '1'. The RA MSG-B may include transmission timing adjustment information (e.g., TA command), uplink resource allocation information (e.g., UL grant), TC-RNTI, and a UE contention resolution ID for contention resolution. The UE contention resolution ID may be the terminal identifier (e.g., UE ID) included in the RA payload of the RA MSG-A. When the size of the UE contention resolution ID is 6 bytes (i.e., 48 bits), an octet N in FIG. 12D may be an octet #13.

In the RA MSG-B shown in FIG. 12D, the UE contention resolution ID may be omitted. In this case, the UE contention resolution ID may be transmitted in form of a MAC CE. For example, the RA MSG-B may be configured with a MAC CE including the information element(s) shown in FIG. 12D and a separate MAC CE including the UE contention resolution ID. When the RA MSG-B includes two MAC CEs, the two MAC CEs may be transmitted in the same radio resource region. Alternatively, the two MAC CEs may be transmitted through different radio resource regions. Alternatively, the RA MSG-B may include 'MAC CE+RRC control information' or 'MAC CE+downlink data'. The RRC control information or downlink data may be transmitted in a transmission resource for the second MAC CE of the RA MSG-B.

A MAC RAR format for the RA MSG-B may be the same as a MAC RAR format for the RA MSG2. In this case, the scheduling identifier (e.g., RA-RNTI, MSG-B RA-RNTI) for transmission of the message 2 may be shared in the 2-step random access procedure and the 4-step random access procedure.

The exemplary embodiment shown in FIG. 12E may be a MAC RAR for the RA MSG2. When the C-RNTI is not assigned to the terminal and the RA MSG-A is received from the terminal, the base station may transmit the RA MSG-B including timing adjustment information (e.g., TA information), uplink resource allocation information (e.g., UL grant), and a scheduling identifier (e.g., TC-RNTI) to the terminal. The UE contention resolution ID may be transmitted through a MAC header (or MAC subheader), and the LCID may be transmitted through a separate MAC CE. The RA MSG-B including the UE contention resolution ID may be configured as in the exemplary embodiment shown in FIG. 12D. In this case, a T field of an octet #1 may be replaced with an R field.

In the exemplary embodiment shown in FIG. 12F, when the C-RNTI is assigned to the terminal and the RA MSG-A is received from the terminal, the base station may transmit to the terminal the RA MSG-B including timing adjustment information (e.g., TA information), uplink resource allocation information (e.g., UL grant), and the scheduling identifier (e.g., C-RNTI) assigned to the terminal.

Figure 13A:
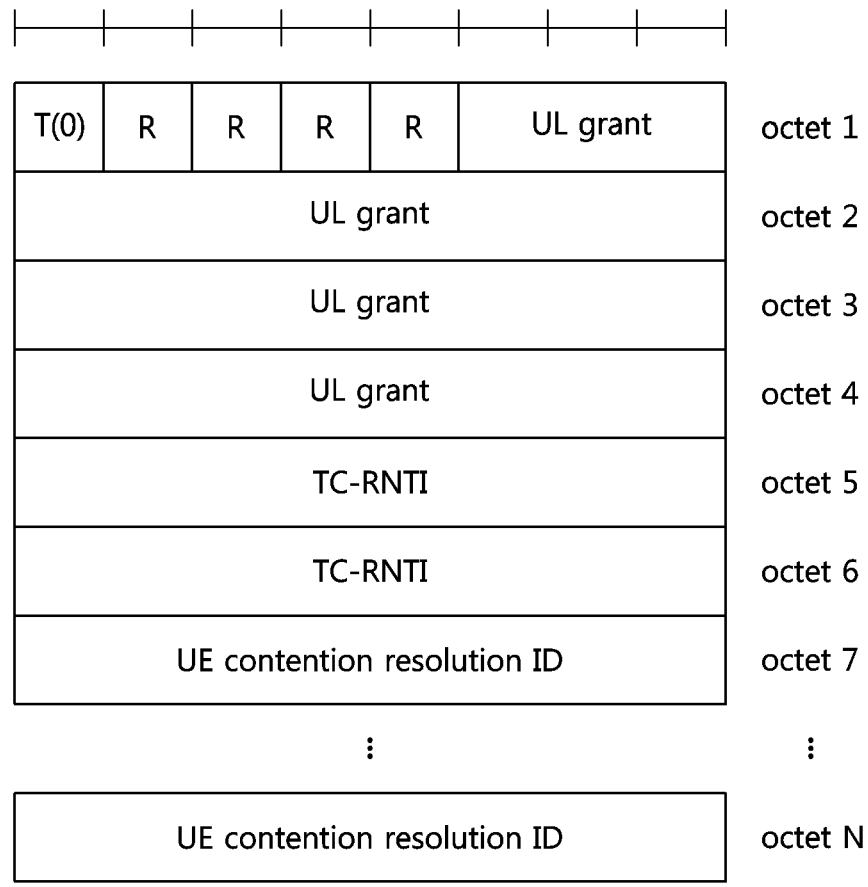
FIG. 13A is a conceptual diagram illustrating a fifth exemplary embodiment of an RA MSG-B in a random access procedure.
Figure 13B:
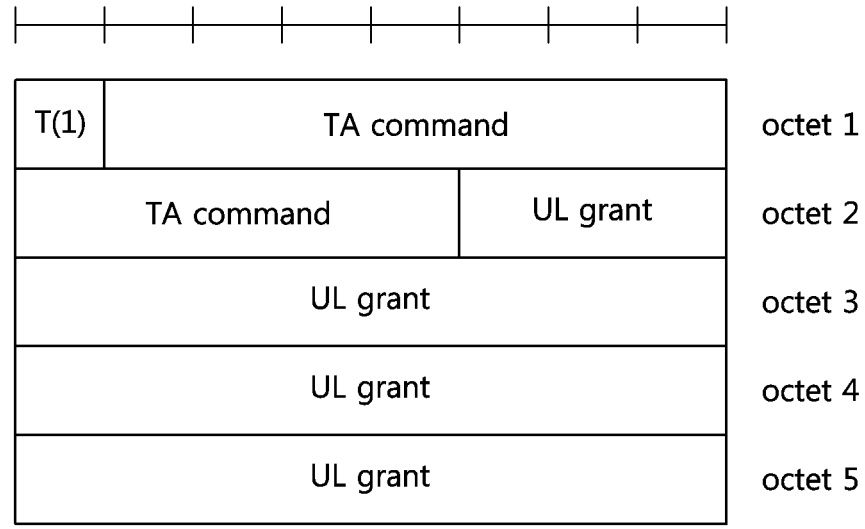
FIG. 13B is a conceptual diagram illustrating a sixth exemplary embodiment of an RA MSG-B in a random access procedure.
Figure 13C:
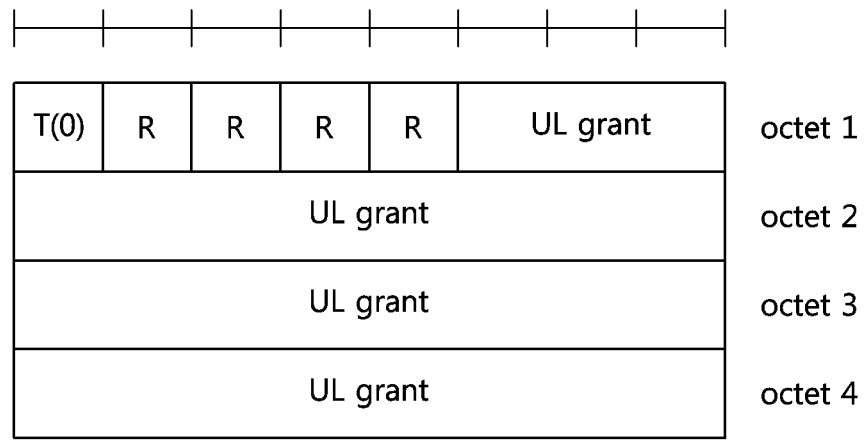
FIG. 13C is a conceptual diagram illustrating a seventh exemplary embodiment of an RA MSG-B in a random access procedure.

FIG. 13A is a conceptual diagram illustrating a fifth exemplary embodiment of an RA MSG-B in a random access procedure, FIG. 13B is a conceptual diagram illustrating a sixth exemplary embodiment of an RA MSG-B in a random access procedure, and FIG. 13C is a conceptual diagram illustrating a seventh exemplary embodiment of an RA MSG-B in a random access procedure.

Referring to FIGS. 13A to 13C, the RA MSG-B may be transmitted based on scheduling information addressed by the RA-RNTI or the C-RNTI. The RA MSG-B may optionally include a BI subheader (e.g., BI subheader shown in FIG. 12A). When the terminal performs a random access procedure to acquire system information, the RA MSG-B may include only an RAPID subheader (e.g., RAPID subheader shown in FIG. 12B).

In the exemplary embodiments of FIGS. 13B and 13C, when the scheduling identifier (e.g., C-RNTI) is not assigned to the terminal and the terminal performs the 2-step random access procedure, the base station may transmit the MSG-B based on the MSG-B RA-RNTI. The RA preamble of the RA MSG-A transmitted by the terminal may include the RAPID subheader shown in FIG. 12B. The base station may receive the RA MSG-A from the terminal, and may transmit the RA MSG-B to the terminal in response to the RA MSG-A. The T field may indicate whether the RA MSG-B includes a TA command.

The RA MSG-B including the T field set to '1' (e.g., RA MSG-B shown in FIG. 12D) may include the following information elements.
    Transmission timing adjustment information (e.g., TA command)
    UL resource allocation information (e.g., UL grant)
    Scheduling identifier (e.g., TC-RNTI)
    UE contention resolution ID The RA MSG-B including the T field set to '0' (e.g., RA MSG-B shown in FIG. 13A) may include the following information elements.
    UL resource allocation information (e.g., UL grant)
    Scheduling identifier (e.g., TC-RNTI)
    UE contention resolution ID The E field included in each of the BI subheader shown in FIG. 12A and the RAPID subheader shown in FIG. 12B may be a field indicating whether the MAC subheader is extended. The E field set to '1' may indicate that another MAC subheader is continuously present after the corresponding MAC subheader. The E field set to '0' may indicate that the corresponding MAC subheader is the last MAC subheader. That is, another MAC subheader may not exist after the MAC subheader including the E field set to '0'.

In the above-described exemplary embodiments, the scheduling identifier (e.g., MSG-B RA-RNTI, RA-RNTI, C-RNTI) for scheduling information of the message 2 may vary according to whether the C-RNTI is assigned to the terminal that attempted the 2-step random access procedure. Alternatively, the base station may transmit the scheduling information of the message 2 to the terminal by using the scheduling identifier regardless of whether the C-RNTI is assigned, and may transmit the message 2 (e.g., RA MSG2, RA MSG-B) to the terminal based on the scheduling information.

For example, when the base station receives the RA MSG-A including the C-RNTI in consideration of the downlink radio resource or the RAR window or when the base station recognizes the C-RNTI of the terminal that initiated the 2-step random access procedure according to the CFRA scheme, the base station may transmit DCI including scheduling information to the terminal by using the MSG-B RA-RNTI or the RA-RNTI, and may transmit the message 2 (e.g., RA MSG-B) to the terminal by using the resource indicated by the scheduling information. The base station may transmit the message 2 having the same format to the terminal regardless of whether the C-RNTI is assigned. Therefore, the terminal transmitting the RA MSG-A may perform a PDCCH monitoring operation by using both of the MSG-B RA-RNTI (or RA-RNTI) and the C-RNTI to receive the RA MSG-B. When the MSG-B RA-RNTI for the MSG-B with SRB is configured differently from the MSG-B RA-RNTI for the MSG-B with UEsMux, the terminal may perform the PDCCH monitoring operation by both of the MSG-B RA-RNTI for the MSG-B with SRB and the MSG-B RA-RNTI for the MSG-B with UEsMux.

Meanwhile, the terminal may receive the MSG-B with UEsMux that does not include RRC control information. In this case, the terminal may perform a PDCCH monitoring operation by using the TC-RNTI included in the MSG-B with UEsMux to receive an RRC message or a DRB packet. In the 2-step random access procedure, the PDSCH on which the MSG-B with UEsMux is transmitted may be configured differently from a PDSCH on which the RRC message or the DRB packet is transmitted. The base station may transmit the MSG-B with UEsMux on the PDSCH, and may transmit the DRB packet on another PDSCH. In this case, the terminal may perform a PDCCH monitoring operation by using both of the MSG-B RA RNTI for the MSG-B with UEsMux and the TC-RNTI included in the MSG-B with UEsMux to receiving scheduling information of the MSG-B with UEsMux and the RRC message (or DRB packet).

When the RA MSG-B is transmitted based on the scheduling information addressed by the MSG-B RA-RNTI in the 2-step random access procedure, the base station may transmit the message 2 (e.g., RA MSG-B) to one or more terminals according to the exemplary embodiments shown in FIGS. 12 and 13. A separate MAC subheader or an 'MsgB-type' field indicating a format type of the RA MSG-B may indicate information element(s) included in the RA MSG-B. The RA MSG-B may include one or more among TA information, UL grant, TC-RNTI, UE ID, beam configuration information, and TCI state information.

In addition, the MAC subheader may indicate whether the corresponding message 2 is the RA MSG2, the successful RAR, or the fallback RAR. For example, the terminal may transmit the RA MSG-A to the base station, and may receive the message 2 from the base station. The terminal may identify whether the corresponding message 2 is the RA MSG2, the successful RAR, or the fallback RAR based on the MAC subheader included in the message 2.

The MAC RAR format of each of the successful RAR and fallback RAR may be the same as the MAC RAR format of the exemplary embodiments in FIGS. 12, 13, 14, 16, and 17. The RA MSG-B (e.g., successful RAR, fallback RAR) may include one or more among TA information, UL grant, TC-RNTI, UE ID, beam configuration information, and TCI state information. The RA MSG-B may be generated without the RAPID subheader shown in FIG. 12B. That is, the RA MSG-B may be generated according to the exemplary embodiments shown in FIGS. 14, 16, and 17. In order to transmit the RA MSG-B for one or more terminals, a MAC subheader for identifying the RA MSG-B for each terminal may be generated. The MAC subheader may be located in a front part of the MAC RAR within the MSG-B MAC PDU. That is, it may be configured in form of a separate MAC subheader as shown in the exemplary embodiment shown in FIG. 12. The terminal may identify the number of MAC RARs included in the MSG-B MAC PDU based on the MAC subheader included in the MSG-B MAC PDU.

In the 2-step random access procedure, the terminal may distinguish the successful RAR from the fallback RAR based on the MAC subheader in the MSG-B MAC PDU. The terminal may determine whether the corresponding message 2 is a message 2 for itself by comparing its UE ID (e.g., the UE ID included in the RA MSG-A) with the UE ID included in the message 2. The successful RAR may mean the RA MSG-B transmitted by the base station that has successfully received the RA MSG-A (e.g., RA preamble, RA payload). The base station may generate one MAC PDU including the RA MSG-Bs for one or more terminals, and may transmit the one MAC PDU on a downlink channel (e.g., PDSCH).

When the transmission resource for the RA preamble of the 2-step random access procedure is the same as the transmission resource for the RA preamble of the 4-step random access procedure, and the RA preamble index of the 2-step random access procedure is different from the RA preamble index of the 4-step random access procedure, the RA MSG2 and the fallback RAR may be multiplexed in one MAC PDU. The one MAC PDU including the RA MSG2 and the fallback RAR may be transmitted on a downlink channel (e.g., PDSCH). This operation may be performed when the scheduling identifier (e.g., RA-RNTI) for the 2-step random access procedure is the same as the scheduling identifier for the 4-step random access procedure. Since the RA MSG2 includes the index of the RA preamble included in RA MSG1 transmitted by the terminal, and the RA MSG-B includes the index of the RA preamble included in the RA MSG-A transmitted by the terminal, the terminal may distinguish the RA MSG2 from the RA MSG-B based on the index of the RA preamble transmitted by the terminal.

Figure 14A:
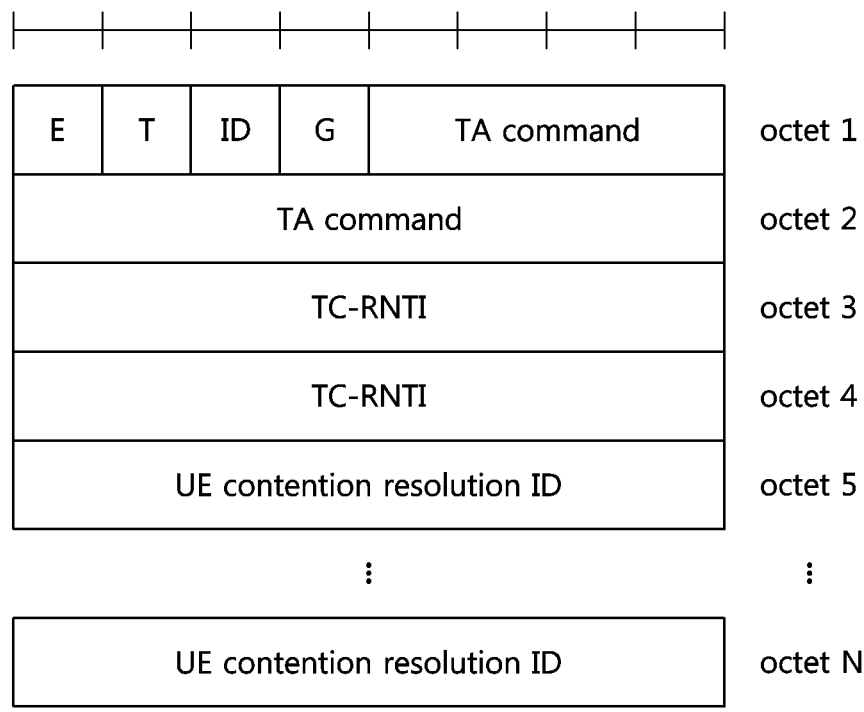
FIG. 14A is a conceptual diagram illustrating an eighth exemplary embodiment of an RA MSG-B in a random access procedure.
Figure 14B:
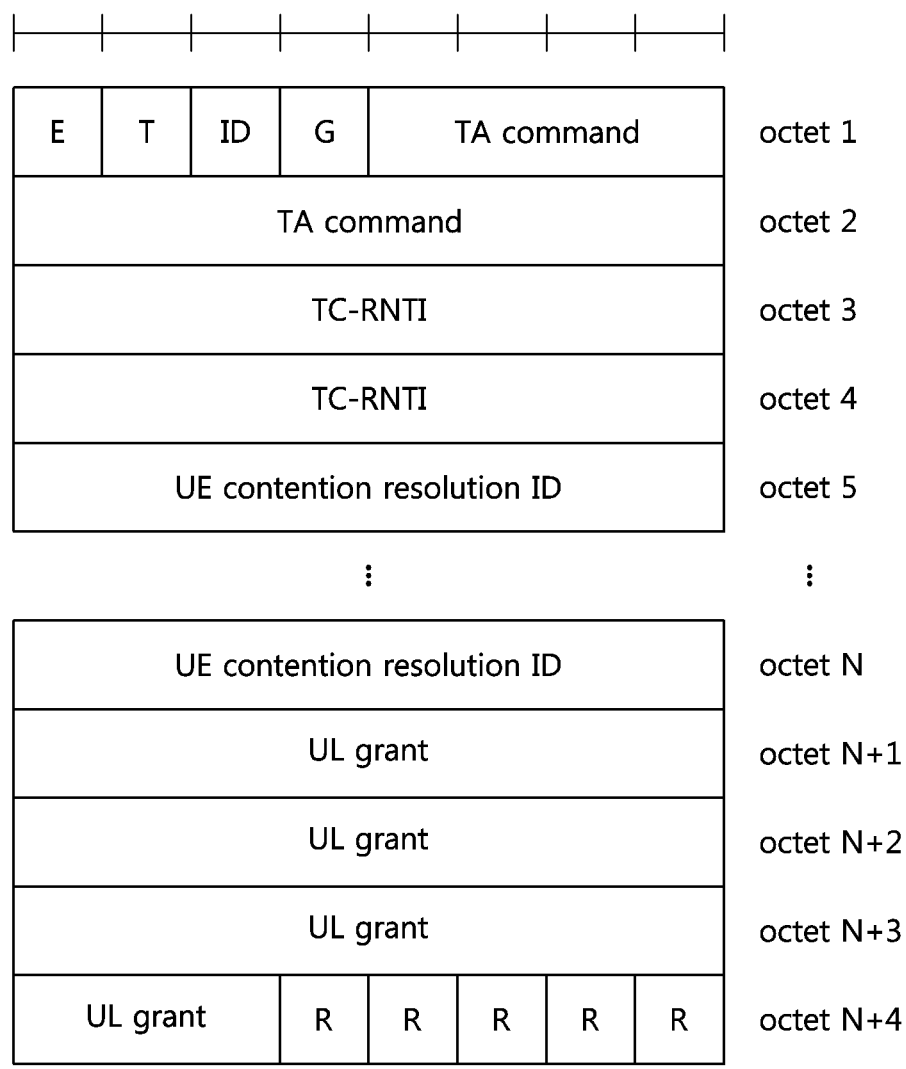
FIG. 14B is a conceptual diagram illustrating a ninth exemplary embodiment of an RA MSG-B in a random access procedure.
Figure 14C:
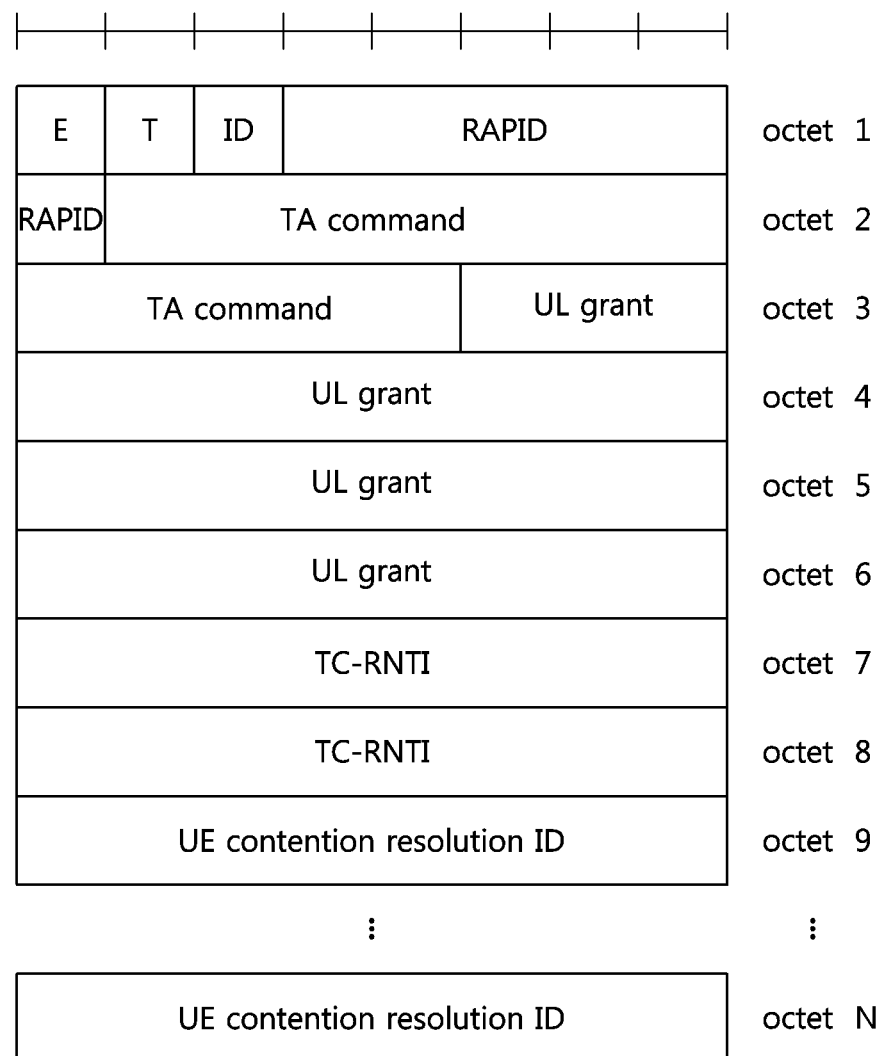
FIG. 14C is a conceptual diagram illustrating a tenth exemplary embodiment of an RA MSG-B in a random access procedure.

FIG. 14A is a conceptual diagram illustrating an eighth exemplary embodiment of an RA MSG-B in a random access procedure, FIG. 14B is a conceptual diagram illustrating a ninth exemplary embodiment of an RA MSG-B in a random access procedure, and FIG. 14C is a conceptual diagram illustrating a tenth exemplary embodiment of an RA MSG-B in a random access procedure.

The exemplary embodiments shown in FIGS. 14A and 14B may be the RA MSG-B generated based on the RAPID subheader, and the exemplary embodiment shown in FIG. 14C may be the RA MSG-B generated without the RAPID subheader. The E field may indicate whether another MAC RAR exists after the corresponding MAC RAR (i.e., the MAC RAR including the corresponding E field). The E field set to '1' may indicate that another MAC RAR exists after the corresponding MAC RAR. The E field set to '0' may indicate that no other MAC RAR exists after the corresponding MAC RAR. That is, the MAC RAR including the E field set to '0' may be the last MAC RAR.

The T field may indicate whether the MAC RAR is a successful RAR or a fallback RAR. The T field set to '1' may indicate that the corresponding MAC RAR (i.e., the MAC RAR including the corresponding T field) is the successful RAR (e.g., RA MSG-B shown in FIG. 14A). The T field set to '0' may indicate that the corresponding MAC RAR is the fallback RAR (e.g., RA MSG-B shown in FIG. 14B). When the RA MSG-B is generated without the RAPID subheader, the fallback RAR may include the RAPID as in the exemplary embodiment shown in FIG. 14C.

When the length of the UE ID (e.g., UE contention resolution ID) included in the MAC RAR is fixed to one of two values, the ID field may indicate whether the UE ID included in the MAC RAR is a long UE ID or a short UE ID. The ID field set to '1' may indicate that the corresponding MAC RAR (i.e., the MAC RAR including the corresponding ID field) includes a long UE ID. The ID field set to '0' may indicate that the corresponding MAC RAR includes a short UE ID. Since the length of the UE ID included in the MAC RAR is fixed to one of two values, the terminal may identify the number of octets representing the UE ID based on the ID field. That is, the terminal may identify N shown in FIG. 14 based on the ID field.

The G field may indicate whether the second message includes a UL grant. The G field set to '1' may indicate that the corresponding second message (i.e., the second message including the G field) includes a UL grant. When the G field included in the successful RAR is set to '1', the corresponding G field may indicate that the successful RAR also includes a UL grant. The G field set to '0' may indicate that the corresponding second message does not include a UL grant. When the G field is set to '1', even if the T field included in the successful RAR is set to '1', the corresponding successful RAR (e.g., RA MSG-B shown in FIG. 14B) may include a UL grant. The UL grant may include one or more among uplink resource allocation information (e.g., resource allocation information in the time and frequency domain), a MCS level, a BWP index, information indicating whether retransmission (or repetitive transmission) is performed, the number of times of retransmissions (or repetitive transmissions), and a time period for the retransmission (or repetitive transmission).

The exemplary embodiments shown in FIGS. 12 to 14 may be the RA MSG-B. The arrangement order of the fields included in the RA MSG-B may be different from the arrangement order of the fields in the exemplary embodiments shown in FIGS. 12 to 14. The RA MSG-B may include some field(s) among the fields shown in FIGS. 12 to 14. The MAC subheader for the RA MSG-B may be the BI subheader described above. The MAC subheader for the successful RAR or the fallback RAR may be the RAPID subheader.

The MAC subheader for the RA MSG-B may further include information indicating the time at which the RA MSG-A was received. The information indicating the time at which the RA MSG-A was received may be expressed by a system frame number (SFN), a subframe index, a slot index, a symbol index, and/or an offset. When the RAPID subheader for the RA MSG-B is used, the corresponding RA MSG-B (e.g., RA MSG-B associated with or corresponding to the RAPID subheader) may be distinguished from other MAC RARs (e.g., RA MSG-B, successful RAR, or fallback RAR associated with the BI subheader). When the BI subheader is transmitted before the successful RAR or the fallback RAR, the BI subheader may be the first MAC subheader among consecutive MAC subheaders. When the RAPID subheader is transmitted before the BI subheader, the BI subheader may be the last MAC subheader among consecutive MAC subheaders.

The MAC subheader (e.g., RAPID subheader) for the successful RAR and the MAC subheader (e.g., RAPID subheader) for the fallback RAR may be not transmitted alternately. The RAPID subheaders for the fallback RAR may be arranged first, and the RAPID subheaders for the successful RAR may be arranged after the last RAPID subheader for the fallback RAR. Alternatively, the RAPID subheaders for the successful RAR may be arranged first, and the RAPID subheaders for the fallback RAR may be arranged after the last RAPID subheader for the successful RAR. When the RAPID subheader for the successful RAR is arranged before the RAPID subheader for the fallback RAR, the fallback RAR may be transmitted after transmission of the successful RAR. Alternatively, when the RAPID subheader for the fallback RAR is arranged before the RAPID subheader for the successful RAR, the successful RAR may be transmitted after transmission of the fallback RAR.

When the RA MSG-B is generated based on the RAPID subheader shown in FIG. 12B, the successful RAR and the fallback RAR may be distinguished based on the control field shown in FIG. 14. For example, successful RAR and the fallback RAR may be distinguished based on the T field. The size of the MAC subheader for the RA MSG-B may be 2 bytes. The MAC subheader having the size of 2 bytes may include the above-described E field, T field (e.g., T field having a size of 2 bits), and the RAPID. The T field set to '00' may indicate that a BI is transmitted. The T field set to '10' may indicate that the corresponding message 2 (e.g., message 2 associated with the MAC subheader including the corresponding T field) is a successful RAR. The T field set to '01' may indicate that the corresponding message 2 is a fallback RAR. The T field set to '11' may indicate that the corresponding message 2 is the RA MSG-B including RRC control information (e.g., MSG-B with SRB). When the T field is set to '11', the MAC subheader and/or the RAR may include an LCID for an RRC message (e.g., RRC control information).

The RAPID subheader may be included in the fallback RAR. When the successful RAR and the fallback RAR are transmitted together, the RAPID subheader may be associated with the fallback RAR. The fallback RAR may be arranged and transmitted according to the arrangement order of the RAPID subheaders. The successful RAR may be arranged after the fallback RAR. That is, the successful RAR may be transmitted after the fallback RAR. The E field may be located in a front part of the successful RAR, and the E field may indicate whether another RAR exists after the successful RAR. The successful RAR may include UE contention resolution ID, TC-RNTI, TA command, and the like. In this case, the arrangement order of the information elements included in the successful RAR may be as follows.

Arrangement order #1: E field→UE contention resolution ID→TC-RNTI→TA command

Arrangement order #2: E field→UE contention resolution ID→TA command→TC-RNTI

Arrangement order #3: UE contention resolution ID→E field→TC-RNTI→TA command

Arrangement order #4: UE contention resolution ID→E field→TA command→TC-RNTI

Arrangement order #5: E field→TC-RNTI→TA command→UE contention resolution ID

Arrangement order #6: E field→TA command→TC-RNTI→UE contention resolution ID

Arrangement order #7: UE contention resolution ID→TC-RNTI→TA command→E field

Arrangement order #8: UE contention resolution ID→TA command→TC-RNTI→E field

Arrangement order #9: TC-RNTI→TA command→UE contention resolution ID→E field

Arrangement order #10: TA command→TC-RNTI→UE contention resolution ID→E field

The MSG-B MAC PDU or the successful RAR may further include an index of a BWP in which an RRC message or uplink message is transmitted after the corresponding successful RAR. The terminal may obtain the BWP index from the RA MSG-B received from the base station, and may obtain scheduling information by performing a PDCCH monitoring operation within the BWP corresponding to the BWP index.

The following exemplary embodiments may be considered in the above-described 2-step random access procedure and 4-step random access procedure. The transmission resources of the RA preamble for each of the 2-step random access procedure and the 4-step random access procedure may be configured based on a PRACH configuration method #1 or a PRACH configuration method #2 below.

PRACH configuration method #1: a PRACH resource for the 2-step random access procedure is configured differently from a PRACH resource for the 4-step random access procedure.

PRACH configuration method #2: a PRACH resource is shared in the 2-step random access procedure and the 4-step random access procedure. The same PRACH resource is used in the 2-step random access procedure and the 4-step random access procedure.

The PRACH resource may be referred to as a RACH occasion (RO). When the PRACH configuration method #1 or PRACH configuration method #2 is used, the following may be considered. The RA MSG-B of the 2-step random access procedure may be distinguished from the RA MSG2 of the 4-step random access procedure. The terminal may identify whether the message 2 (e.g., RA MSG-B) of the 2-step random access procedure is the successful RAR, the fallback RAR, or the RAR including the BI. RAR transmission scenarios may be defined as shown in Table 1 below.

TABLE 1

|  | RA MSG-B (RAR of 2-step random access procedure) | | RA MSG2 (RAR of 4-step random access procedure) |
| --- | --- | --- | --- |
|  | Successful RAR | Fallback RAR |  |
| PRACH configuration method #1 | Case #1: RA-RNTI associated with a separate RO (the successful RAR and the fallback RAR are distinguished through PHY/MAC signaling) Case #2: RA-RNTI associated with a separate RO (RA-RNTI for transmission of the successful RAR), new MSG-B RA-RNTI associated with a separate RO (RA-RNTI for transmission of the fallback RAR) | | RA-RNTI associated with a separate RO |
| PRACH configuration method #2 | Case #3: New MSG-B RA-RNTI associated with a shared/same RO (RA-RNTI for transmission of the successful RAR and the fallback RAR) (the successful RAR and the fallback RAR are distinguished through PHY/MAC signaling) Case #4: New MSG-B RA-RNTIs associated with a shared/same RO (the new MSG-B RA-RNTIs are classified into the RA-RNTI for the successful RAR and the RA-RNTI for the fallback RAR) Case #5: New MSG-B RA-RNTI associated with a shared/same RO (RA-RNTI for transmission of the successful RAR) | | Cast #5: RA-RNTI associated with a shared/same RO (the fallback RAR and the RA MSG2 are distinguished by the index of the RA preamble) |

When the PRACH configuration method #1 of Table 1 is used in the communication system, the successful RAR, the fallback RAR, the BI (e.g., RAR including the BI), and the RA MSG2 may be discriminated according to a case #1 or a case #2. In the case #1, the RA-RNTI for the RA MSG-B may be configured differently from the RA-RNTI for the RA MSG2. When the RO of the 2-step random access procedure is distinguished from the RO of the 4-step random access procedure, the RA-RNTI of the 2-step random access procedure may be configured differently from the RA-RNTI of the 4-step random access procedure.

The RO of the 2-step random access procedure and the RO of the 4-step random access procedure may be distinguished based on a mapping relationship (e.g., association relation) between the PRACHs and the ROs. Here, the PRACH may be a resource in which the message 1 (e.g., RA MSG1, RA MSG-A) is actually transmitted, and the RO may be a candidate resource in which the message 1 can be transmitted. The terminal may distinguish the RA MSG-B from the RA MSG2 by using the RA-RNTI associated with the RO of the 2-step random access procedure and the RA-RNTI associated with the RO of the 4-step random access procedure, which are differently configured. The terminal may distinguish the successful RAR, the fallback RAR, and the BI (e.g., RAR including the BI) based on information obtained by PHY signaling and/or MAC signaling.

In the case #2, one RA-RNTI associated with the RO of the 2-step random access procedure may be used for transmission of the successful RAR, and another RA-RNTI associated with the RO of the 2-step random access procedure may be used for transmission of the fallback RAR. The RA-RNTI may be determined according to an association scheme for the RO of the 4-step random access procedure. According to the new association scheme, a new RA-RNTI (e.g., MSG-B RA-RNTI) associated with the RO of the 2-step random access procedure may be configured, and the new RA-RNTI may be used for transmission of the fallback RAR. In order to configure the new RA-RNTI (e.g., MSG-B RA-RNTI), an offset may be applied to the association scheme for the RO of the 4-step random access procedure.

The scheduling identifier for transmission of the BI (e.g., RAR including the BI) may be the new RA-RNTI (e.g., MSG-B RA-RNTI). Alternatively, the scheduling identifier for transmission of the BI (e.g., RAR including the BI) may be the scheduling identifier for the successful RAR or the fallback RAR. The terminal may distinguish the BI (e.g., RAR including the BI), the successful RAR, and the fallback RAR based on information obtained through PHY signaling and/or MAC signaling.

When the PRACH configuration method #2 of Table 1 is used in the communication system, the successful RAR, the fallback RAR, the BI (e.g., RAR including the BI), and the RA MSG2 may be identified according to a case #3, a case #4, or a case #5. In the PRACH configuration method #2, the RO for the 2-step random access procedure may be the same as the RO for the 4-step random access procedure. Alternatively, the same RO may be shared in the 2-step random access procedure and the 4-step random access procedure. The RA-RNTI associated with the RO for the 4-step random access procedure may be the same as the RA-RNTI associated with the RO for the 2-step random access procedure.

In the case #3, a new MSG-B RA-RNTI may be introduced, and the terminal may distinguish the successful RAR, the fallback RAR, and the BI (e.g., RAR including the BI) based on information obtained through PHY signaling and/or MAC signaling. The new MSG-B RA-RNTI may be configured by applying an offset to the association scheme for the RO for the 4-step random access procedure.

In the case #4, a new MSG-B RA-RNTI for the successful RAR and another new MSG-B RA-RNTI for the fallback RAR may be introduced. The new MSG-B RA-RNTI may be configured by applying an offset to the association scheme for the RO for the 4-step random access procedure. Additional MSG-B RA-RNTI may be allocated for transmission of the BI (e.g., RAR including the BI). Alternatively, the scheduling identifier for transmission of the BI (e.g., RAR including the BI) may be the scheduling identifier for transmission of the successful RAR or the fallback RAR.

In the case #5, a new MSG-B RA-RNTI may be introduced for transmission of the successful RAR. The RA-RNTI for the fallback RAR may be the same as the RA-RNTI for the RA MSG2. The base station may multiplex the fallback RAR and the RA MSG2 in one MAC PDU, and transmit the one MAC PDU on a PDSCH. In addition, the BI (e.g., RAR including the BI) may be multiplexed with the fallback RAR and the RA MSG2 in one MAC PDU. The terminal may distinguish the fallback RAR, the BI (e.g., RAR including the BI), and the RA MSG2 based on information obtained through PHY signaling and/or MAC signaling.

The base station may transmit the parameter(s) for the PRACH configuration method #1, the parameter(s) for the PRACH configuration method #2, and the offset applied to the association scheme for configuration of the new MSG-B RA-RNTI to the terminal through system information and/or a control message (e.g., dedicated control message). The information element(s) transmitted through MAC signaling may be the information element(s) indicated by the field(s) shown in FIGS. 12 to 14. The information element(s) transmitted through PHY signaling may be the information element(s) indicated by field(s) included in DCI.

When the MSG-B RA-RNTI for the successful RAR is configured differently from the MSG-B RA-RNTI for the fallback RAR, the PHY signaling and/or MAC signaling for transmission of the information for identifying the successful RAR and the fallback RAR may not be required. When a plurality of RA MSG-As (e.g., RA preambles) are received from a plurality of terminals in the 2-step random access procedure, the base station may multiplex a plurality of successful RARs (or a plurality of fallback RARs) which are responses for the plurality of RA MSG-As in one MAC PDU, and transmit the one MAC PDU on a PDSCH. In order to distinguish the successful RAR from the fallback RAR, the MAC header, MAC subheader, and/or information element(s) included in the MAC message may be used.

For example, the base station may multiplex one or more successful RARs in one MAC PDU based on one or more RAPID subheaders shown in FIG. 12B, and transmit the one MAC PDU on a PDSCH. In addition, the base station may multiplex one or more fallback RARs in one MAC PDU based on one or more RAPID subheaders shown in FIG. 12B, and transmit the one MAC PDU on a PDSCH. The terminal may receive an RAPID subheader from the base station, and when an index of an RA preamble indicated by the RAPID subheader is the same as the index of the RA preamble transmitted by the terminal, the terminal may receive the successful RAR or fallback RAR mapped with the corresponding RAPID subheader. The BI may be transmitted together with the successful RAR or the fallback RAR. When the random access procedure fails, the BI may be useful. Therefore, the BI may be transmitted together with the fallback RAR. Alternatively, the BI may be transmitted independently of each of the successful RAR and the fallback RAR.

When the MSG-B RA-RNTI for the successful RAR is configured differently from the MSG-B RA-RNTI for the fallback RAR, the terminal may identify the RA MSG-B by using the MSG-B RA-RNTI for the successful RAR. When the RA MSG-B is not identified based on the MSG-B RA-RNTI for the successful RAR, the terminal may identify the RA MSG-B by using the MSG-B RA-RNTI for the fallback RAR. When the RA MSG-B is not identified based on the MSG-B RA-RNTI for the fallback RAR, the terminal may perform the 2-step random access procedure or the 4-step random access procedure according to a preconfigured condition after performing a backoff procedure based on the BI.

Figure 15:
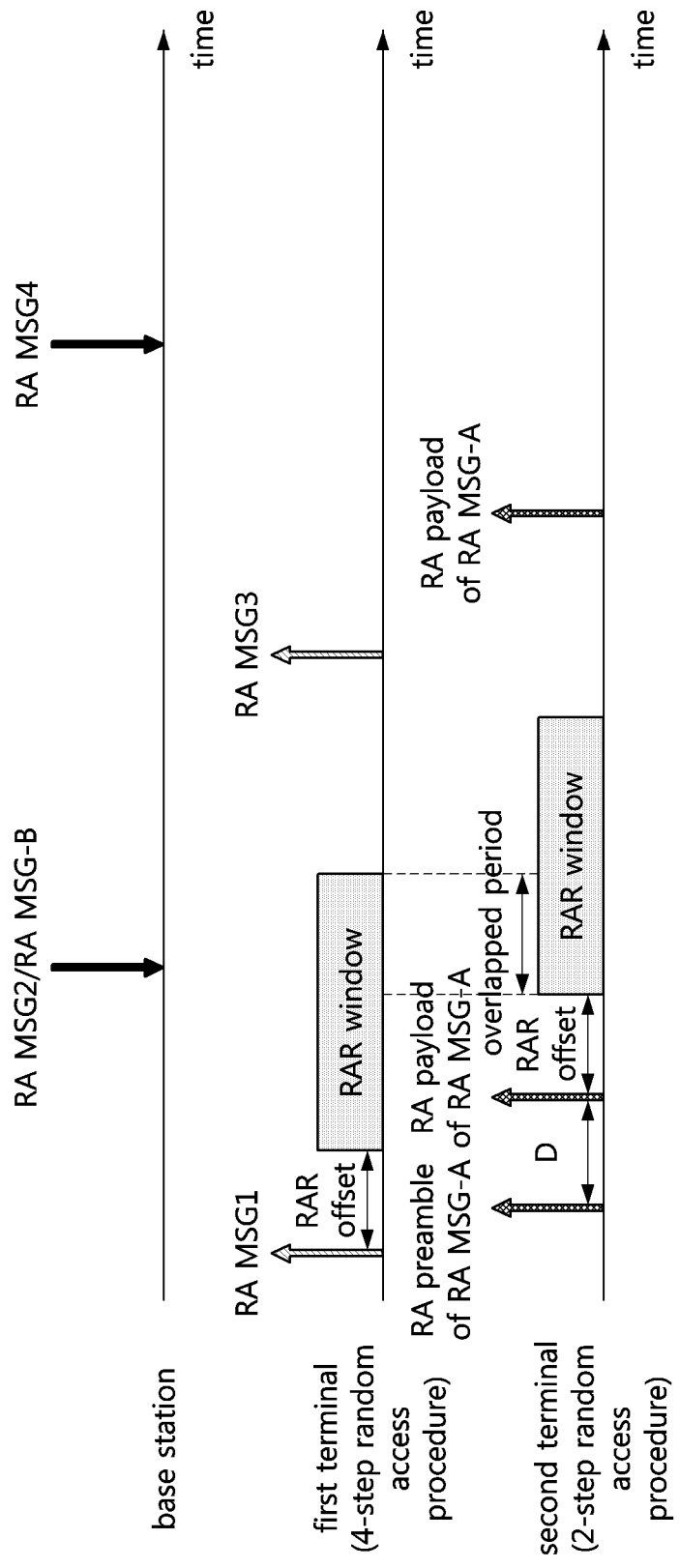
FIG. 15 is a timing diagram illustrating a third exemplary embodiment of a random access procedure in a communication system.

FIG. 15 is a timing diagram illustrating a third exemplary embodiment of a random access procedure in a communication system.

Referring to FIG. 15, a communication system may include a base station, a first terminal, and a second terminal. The first terminal may be a terminal that performs the 4-step random access procedure. The second terminal may be a terminal that performs the 2-step random access procedure.

The first terminal may transmit an RA MSG1 to the base station on a PRACH. The base station may receive the RA MSG1 from the first terminal, and may transmit an RA MSG2 to the first terminal in response to the RA MSG1. The first terminal may receive the RA MSG2 from the base station based on a result of performing a monitoring operation on a downlink channel (e.g., PDCCH) within an RAR window. The RAR window may start from a transmission ending time point of the RA MSG1. Alternatively, the RAR window may start from the first symbol of the earliest CORESET (e.g., CORESET in which a PDCCH is located) after transmission of the RA MSG1. An RAR offset may indicate a difference between the transmission ending time point of the RA MSG1 (e.g., the last symbol of the PRACH) and the first symbol of the CORESET.

The first terminal may transmit an RA MSG3 to the base station by using a resource indicated by scheduling information (e.g., UL grant) included in the RA MSG2. The base station may receive the RA MSG3 from the first terminal, and may transmit an RA MSG4 to the first terminal. The first terminal may receive the RA MSG4 from the base station. When the RA MSG4 is successfully received at the first terminal, the 4-step random access procedure may be terminated.

Meanwhile, in the 2-step random access procedure, the second terminal may transmit an RA MSG-A to the base station. The RA MSG-A may include an RA preamble and an RA payload. The RA preamble may be transmitted on a PRACH, and the RA payload may be transmitted on a PUSCH. A transmission interval D between the RA preamble and the RA payload may vary according to resources (e.g., mapping relationship of the resources) configured for the 2-step random access procedure. The base station may transmit resource configuration information (e.g., information on the mapping relationship of the resources) for the 2-step random access procedure to the terminal (e.g., second terminal) through system information and/or a control message.

The base station may receive the RA MSG-A (e.g., RA preamble, RA payload) from the second terminal. When both the RA preamble and the RA payload are successfully received, the base station may transmit an RA MSG-B (e.g., successful RAR) to the second terminal in response to the RA MSG-A. When only the RA preamble is received, the base station may transmit a fallback RAR to the second terminal in response to the RA MSG-A. The terminal may perform a PDCCH monitoring operation within an RAR window to receive the RA MSG-B. The RAR window may start from a transmission ending time point of the RA MSG-A (e.g., RA payload). Alternatively, the RAR window may start from the first symbol of the earliest CORESET (e.g., CORESET in which a PDCCH is located) after transmission of the RA MSG-A (e.g., RA payload). An RAR offset may indicate a difference between the transmission ending time point (e.g., the last symbol of the PDSCH) of the RA MSG-A (e.g., RA payload) and the first symbol of the CORESET.

The second terminal may receive the RA MSG-B (e.g., successful RAR, fallback RAR) from the base station within the RAR window. When the successful RAR is received within the RAR window, the 2-step random access procedure may be terminated. When the fallback RAR is received within the RAR window, the second terminal may transmit the RA payload of the RA MSG-A to the base station by using a resource indicated by scheduling information (e.g., UL grant) included in the fallback RAR. That is, when the fallback RAR is received from the base station, the second terminal may determine that the base station has received the RA preamble of the RA MSG-A but has not received the RA payload of the RA MSG-A. The base station may receive the RA payload of the RA MSG-A from the second terminal, and may transmit an RA MSG4 or the same information (e.g., information of an identifier of the second terminal for contention resolution) as the RA MSG4 in response to the RA payload of the RA MSG-A to the second terminal. When the RA MSG4 is successfully received at the second terminal, the 2-step random access procedure (e.g., fallback random access procedure) may be terminated.

The RAR window of the 4-step random access procedure (hereinafter referred to as a '4-step RAR window') may be overlapped with the RAR window of the 2-step random access procedure (hereinafter referred to as a '2-step RAR window') according to the RAR offset and/or the transmission interval D. Alternatively, the 4-step RAR window may not overlap with the 2-step RAR window according to the RAR offset and/or the transmission interval D. When the 4-step RAR window overlaps with the 2-step RAR window, a method for identifying whether the message 2 (e.g., RAR) received in the overlapping interval between the 4-step RAR window and the 2-step RAR window is the RA MSG2 or the RA MSG-B (e.g., successful RAR, fallback RAR) is required. When the above-described PRACH configuration method #2 is used, a method for identifying whether the message 2 received in the overlapping interval between the 4-step RAR window and the 2-step RAR window is the RA MSG2 or the RA MSG-B is further required. The RA MSG2, the successful RAR, the fallback RAR, and the BI (e.g., RAR including the BI) may be distinguished according to the cases #3 to #5 described above.

When the 4-step RAR window does not overlap with the 2-step RAR window, the transmission resource of the RA MSG2 may be different from the transmission resource of the RA MSG-B in the time domain. Since the period in which the first terminal (e.g., the terminal that initiated the 4-step random access procedure) performs the PDCCH monitoring operation within the RAR window is different from the period in which the second terminal (e.g., the terminal that initiated the 2-step random access procedure) performs the PDCCH monitoring operation within the RAR window, a different scheduling identifier may not be used for each of the first terminal and the second terminal. Also, a MAC message may not be used to distinguish between the 4-step random access procedure and the 2-step random access procedure.

Even when the PRACH configuration method #2 is used, the PRACH of the 2-step random access procedure may not be configured differently from the PRACH of the 4-step random access procedure. The base station may transmit to the terminal information indicating whether the 4-step RAR window and the 2-step RAR window overlap with each other, and configuration information of the PRACH and the RO according to the overlapping between the 4-step RAR window and the 2-step RAR window by using system information and/or a control message (e.g., dedicated control message). When the information indicating whether the 4-step RAR window and the 2-step RAR window overlap with each other is not received from the base station, the terminals (e.g., the first terminal and the second terminal) may determine whether the 2-step RAR window overlaps with the 4-step RAR window by using the RAR offset, the transmission interval D, the configuration information of the 4-step RAR window, and/or the configuration information of the 2-step RAR window.

The base station may transmit to the terminal the parameter(s) for the 2-step random access procedure, information indicating whether to apply the parameter(s) in the 2-step random access procedure, the parameter(s) for the 4-step random access procedure, and information indicating whether to apply the parameter(s) to the 4-step random access procedure by using system information and/or a control message (e.g., dedicated control message).

Figure 16A:
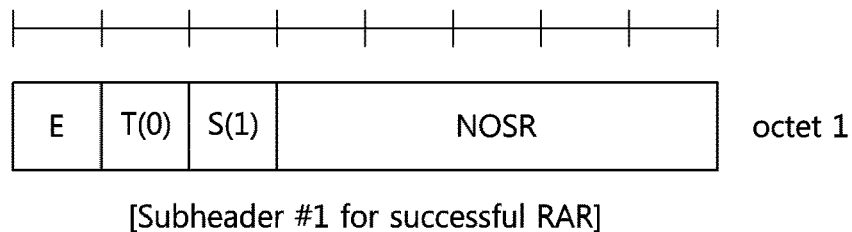
FIG. 16A is a conceptual diagram illustrating a third exemplary embodiment of a MAC subheader in a random access procedure.
Figure 16B:
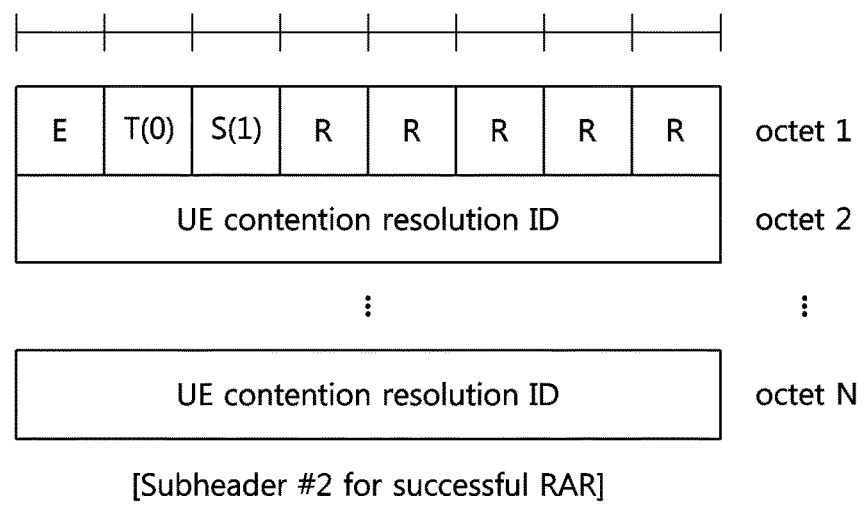
FIG. 16B is a conceptual diagram illustrating a fourth exemplary embodiment of a MAC subheader in a random access procedure.
Figure 16C:
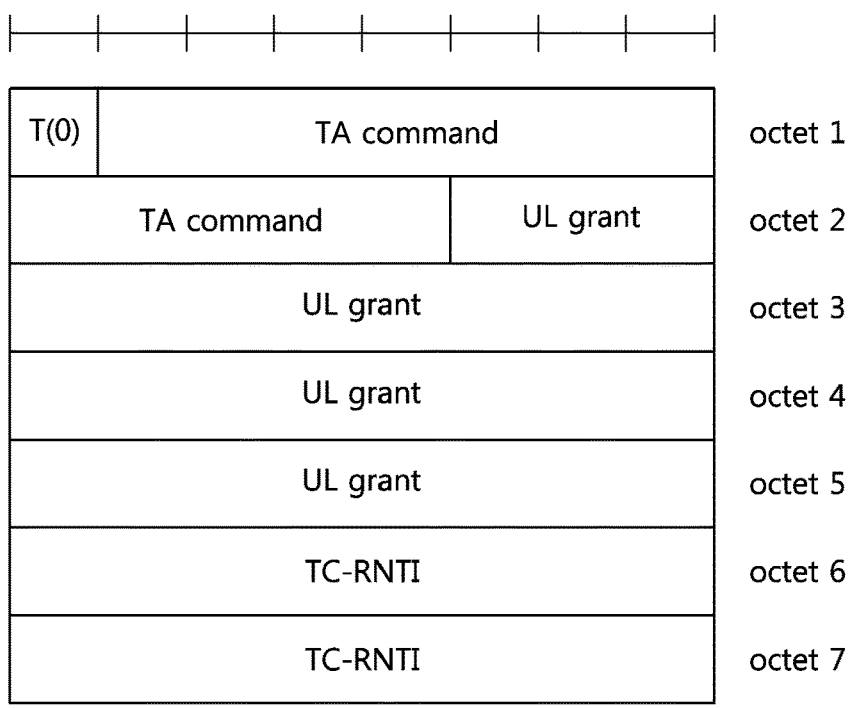
FIG. 16C is a conceptual diagram illustrating an eleventh exemplary embodiment of an RA MSG-B in a random access procedure.
Figure 16D:
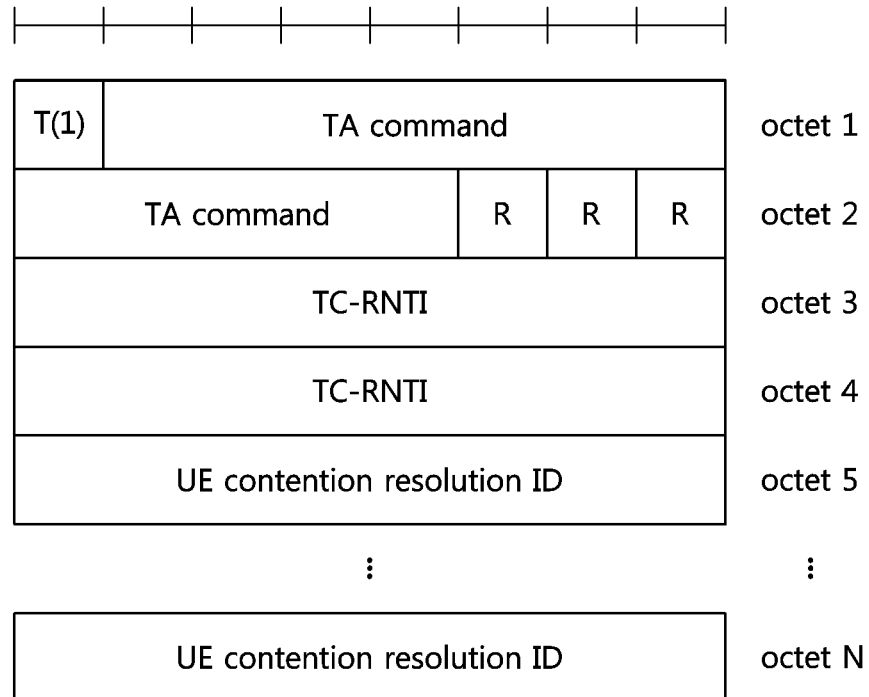
FIG. 16D is a conceptual diagram illustrating a twelfth exemplary embodiment of an RA MSG-B in a random access procedure.
Figure 16E:
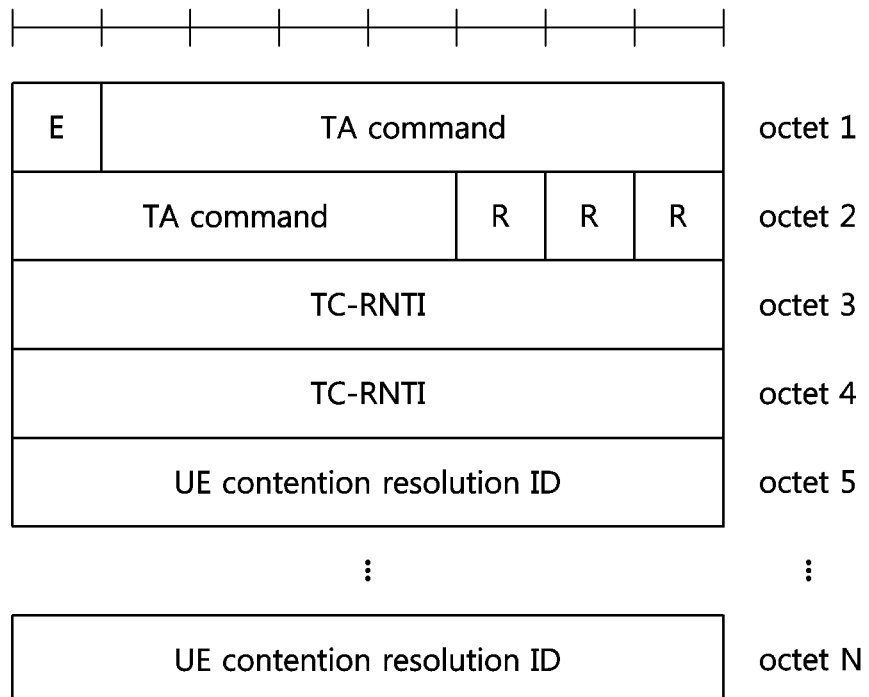
FIG. 16E is a conceptual diagram illustrating a thirteenth exemplary embodiment of an RA MSG-B in a random access procedure.
Figure 16F:
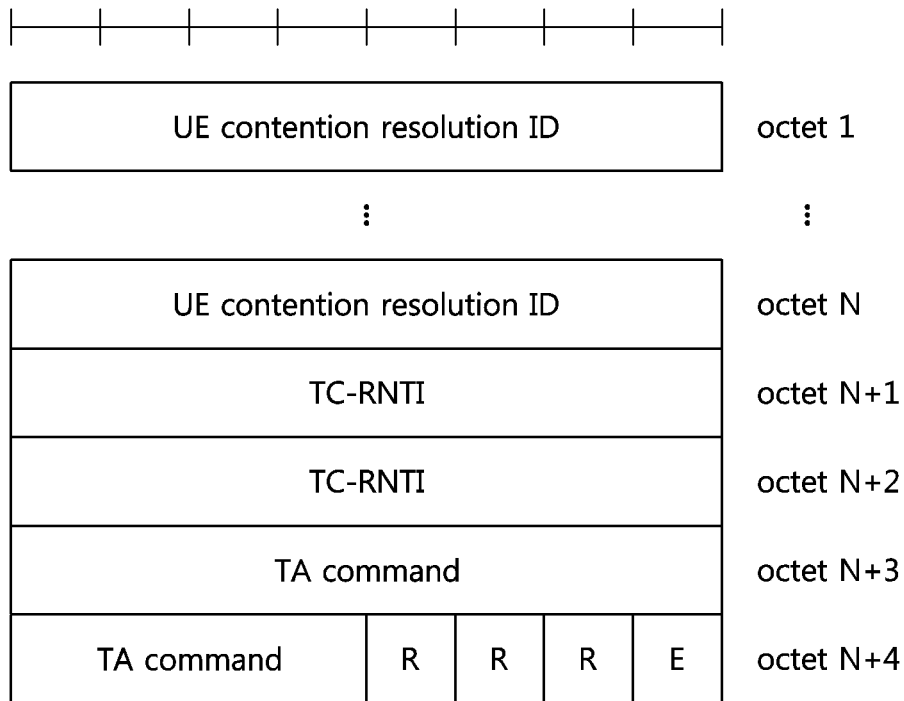
FIG. 16F is a conceptual diagram illustrating a fourteenth exemplary embodiment of an RA MSG-B in a random access procedure.
Figure 16G:
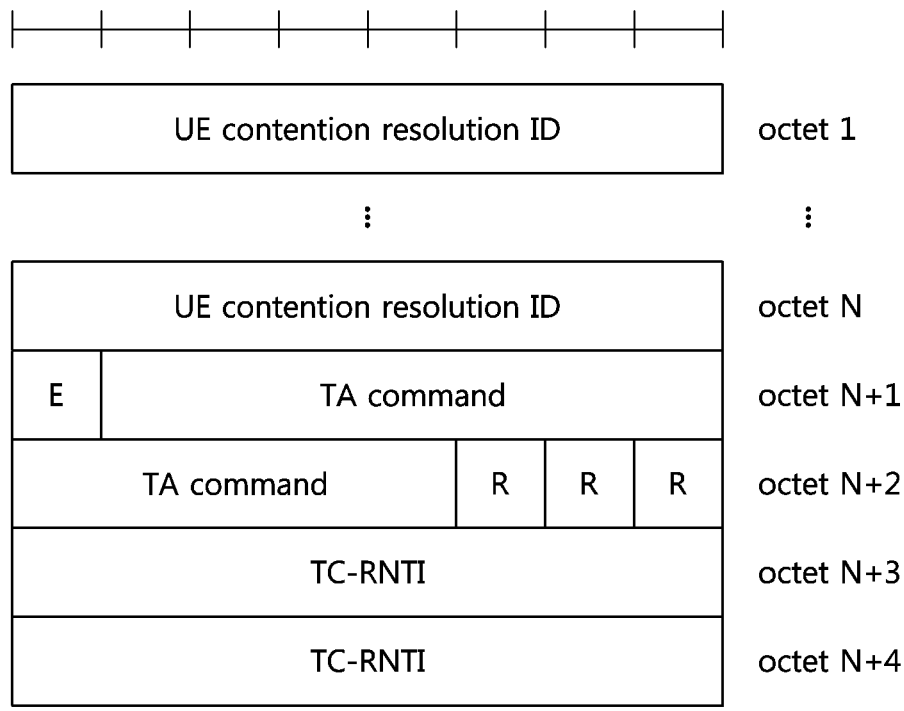
FIG. 16G is a conceptual diagram illustrating a fifteenth exemplary embodiment of an RA MSG-B in a random access procedure.

FIG. 16A is a conceptual diagram illustrating a third exemplary embodiment of a MAC subheader in a random access procedure, FIG. 16B is a conceptual diagram illustrating a fourth exemplary embodiment of a MAC subheader in a random access procedure, FIG. 16C is a conceptual diagram illustrating an eleventh exemplary embodiment of an RA MSG-B in a random access procedure, FIG. 16D is a conceptual diagram illustrating a twelfth exemplary embodiment of an RA MSG-B in a random access procedure, FIG. 16E is a conceptual diagram illustrating a thirteenth exemplary embodiment of an RA MSG-B in a random access procedure, FIG. 16F is a conceptual diagram illustrating a fourteenth exemplary embodiment of an RA MSG-B in a random access procedure, and FIG. 16G is a conceptual diagram illustrating a fifteenth exemplary embodiment of an RA MSG-B in a random access procedure.

The MAC subheader shown in FIG. 16A may be a subheader #1 for the successful RAR, and the MAC subheader shown in FIG. 16B may be a subheader #2 for the successful RAR (e.g., UE contention resolution ID (UE CRID) subheader). In the exemplary embodiments shown in FIGS. 16A and 16B, the T field may be set to '0' and the S field may be set to '1'. The S field set to '0' may indicate that the corresponding MAC subheader (e.g., MAC subheader including the corresponding S field) includes the BI. The S field set to '1' may indicate that the corresponding MAC subheader is the subheader for the successful RAR. The subheader #1 for the successful RAR shown in FIG. 16A may further include a 'number of success RAR (NOSR)' field, and the NOSR field may indicate the number of successful RARs included in the MSG-B MAC PDU. Alternatively, the NOSR field may indicate whether a successful RAR exists in the MSG-B MAC PDU. In this case, the size of the NOSR field may be 1 bit. For example, the NOSR field set to '1' may indicate that the RA MSG-B includes the successful RAR. The NOSR field set to '0' may indicate that the RA MSG-B does not include the successful RAR.

The RA MSG-B shown in FIG. 16C may be a fallback RAR, and the RA MSG-B shown in FIG. 16D may be a successful RAR. In the exemplary embodiments shown in FIGS. 16C and 16D, the T field set to '0' may indicate that the corresponding RA MSG-B (e.g., MAC RAR including the corresponding T field) is the fallback RAR, and the T field set to '1' may indicate that the corresponding RA MSG-B is the successful RAR. The arrangement order of the fields included in the successful RAR may be variously configured. For example, within the successful RAR, the UE contention resolution ID may be located after the T field.

When the RAPID subheader indicates a fallback RAR, a subheader for the successful RAR may be used in the exemplary embodiments shown in FIGS. 12E, 16E, 16F, and 16G. The RAPID subheader may correspond to the fallback RAR. The subheader for the successful RAR may indicate whether the MSG-B MAC PDU includes a successful RAR. Alternatively, the subheader for the successful RAR may indicate the number of successful RARs included in the MSG-B MAC PDU. The RA MSG-B shown in FIG. 12E may be the fallback RAR. The RA MSG-B shown in FIGS. 16E to 16G may be the successful RAR.

When the index of the RA preamble indicated by the RAPID subheader is the same as the index of the RA preamble of the RA MSG-A transmitted from the terminal, the terminal may obtain the fallback RAR corresponding to the RAPID subheader from the base station. When there is no RAPID subheader indicating the same RA preamble as the RA preamble of the RA MSG-A transmitted from the terminal, the terminal may identify the information element(s) included in the subheader for the successful RAR. When it is determined that the successful RAR exists, the terminal may obtain the successful RAR from the base station, and compare the UE contention resolution ID included in the successful RAR and the UE contention resolution ID included in the RA MSG-A transmitted from the terminal. The operation of comparing the UE contention resolution IDs may be performed until the successful RAR (e.g., the last successful RAR) having the E field set to '0' is obtained. When the UE contention resolution ID included in the successful RAR is the same as the UE contention resolution ID included in the RA MSG-A transmitted from the terminal, the terminal may determine that the 2-step random access procedure is completed.

Alternatively, the subheader #2 for the successful RAR shown in FIG. 16B may indicate whether the RA MSG-B includes the successful RAR. The subheader #2 for the successful RAR may include the S field set to '1', the UE contention resolution ID, and the like. When both the T field and the S field are set to '0' in the subheader #2 for the successful RAR, the terminal may determine that the corresponding MAC subheader (e.g., subheader #2 for the successful RAR) includes the BI.

When the T field is set to '0' and the S field is set to '1' in the subheader #2 for the successful RAR, the terminal may determine that the corresponding MAC subheader (e.g., subheader #2 for the successful RAR) includes the UE contention resolution ID. When the UE contention resolution ID included in the subheader #2 for the successful RAR is the same as the UE contention resolution ID included in the RA MSG-A transmitted from the terminal, the terminal may obtain the successful RAR associated with the subheader #2 for the successful RAR. In this case, the successful RAR shown in FIGS. 16E to 16G may not include the UE contention resolution ID. Also, the successful RAR may not include the E field.

Figure 17A:
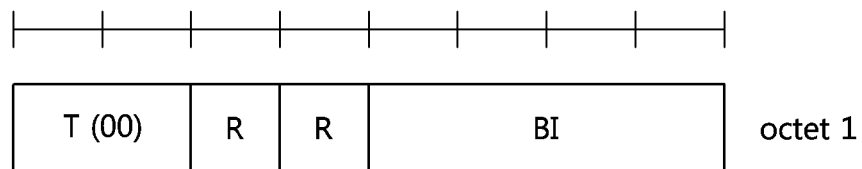
FIG. 17A is a conceptual diagram illustrating a fifth exemplary embodiment of a MAC subheader in a random access procedure.
Figure 17B:
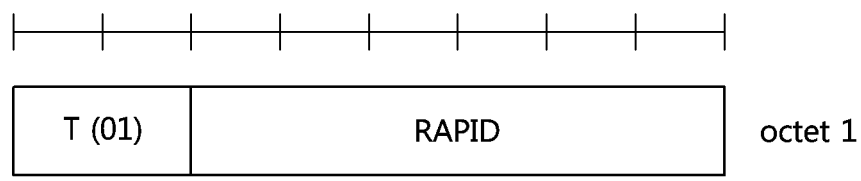
FIG. 17B is a conceptual diagram illustrating a sixth exemplary embodiment of a MAC subheader in a random access procedure.
Figure 17C:
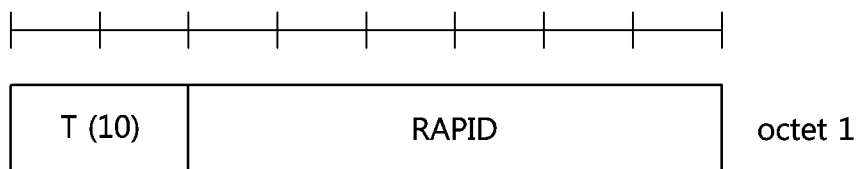
FIG. 17C is a conceptual diagram illustrating a seventh exemplary embodiment of a MAC subheader in a random access procedure.
Figure 17D:
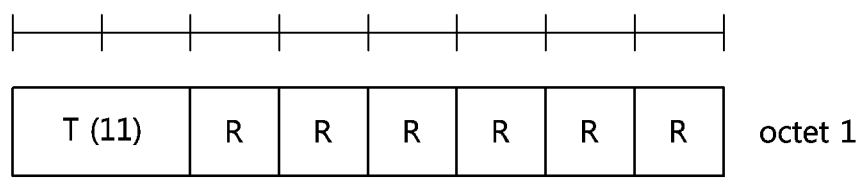
FIG. 17D is a conceptual diagram illustrating an eighth exemplary embodiment of a MAC subheader in a random access procedure.
Figure 17E:
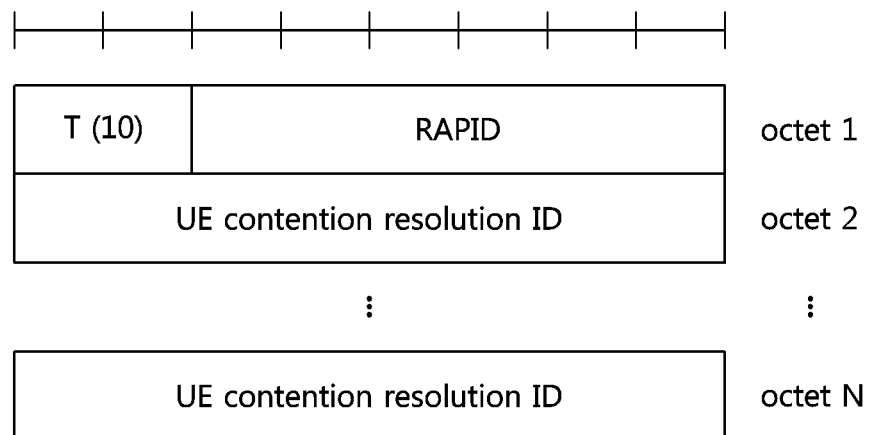
FIG. 17E is a conceptual diagram illustrating a ninth exemplary embodiment of a MAC subheader in a random access procedure.
Figure 17F:
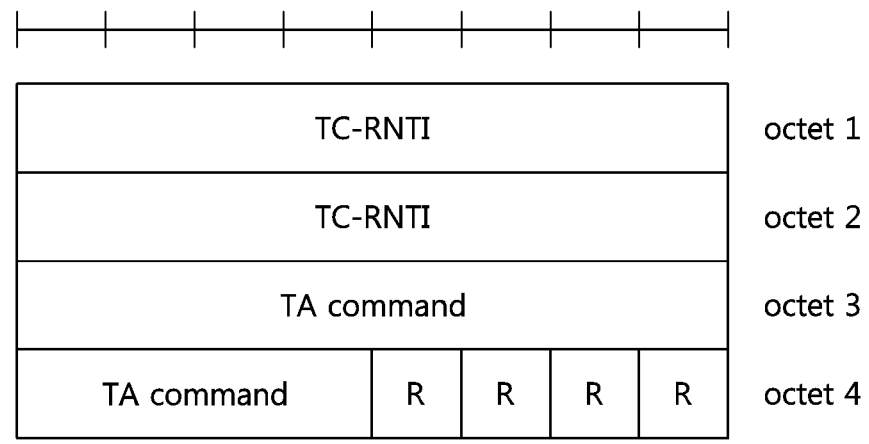
FIG. 17F is a conceptual diagram illustrating a sixteenth exemplary embodiment of an RA MSG-B in a random access procedure.
Figure 17G:
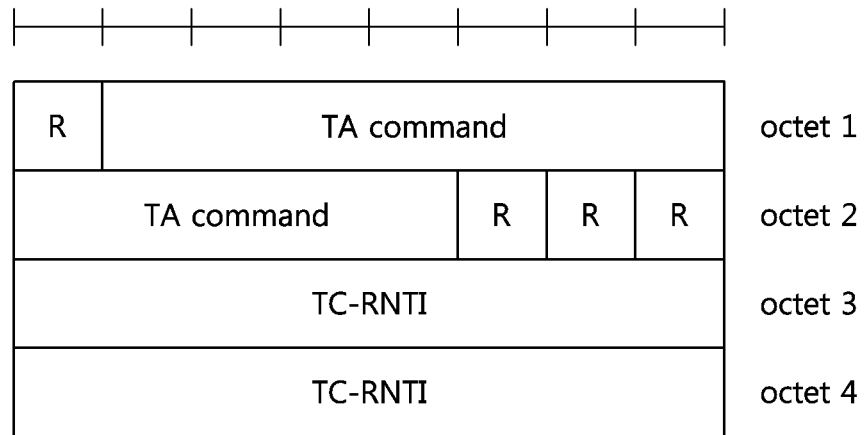
FIG. 17G is a conceptual diagram illustrating a seventeenth exemplary embodiment of an RA MSG-B in a random access procedure.

FIG. 17A is a conceptual diagram illustrating a fifth exemplary embodiment of a MAC subheader in a random access procedure, FIG. 17B is a conceptual diagram illustrating a sixth exemplary embodiment of a MAC subheader in a random access procedure, FIG. 17C is a conceptual diagram illustrating a seventh exemplary embodiment of a MAC subheader in a random access procedure, FIG. 17D is a conceptual diagram illustrating an eighth exemplary embodiment of a MAC subheader in a random access procedure, and FIG. 17E is a conceptual diagram illustrating a ninth exemplary embodiment of a MAC subheader in a random access procedure, FIG. 17F is a conceptual diagram illustrating a sixteenth exemplary embodiment of an RA MSG-B in a random access procedure, and FIG. 17G is a conceptual diagram illustrating a seventeenth exemplary embodiment of an RA MSG-B in a random access procedure.

The MAC subheaders shown in FIGS. 17A to 17E may be MAC subheaders for the RA MSG-B. The MAC subheader may include the T field, and the size of the T field may be 2 bits. In the exemplary embodiment shown in FIG. 17A, the T field set to '00' may indicate that the corresponding MAC subheader includes the BI. In the exemplary embodiment shown in FIG. 17B, the T field set to '01' may indicate that the corresponding MAC subheader indicates the fallback RAR. In the exemplary embodiment shown in FIG. 17C, the T field set to '10' may indicate that the corresponding MAC subheader indicates the successful RAR.

In the exemplary embodiment shown in FIG. 17D, the T field set to '11' may indicate that the corresponding MAC subheader is the last MAC subheader among the plurality of MAC subheaders. In the MAC subheader shown in FIG. 17D, all bits after the T field may be set to '0' or '1'. The size of the MAC subheader indicating that it is the last MAC subheader among the plurality of MAC subheaders may be one octet, and all bits constituting the one octet may be set to the same value (e.g., '0' or '1'). When a MAC subheader (e.g., the MAC subheader shown in FIG. 17A) that does not indicate the successful RAR and/or the fallback RAR is transmitted, the MAC subheader shown in FIG. 17D may be transmitted after the corresponding MAC subheader.

Padding bit(s) or padding byte(s) may be added to the MAC PDU including the RA MSG-B. In this case, the reserved bits (R) of the MAC subheader shown in FIG. 17D may indicate the number of padding bit(s) or padding byte(s) included in the MSG-B MAC PDU. When a MAC subheader including the T field set to '11' is detected, or when a MAC subheader including one octet each bit of which is set to the same value (e.g., '0' or '1') is detected, the terminal may determine that the MAC subheader for the RA MSG-B is terminated. In this case, the terminal may stop a search operation (e.g., identification operation) of the MAC subheader, and perform a reception operation of the RA MSG-B (e.g., BI, successful RAR, fallback RAR) according to a search result (e.g., identification result) of the MAC subheader.

When an RAPID included in the MAC subheader is the same as the index of the RA preamble of the RA MSG-A transmitted from the terminal, the terminal may perform a reception operation of a successful RAR or a fallback RAR. When a MAC subheader (e.g., MAC subheader shown in FIG. 17E) including the T field set to '10', the RAPID, and the UE contention resolution ID is received, and the UE contention resolution ID included in the MAC subheader is the same as the UE resolution ID included in the RA MSG-A transmitted from the terminal, the terminal may perform a reception operation of a successful RAR. Here, the fallback RAR may be the fallback RAR shown in FIG. 12E.

When the MAC subheader shown in FIG. 17C is received, the successful RAR may be composed of fields other than the E field among the fields included in the RA MSG-B shown in FIGS. 16E to 16G. When the MAC subheader shown in FIG. 17E is received, the successful RAR may be the RA MSG-B shown in FIGS. 17F and 17G.

When transmission of a radio bearer (e.g., a signaling radio bearer (SRB) or a data radio bearer (DRB)) packet is required in the 2-step random access procedure, a MAC message used for the transmission of the radio bearer packet may include a successful RAR and another MAC subPDU (or, MAC PDU). The radio bearer packet may be included in another MAC subPDU or another MAC PDU. The above-described MAC subheader constituting the RA MSG-B or reserved bit(s) R included in the MAC RAR may indicate whether there is the MAC subPDU or the MAC PDU including the radio bearer packet.

MAC control information for the radio bearer packet may include at least one of an indicator indicating whether a MAC subPDU or a MAC PDU for transmission of the radio bearer packet exists (e.g., whether it is transmitted), a time offset between a reception time point (e.g., reception starting time point, reception ending time point) of the RA MSG-B and a reception time point (e.g., reception starting time point, reception ending time point) of the MAC subPDU or MAC PDU for transmission of the radio bearer packet, an LCID of the radio bearer, beam configuration information (or, TCI state, active TCI index information) for the MAC subPDU or MAC PDU for transmission of the radio bearer packet, and information on a BWP in which the MAC subPDU or MAC PDU for transmission of the radio bearer packet is transmitted (e.g., BWP configuration parameter, BWP index, or BWP activation indication information).

The arrangement sequence of the fields included in the above-described RA MSG-B may vary. The RA MSG-B may include one or more among the above-described fields. Each of the MAC subheader, the MAC subPDU (or MAC PDU) including the fallback RAR, and the MAC subPDU (or MAC PDU) including the successful RAR may be aligned in units of bytes. When each of the MAC subheader, the MAC subPDU (or MAC PDU) including the fallback RAR, and the MAC subPDU (or MAC PDU) including the successful RAR is not aligned in units of bytes, reserved bit(s) may be omitted. When the successful RAR is located after the fallback RAR, a specific bit pattern (e.g., 1 octet each bit of which is set to the same value) may be inserted after the fallback RAR to identify a boundary between the fallback RAR and the successful RAR. In order to indicate that a valid RA MSG-B or MAC RAR has ended, a specific bit pattern (e.g., 1 octet each bit of which is set to the same value) may be inserted after the end of the fallback RAR and/or the successful RAR.

Figure 18:
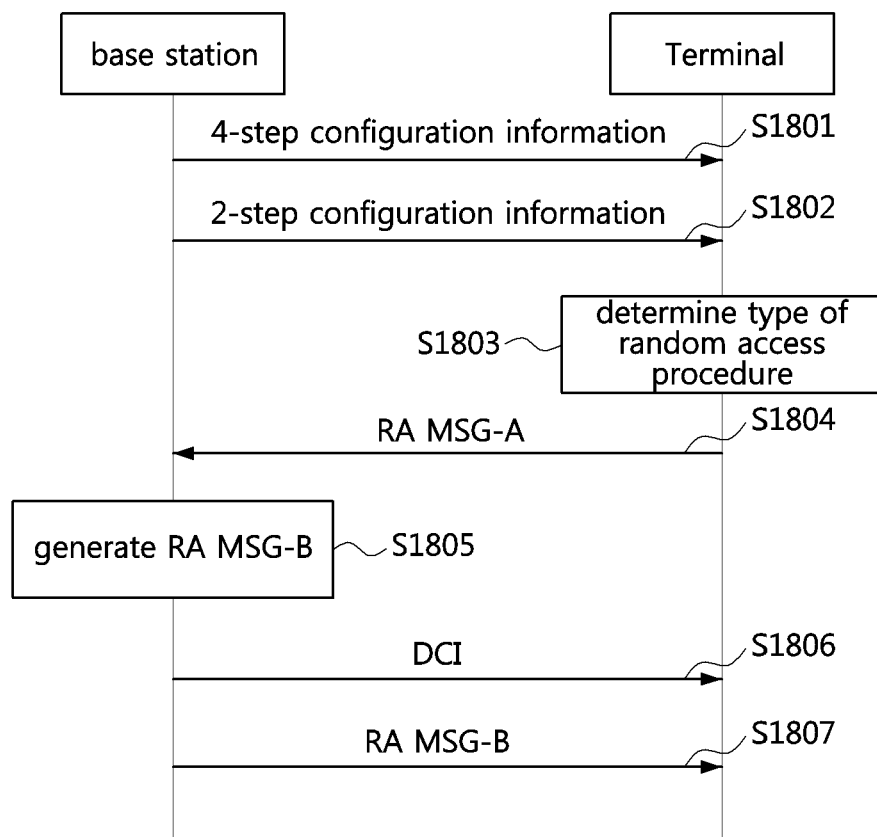
FIG. 18 is a sequence chart illustrating a third exemplary embodiment of a random access procedure in a communication system.

FIG. 18 is a sequence chart illustrating a third exemplary embodiment of a random access procedure in a communication system.

Referring to FIG. 18, a communication system may include a base station and a terminal. The base station may be the base station 110-1, 110-2, 110-3, 120-1, or 120-2 shown in FIG. 1, and the terminal may be the terminal 130-1, 130-2, 130-3, 130-4, 130-5, or 130-6 shown in FIG. 1. The base station and the terminal may be configured to be the same or similar to the communication node 200 shown in FIG. 2.

The base station may transmit configuration information for the 4-step random access procedure (hereinafter referred to as '4-step configuration information') to the terminal (S1801). In addition, the base station may transmit configuration information for the 2-step random access procedure (hereinafter referred to as '2-step configuration information') to the terminal (S1802). The 4-step configuration information and the 2-step configuration information may be transmitted through different messages. Alternatively, the 4-step configuration information and the 2-step configuration information may be transmitted through one message. Here, the message may be an RRC message or a MAC message.

Each of the 4-step configuration information and the 2-step configuration information may include configuration information of a PRACH occasion, information of an RA preamble sequence, a channel quality threshold (e.g., RSRP threshold), and the like. When the CFRA scheme is used, each of the 4-step configuration information and the 2-step configuration information may include configuration information of a PRACH occasion, an RA preamble sequence, and the like which are allocated dedicatedly to the terminal. The configuration information of the PRACH occasion may include information of a periodicity, time domain resource information, and frequency domain resource information of the PRACH occasion. The 2-step configuration information for the CFRA scheme may further include configuration information of the RA payload for the RA MSG-A. Here, the configuration information of the RA payload may be determined based on a mapping relationship (e.g., one-to-one mapping relationship) between the transmission resources of the RA preamble and the transmission resources of the RA preamble. The two-step configuration information for the CFRA scheme may include one or more of the information elements #1 to #6 described below. The 4-step configuration information or the 2-step configuration information for the CFRA scheme may be transmitted to the terminal using a dedicated control message.

The PRACH occasion for the 4-step random access procedure may be the same as the PRACH occasion for the 2-step random access procedure. Alternatively, the PRACH occasion for the 4-step random access procedure may be different from the PRACH occasion for the 2-step random access procedure. In this case, the base station may determine that the message 1 received in the PRACH occasion for the 4-step random access procedure is the RA MSG1, and the message 1 received in the PRACH occasion for the 2-step random access procedure is the RA MSG-A.

The sequence (or index) group to which the RA preamble sequence (or index) used in the 4-step random access procedure belongs (hereinafter referred to as a '4-step sequence group') may be configured differently from the sequence group to which the RA preamble sequence used in the 2-step random access procedure belongs (hereinafter referred to as a '2-step sequence group'). The 4-step sequence group may be referred to as a 4-step sequence set, and the 2-step sequence group may be referred to as a 2-step sequence set. In the following exemplary embodiments, the RA preamble sequence may mean an RA preamble index, the 4-step sequence group may mean a 4-step index group or a 4-step index set, and the 2-step sequence group may mean a 2-step index group or a 2-step index set.

The RA preamble sequence(s) belonging to the 4-step sequence group may be different from the RA preamble sequence(s) belonging to the 2-step sequence group. In this case, when the PRACH occasion of the 4-step random access procedure is the same as the PRACH occasion of the 2-step random access procedure, the base station may determine that the message 1 received in the PRACH occasion is the RA MSG1 or the RA MSG-A based on the RA preamble sequence. The 4-step configuration information may include information of the 4-step sequence group, and the 2-step configuration information may include information of the 2-step sequence group.

The channel quality threshold (e.g., RSRP threshold) may be used to determine the type of random access procedure performed by the terminal. When the channel quality between the terminal and the base station is equal to or greater than the RSRP threshold, the terminal may perform the 2-step random access procedure. When the channel quality between the terminal and the base station is less than the RSRP threshold, the terminal may perform the 4-step random access procedure. The channel quality threshold may be included in system information instead of the 4-step configuration information and the 2-step configuration information. That is, the base station may transmit to the terminal system information including the RSRP threshold (e.g., channel quality threshold) used to determine the type of random access procedure.

Also, the 2-step configuration information may further include one or more of the following information elements.

Information element #1: A time domain offset between the resource (e.g., PRACH) in which the RA preamble included in the RA MSG-A is transmitted and the resource (e.g., PUSCH) in which the RA payload included in the RA-MSG-A is transmitted Information element #2: A frequency domain offset between the resource (e.g., PRACH) in which the RA preamble included in the RA MSG-A is transmitted and the resource (e.g., PUSCH) in which the RA payload included in the RA-MSG-A is transmitted Information element #3: Information of mapping relationship between the resource (e.g., PRACH) in which the RA preamble included in RA MSG-A is transmitted and the resource (e.g., PUSCH) in which the RA payload included in RA-MSG-A is transmitted Information element #4: Information indicating a start timing of the resource in which the RA payload included in the RA-MSG-A is transmitted (e.g., a starting symbol index of a PUSCH)

Information element #5: Information indicating the length of the resource in which the RA payload included in the RA-MSG-A is transmitted (e.g., duration of a PUSCH, interval between PUSCHs, number of PUSCHs, or number of symbols constituting a PUSCH (or, starting symbol, ending symbol, and/or length of a PUSCH))

Information element #6: Information indicating a MCS level used for transmission of the RA payload included in the RA MSG-A The time domain offset included in the 2-step configuration information may be an interval between the ending time point of the PRACH and the starting time point of the PUSCH or an interval between the starting time point of the PRACH and the starting time point of the PUSCH. The frequency domain offset included in the 2-step configuration information may be an interval between the starting RB of the PRACH and the starting RB of the PUSCH, an interval between the ending RB of PRACH and the starting RB of the PUSCH, or an interval between a reference RB (e.g., a starting RB of a system bandwidth or a bandwidth part (BWP) and the starting RB of the PUSCH). Here, the RB may be a PRB or a CRB. The starting RB may be an RB having the lowest frequency resource among RB(s) occupied by the corresponding channel (e.g., band), and the ending RB may have an RB the highest frequency resource among the RB(s) occupied by the corresponding channel.

The 2-step configuration information may include information indicating a MCS level. The RA payload included in the RA MSG-A may be transmitted based on the MCS level indicated by the 2-step configuration information. Alternatively, the information indicating the MCS level for the RA payload included in the RA MSG-A may be included in system information instead of the 2-step configuration information. That is, the base station may transmit the system information including the information indicating the MCS level to the terminal. The terminal may receive one or more of the system information, the 4-step configuration information, and the 2-step configuration information from the base station. When the 4-step configuration information is received and the 2-step configuration information is not received, the terminal may perform the 4-step random access procedure based on the 4-step configuration information. When the 2-step configuration information is received and the 4-step configuration information is not received, the terminal may perform the 2-step random access procedure based on the 2-step configuration information. When the 4-step configuration information and the 2-step configuration information are received, the type of the random access procedure performed by the terminal may be determined based on the channel quality between the terminal and the base station (S1803). For example, the terminal may receive a reference signal and/or an SS/PBCH block from the base station, and measure a quality (e.g., RSRP) of the received signal. When the RSRP measured by the terminal is equal to or greater than an RSRP threshold configured by the base station, the terminal may perform the 2-step random access procedure based on the 2-step configuration information. When the RSRP measured by the terminal is less than the RSRP threshold configured by the base station, the terminal may perform the 4-step random access procedure based on the 4-step configuration information.

When it is determined that the 2-step random access procedure is performed, the terminal may generate an RA MSG-A including an RA preamble and an RA payload, and transmit the RA MSG-A to the base station (S1804). The terminal may select an RA preamble sequence in the 2-step sequence group, and may transmit the selected RA preamble sequence (i.e., RA preamble). The RA preamble may be transmitted in a PRACH occasion indicated by the 2-step configuration information.

In addition, when switching to the 2-step random access procedure according to the CBRA scheme in a situation where the CFRA was configured, the terminal may select a group of RA preamble sequences according to the RA payload of the RA MSG-A or the size of the RA MSG3 of the 4-step random access procedure, select an RA preamble in the determined group, and transmit the selected RA preamble. When switching from the 2-step random access procedure to the 4-step random access procedure, the terminal may select a group of RA preamble sequences and an RA preamble according to the same method, and transmit the selected RA preamble.

The RA payload may be transmitted through a PUSCH identified by one or more of the time domain offset, the frequency domain offset, the PUSCH starting symbol index, the PUSCH duration, and the mapping relationship information included in the 2-step configuration information. The RA payload may be transmitted based on the MCS level configured by the base station. The RA payload may include one or more of the terminal identifier, data, and control information. Here, the control information may include one or more among a BSR, measurement result information (e.g., radio channel quality information), BFR request information, RLF report information, RRC connection setup request information, RRC connection re-establishment request information, resumption request information, location information of the terminal (e.g., a position estimated by a GPS signal, a positioning measurement method, or a built-in sensor, etc.), and transmission request information of system information. The RA payload may include information included in the RA MSG3 in the 4-step random access procedure. The terminal may calculate the RA-RNTI based on radio resource information of the PRACH (e.g., PRACH occasion) on which the RA preamble is transmitted. The RA-RNTI used for reception of the RA MSG-B in the 2-step random access procedure may be referred to as a 'MSG-B RA-RNTI' or 'MSGB-RNTI'. For example, the MSGB-RNTI may be calculated based on Equation 1 below.

$$\text{MSGB-RNTI} = 1 + s_{id} + 14 \times t_{id} + 14 \times 80 \times f_{id} + 14 \times 80 \times 8 \times \text{UL}_{carrier_{id}} + \text{offset} \quad \text{[Equation 1]}$$

$s_{id}$ may be the index of the first symbol of the PRACH occasion. $t_{id}$ may be the index of the first slot of the PRACH occasion in the system frame (e.g., radio frame). $f_{id}$ may be the index of the PRACH occasion in the frequency domain. $\text{UL}_{carrier_{id}}$ may indicate a UL carrier used for transmission of the RA preamble. When a normal uplink (NUL) carrier is used, $\text{UL}_{carrier_{id}}$ may be 0. When a supplementary uplink (SUL) carrier is used, $\text{UL}_{carrier_{id}}$ may be 1. The offset may be signaled from the base station to the terminal. For example, the base station may transmit an RRC message, a MAC message, or DCI including the offset to the terminal. The offset used for the generation of the MSG-RNTI may be included in the system information or the 2-step configuration information. The time domain offset or frequency domain offset included in the 2-step configuration information may be used as an offset for generating the MSG-RNTI. Alternatively, the offset may be predefined in the technical specifications.

The RA-RNTI used for receiving the RA MSG 2 in the 4-step random access procedure may be calculated based on Equation 2 below. That is, the offset of Equation 1 may not be applied to Equation 2. Therefore, even when the radio resource of the PRACH occasion in which the RA preamble is transmitted in the 2-step random access procedure is the same as the radio resource of the PRACH occasion in which the RA preamble is transmitted in the 4-step random access procedure, the MSGB-RNTI may be configured differently from the RA-RNTI of the 4-step random access procedure.

$$\text{RA-RNTI} = 1 + s_{id} + 14 \times t_{id} + 14 \times 80 \times f_{id} + 14 \times 80 \times 8 \times \text{UL}_{carrier_{id}} \quad \text{[Equation 2]}$$

Meanwhile, the base station may receive the RA MSG-A or the RA MSG1 by performing a monitoring operation in the PRACH occasion(s) indicated by the 2-step configuration information and/or the 4-step configuration information. When the message 1 is received in the PRACH occasion indicated by the 2-step configuration information, or when the RA preamble sequence of the message 1 belongs to the 2-step sequence group, the base station may determine that the corresponding message 1 is the RA MSG-A of the 2-step random access procedure. On the other hand, when the message 1 is received in the PRACH occasion indicated by the 4-step configuration information or when the RA preamble sequence of the message 1 belongs to the 4-step sequence group, the base station may determine that the corresponding message 1 is the RA MSG1 of the 4-step random access procedure.

Upon receipt of the RA MSG-A, the base station may identify the information included in the RA payload of the RA MSG-A. In addition, the base station may calculate the MSGB-RNTI based on Equation 1. When the RA MSG1 is received, the base station may calculate the RA-RNTI based on Equation 2. Here, it is assumed that the base station receives the RA MSG-A from the terminal.

The base station may generate an RA MSG-B in response to the RA MSG-A (S1805). The RA MSG-B may be a MAC PDU. The RA MSG-B may include one or more MAC subPDUs. Each of the one or more MAC subPDUs may be generated according to one of the following configuration schemes. The MAC subPDU may be configured according to the exemplary embodiments shown in FIGS. 12, 14, 16, and/or 17 described above.

Configuration scheme #1: MAC subheader including BI
Configuration scheme #2: MAC subheader and fallback RAR
Configuration scheme #3: MAC subheader and successful RAR
Configuration scheme #4: MAC subheader and MAC SDU (e.g., data or control information)
Configuration scheme #5: MAC subheader and padding The MAC subheader may include a first indicator indicating the type of the MAC subPDU (e.g., type of information included in the MAC subPDU) including the corresponding MAC subheader. The first indicator may indicate a first type MAC subPDU including a BI (e.g., MAC subPDU according to the configuration scheme #1), a second type MAC subPDU including a fallback RAR (e.g., MAC subPDU according to the configuration scheme #2), or a third type MAC subPDU including a successful RAR (e.g., MAC subPDU according to the configuration scheme #3). The size of the first indicator may be 2 bits, and the first bit of the 2 bits may indicate the first type MAC subPDU or the second type MAC subPDU, and the second bit of the 2 bits may indicate the third type MAC subPDU.

Alternatively, the first indicator may indicate the first type MAC subPDU including a BI (e.g., MAC subPDU according to the configuration scheme #1), the second type MAC subPDU including a fallback RAR (e.g., MAC subPDU according to the configuration scheme #2), the third type MAC subPDU including a successful RAR (e.g., MAC subPDU according to the configuration scheme #3), or a fourth type MAC subPDU including a MAC SDU (e.g., MAC PDU according to the configuration scheme #4). The size of the first indicator may be 2 bits, and the first bit of the 2 bits may indicate the first type MAC subPDU or the second type MAC subPDU, and the second bit of the 2 bits may indicate the third type MAC subPDU or the fourth type MAC subPDU.

In addition, the MAC subheader may include a second indicator indicating whether the fourth type MAC subPDU is present. The size of the second indicator may be 1 bit. The second indicator set to '0' may indicate that the fourth type MAC subPDU is not present. The second indicator set to '1' may indicate that the fourth type MAC subPDU is present.

In addition, the MAC subheader may include a third indicator indicating whether another MAC subPDU is present after the MAC subPDU including the corresponding MAC subheader. The size of the third indicator may be 1 bit. The third indicator set to '0' may indicate that another MAC subPDU is not present after the corresponding MAC subPDU. The third indicator set to '1' may indicate that another MAC subPDU is present after the corresponding MAC subPDU.

In addition, the first type MAC subPDU may include information indicating switching to the 4-step random access procedure. The information indicating switching from the 2-step random access procedure to the 4-step random access procedure may be configured as a separate bit, and the separate bit may be included in the first type MAC subPDU together with the BI. Alternatively, the information indicating switching from the 2-step random access procedure to the 4-step random access procedure may be configured as a specific pattern of a bit string constituting the BI.

The base station may generate DCI including resource allocation information of the RA MSG-B, perform a scrambling operation for the DCI (e.g., CRC of the DCI) by using the MSGB-RNTI, and transmit the DCI (e.g., the scrambled DCI) to the terminal (S1806).

The DCI may be transmitted within the RAR window. The RAR window may start from the starting time point of the PRACH, the ending time point of the PRACH, the starting time point of the PUSCH, the ending time point of the PUSCH, the starting time point of the RA preamble, the ending time point of the RA preamble, the starting time point of the RA payload, or the ending time point of the RA payload. Here, the PRACH may be a radio resource in which the RA preamble of the RA MSG-A is transmitted, and the PUSCH may be a radio resource in which the RA payload of the RA MSG-A is transmitted. The base station may inform the terminal of the duration of the RAR window (or the ending time point of the RA window, the timer of the RAR window). The information indicating the duration of the RAR window (or the ending time point of the RA window, the timer of the RAR window) may be included in the system information and/or the 2-step configuration information.

The terminal may perform a PDCCH monitoring operation by using the MSGB-RNTI. The PDCCH monitoring operation may be performed within the RAR window. For example, the terminal may perform a descrambling operation on the DCI received from the base station by using the MSGB-RNTI. When the DCI is successfully received from the base station, the terminal may obtain resource allocation information of the RA MSG-B included in the DCI. The terminal may perform a monitoring operation for reception of the RA MSG-B in the radio resource indicated by the resource allocation information of the RA MSG-B.

The base station may transmit the RA MSG-B to the terminal by using the DCI of the step S1806 described above (S1807). The RA MSG-B may be transmitted in the radio resource indicated by the resource allocation information included in the DCI scrambled by the MSGB-RNTI. The terminal may receive the RA MSG-B from the base station. The terminal may identify the type of the corresponding MAC subPDU by checking the first indicator of the MAC subheader included in the MAC subPDU identified by the RA MSG-B. For example, the terminal may identify whether the corresponding MAC subPDU is the first type MAC subPDU, the second type MAC subPDU, or the third type MAC subPDU based on the first indicator included in the MAC subheader. In addition, the terminal may identify whether the fourth type MAC subPDU exists by checking the second indicator included in the MAC subheader.

In addition, the terminal may identify whether another MAC subPDU is present after the corresponding MAC subPDU by checking the third indicator of the MAC subheader. When there is another MAC subPDU, the terminal may identify the first indicator, the second indicator, and/or the third indicator included in another MAC subPDU, and perform an operation according to the identified result.

When the RA MSG-B received from the base station includes a MAC subheader including a BI, the terminal may perform the 2-step random access procedure after a backoff operation according to the received BI. Alternatively, the terminal may perform the 4-step random access procedure again without a backoff operation. In addition, when the information indicating switching to the 4-step random access procedure is received from the base station, the terminal may perform the 4-step random access procedure again without a backoff operation.

When the RA MSG-B received from the base station includes a MAC subheader and a fallback RAR, the terminal may transmit an RA MSG3 according to the 4-step random access procedure to the base station. That is, the 2-step random access procedure may be switched to the 4-step random access procedure. The RA MSG3 may be transmitted through a radio resource indicated by a UL grant included in the fallback RAR. The RA MSG-B including the MAC subheader and the fallback RAR may be generated based on the format of the RA MSG2 of the 4-step random access procedure. For example, the RA MSG-B may include information included in the RA MSG2. The base station may receive the RA MSG3 from the terminal, and may transmit an RA MSG4 to the terminal. The terminal may receive the RA MSG4 from the base station. In this case, the random access procedure may be terminated. That is, contention between terminals may be resolved.

When the RA MSG-B received from the base station includes a MAC subheader and a successful RAR, the terminal may determine that the 2-step random access procedure has been terminated. When the RA MSG-B including a MAC subheader and a successful RAR is received within the RAR window, the terminal may determine that the 2-step random access procedure is terminated. That is, contention between terminals may be resolved.

When the 2-step random access procedure of the CFRA scheme is performed in the procedure according to the steps S1804 to S1807, the base station may receive only the RA preamble of the RA MSG-A according to the CFRA scheme from the terminal not the RA payload of the RA MSG-A. In this case, the base station may identify the corresponding terminal through the radio resource or the index information of the RA preamble of the RA MSG-A according to the CFRA scheme received from the terminal. Therefore, the base station may transmit DCI including scheduling information of a PDSCH on which the RA MSG-B is transmitted to the terminal by using a scheduling identifier (e.g., C-RNTI) assigned dedicatedly to the terminal or the MSGB-RNTI. Therefore, the terminal may receive the DCI by performing a PDCCH monitoring operation by using the MSGB-RNTI or the scheduling identifier assigned to itself. The terminal may obtain one or more among the scheduling information of the PDSCH on which the RA MSG-B is transmitted, downlink scheduling information, and uplink scheduling information.

In addition, when the above-described 2-step configuration information (e.g., the information elements #1 to #6) does not include radio resource configuration information for the RA payload, the terminal may transmit only the RA preamble in the step S1804 of transmitting the RA MSG-A. That is, when the 2-step configuration information does not include association information (e.g., mapping relationship information) between the RA preamble included in the RA MSG-A and the RA payload, the terminal may transmit only the RA preamble of the RA MSG-A not the RA payload of the RA MSG-A. In this case, when the terminal transmits only the RA preamble of the RA MSG-A for the 2-step random access procedure, the base station and the terminal may perform operations conforming to the 4-step random access procedure.

That is, the base station may recognize that only the RA preamble is received from the terminal based on the 2-step configuration information. Accordingly, when the RA preamble is received from the terminal, the base station may transmit a random access response message to the terminal according to the above-described 2-step random access procedure or 4-step random access procedure. The base station performing the 2-step random access procedure may transmit the RA MSG-B composed of the fallback RAR to the terminal by using the MSG-B RNTI. The base station performing the 4-step random access procedure may transmit a response message configured in form of the RA MSG2 to the terminal by using the RA-RNTI.

In addition, the terminal may monitor DCI to receive a random access response message after transmitting only the RA preamble of the MSG-A. In this case, the RAR window may start from a time point at which the terminal transmits the PRACH (e.g., a starting time point or ending time point of the PRACH transmission). In addition, the terminal may monitor a PDCCH by using both the RA-RNTI and the MSG-B RNTI. Through the PDCCH monitoring, the terminal may receive a response message configured in form of the RA MSG2 by using the RA-RNTI. Alternatively, the terminal may receive the RA MSG-B configured as the fallback RAR by using the MSG-B RNTI through the PDCCH monitoring.

In the present disclosure, the radio channel quality may be a channel state indicator (CSI), a received signal strength indicator (RSSI), a reference signal received power (RSRP), a reference signal received quality (RSRQ), or a signal to interference and noise ratio (SINR). With respect to the operation of the timer defined or described in the present disclosure, although operations such as start, stop, reset, restart, or expire of the defined timer are not separately described, they mean or include the operations of the corresponding timer or a counter for the corresponding timer.

In the present disclosure, the base station (or cell) may refer to a node B (NodeB), an evolved NodeB, a base transceiver station (BTS), a radio base station, a radio transceiver, an access point, an access node, a road side unit (RSU), a radio remote head (RRH), a transmission point (TP), a transmission and reception point (TRP), or a gNB. In addition, the base station (or, cell) may a CU node or a DU node to which the functional split is applied.

In the present disclosure, the terminal may refer to a UE, a terminal, an access terminal, a mobile terminal, a station, a subscriber station, a mobile station, a portable subscriber station, a node, a device), an Internet of Thing (IoT) device, or a mounted apparatus (e.g., a mounted module/device/terminal or an on-board device/terminal).

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. A method of a terminal, the method comprising:
receiving, from a base station, configuration information for a 2-step random access procedure;
transmitting, to the base station, a random access (RA) message-A (MSG-A) including an RA preamble and an RA payload based on the configuration information; and
receiving an RA MSG-B in response to the RA MSG-A from the base station,
wherein the RA MSG-B includes one or more MAC sub protocol data units (subPDUs), each of the one or more MAC subPDUs includes a MAC subheader, and the MAC subheader includes a first indicator indicating a type of the MAC subPDU,
the first indicator indicates that the MAC subPDU is a first type MAC subPDU including a backoff indicator (BI), that the MAC subPDU is a second type MAC subPDU including a fallback random access response (RAR), or that the MAC subPDU is a third type MAC subPDU including a successful RAR,
the RA MSG-B including the fallback RAR is generated based on a format of an RA MSG2 of a 4-step random access procedure.

2. The method according to claim 1, further comprising receiving system information including information indicating a modulation and coding scheme (MCS) for the RA payload from the base station,
wherein the RA payload is transmitted based on the MCS level indicated by the system information.

3. The method according to claim 1, wherein a size of the first indicator is 2 bits, a first bit of the 2 bits indicates the second type MAC subPDU, and a second bit of the 2 bits indicates the first type MAC subPDU or the third type MAC subPDU.

4. The method according to claim 1, further comprising, when the first indicator included in the RA MSG-B indicates the first type MAC subPDU, performing the 2-step random access procedure or the 4-step random access procedure based on the BI included in the RA MSG-B.

5. The method according to claim 1, further comprising, when the first indicator included in the RA MSG-B indicates the second type MAC subPDU, transmitting an RA MSG3 according to the 4-step random access procedure to the base station.

6. The method according to claim 5, wherein the RA MSG3 is transmitted using a resource indicated by an uplink (UL) grant included in the fallback RAR.

7. The method according to claim 1, wherein, when the first indicator indicates the third type MAC subPDU, the 2-step random access procedure is terminated.

8. The method according to claim 1, wherein, when the RA MSG-B is received within an RAR window from a transmission ending time point of the RA preamble, a contention is determined to be resolved in the 2-step random access procedure.

9. The method according to claim 1, wherein the MAC subheader further includes a second indicator indicating whether the MAC subPDU is a fourth type MAC subPDU including a MAC service data unit (SDU), and the MAC SDU includes data or control information.

10. The method according to claim 1, wherein the MAC subheader further includes a third indicator indicating whether another MAC subPDU exists.

11. A method of a base station, the method comprising:
transmitting 2-step configuration information for a 2-step random access (RA) procedure to a terminal;
transmitting 4-step configuration information for a 4-step random access procedure to the terminal;
receiving a message 1 from the terminal by performing a monitoring operation using the 2-step configuration information and the 4-step configuration information; and
when the message 1 is an RA message-A (MSG-A) of the 2-step RA procedure, transmitting an RA MSG-B including one or more MAC sub protocol data units (subPDUs) to the terminal,
wherein each of the one or more MAC subPDUs includes a MAC subheader, and the MAC subheader includes a first indicator indicating a type of the MAC subPDU,
the first indicator indicates that the MAC subPDU is a first type MAC subPDU including a backoff indicator (BI), that the MAC subPDU is a second type MAC subPDU including a fallback random access response (RAR), or that the MAC subPDU is a third type MAC subPDU including a successful RAR, the RA MSG-B including the fallback RAR is generated based on a format of an RA MSG2 of the 4-step random access procedure.

12. The method according to claim 11, further comprising transmitting system information including information indicating a modulation and coding scheme (MCS) for an RA payload included in the RA MSG-A to the terminal.

13. The method according to claim 11, wherein a size of the first indicator is 2 bits, a first bit of the 2 bits indicates the second type MAC subPDU, and a second bit of the 2 bits indicates the first type MAC subPDU or the third type MAC subPDU.

14. The method according to claim 11, further comprising, when the first indicator included in the RA MSG-B indicates the second type MAC subPDU, receiving an RA MSG3 according to the 4-step random access procedure from the base station through a resource indicated by an uplink (UL) grant included in the fallback RAR.

15. The method according to claim 11, wherein, when the RA MSG-B is received from the terminal within an RAR window from a transmission ending time point of the RA preamble, and the first indicator included in the RA MSG-B indicates the third type MAC subPDU, the 2-step random access procedure is terminated.

16. The method according to claim 11, wherein one MAC subPDU among the one or more MAC subPDUs includes a MAC service data unit (SDU) including control information or data, and a radio network temporary identifier (RNTI) for the one MAC subPDU including the MAC SDU is configured independently from an RNTI for another MAC subPDU including the BI, the fallback RAR, or the successful RAR.

17. The method according to claim 11, wherein the MAC subheader further includes a second indicator indicating whether the MAC subPDU is a fourth type MAC subPDU including a MAC service data unit (SDU), and the MAC SDU includes data or control information.

18. The method according to claim 11, wherein the MAC subheader further includes a third indicator indicating whether another MAC subPDU exists.

19. A terminal, the terminal comprising:
a processor,
wherein the processor causes the terminal to:
receive, from a base station, configuration information for a 2-step random access procedure;
transmit, to the base station, a random access (RA) message-A (MSG-A) including an RA preamble and an RA payload based on the configuration information; and
receive an RA MSG-B in response to the RA MSG-A from the base station,
wherein the RA MSG-B includes one or more MAC sub protocol data units (subPDUs), each of the one or more MAC subPDUs includes a MAC subheader, the MAC subheader includes a first indicator indicating a type of the MAC subPDU and a second indicator indicating whether the MAC subPDU is a fourth type MAC subPDU including a MAC service data unit (SDU), and the MAC SDU includes data or control information.

20. The terminal according to claim 19, wherein the first indicator indicates that the MAC subPDU is a first type MAC subPDU including a backoff indicator (BI), that the MAC subPDU is a second type MAC subPDU including a fallback random access response (RAR), or that the MAC subPDU is a third type MAC subPDU including a successful RAR.

* * * * *